United States Patent
Chen et al.

(10) Patent No.: US 11,439,989 B2
(45) Date of Patent: Sep. 13, 2022

(54) HYDROFINING CATALYST, ITS PREPARATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Wenbin Chen, Beijing (CN); Le Zhang, Beijing (CN); Xiangyun Long, Beijing (CN); Hong Nie, Beijing (CN); Mingfeng Li, Beijing (CN); Dadong Li, Beijing (CN); Qinghe Liu, Beijing (CN); Xueyan Ju, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 55 days.

(21) Appl. No.: 17/044,817

(22) PCT Filed: Apr. 9, 2019

(86) PCT No.: PCT/CN2019/081915
§ 371 (c)(1),
(2) Date: Oct. 1, 2020

(87) PCT Pub. No.: WO2019/196836
PCT Pub. Date: Oct. 17, 2019

(65) Prior Publication Data
US 2021/0094023 A1    Apr. 1, 2021

(30) Foreign Application Priority Data

Apr. 10, 2018 (CN) .......................... 201810316695.2
Apr. 10, 2018 (CN) .......................... 201810317845.1
(Continued)

(51) Int. Cl.
*B01J 23/88* (2006.01)
*B01J 23/888* (2006.01)
(Continued)

(52) U.S. Cl.
CPC ........... *B01J 23/8885* (2013.01); *B01J 21/04* (2013.01); *B01J 21/066* (2013.01); *B01J 21/18* (2013.01);
(Continued)

(58) Field of Classification Search
CPC . B01J 21/04; B01J 21/066; B01J 21/18; B01J 23/02; B01J 23/882; B01J 23/883;
(Continued)

(56) References Cited

U.S. PATENT DOCUMENTS 2,848,376 A    8/1958    Oettinger et al.
4,448,896 A    5/1984    Kageyama et al.
(Continued)

FOREIGN PATENT DOCUMENTS

CN    1087289 A    6/1994
CN    1160602 A    10/1997
(Continued)

OTHER PUBLICATIONS

Braga, T. P. et al., "Cu, Fe, or Ni doped molybdenum oxide supported on Al2O3 for the oxidative dehydrogenation of ethylbenzene". Chinese Journal of Catalysis, May 20, 2015, vol. 36, pp. 712-720 p. 713-715, Section 2.1 Catalyst Preparation, Figure 2B and Table 1.
(Continued)

*Primary Examiner* — Brian A McCaig
(74) *Attorney, Agent, or Firm* — Novick, Kim & Lee, PLLC; Allen Xue

(57) ABSTRACT

Disclosed is a hydrofining catalyst comprising: an inorganic refractory component comprising a first hydrodesulfurization catalytically active component in a mixture with at least
(Continued)

one oxide selected from the group consisting of alumina, silica, magnesia, calcium oxide, zirconia and titania; a second hydrodesulfurization catalytically active component; and an organic component comprising a carboxylic acid and optionally an alcohol. The hydrofining catalyst of the present application shows improved performance in the hydrofining of distillate oils. Also disclosed are a hydrofining catalyst system comprising the hydrofining catalyst, a method for preparing the catalyst and catalyst system, and a process for the hydrofining of distillate oils using the catalyst or catalyst system.

21 Claims, 1 Drawing Sheet

(30) Foreign Application Priority Data

Apr. 10, 2018 (CN) .................. 201810317848.5
Apr. 10, 2018 (CN) .................. 201810317849.X

(51) Int. Cl.

| | | |
|---|---|---|
| B01J 21/04 | (2006.01) | |
| B01J 21/06 | (2006.01) | |
| B01J 21/18 | (2006.01) | |
| B01J 23/02 | (2006.01) | |
| B01J 23/882 | (2006.01) | |
| B01J 23/883 | (2006.01) | |
| B01J 27/16 | (2006.01) | |
| B01J 35/10 | (2006.01) | |
| B01J 37/02 | (2006.01) | |
| B01J 37/08 | (2006.01) | |
| B01J 37/20 | (2006.01) | |
| C10G 45/08 | (2006.01) | |

(52) U.S. Cl.
CPC .............. *B01J 23/02* (2013.01); *B01J 23/882* (2013.01); *B01J 23/883* (2013.01); *B01J 23/888* (2013.01); *B01J 27/16* (2013.01); *B01J 35/109* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 35/1066* (2013.01); *B01J 37/0203* (2013.01); *B01J 37/024* (2013.01); *B01J 37/0205* (2013.01); *B01J 37/0213* (2013.01); *B01J 37/0236* (2013.01); *B01J 37/088* (2013.01); *B01J 37/20* (2013.01); *C10G 45/08* (2013.01); *C10G 2300/1074* (2013.01)

(58) Field of Classification Search
CPC ...... B01J 23/888; B01J 23/8885; B01J 27/16; B01J 35/1014; B01J 35/1019; B01J 35/1038; B01J 35/1042; B01J 35/1061; B01J 35/1066; B01J 35/108; B01J 35/109; B01J 37/0203; B01J 37/0205; B01J 37/0213; B01J 37/0236; B01J 37/024; B01J 37/088; B01J 37/20; C10G 45/08; C10G 2300/1074
See application file for complete search history.

(56) References Cited

U.S. PATENT DOCUMENTS

| 9,683,180 B2 | 6/2017 | Roy-Auberger et al. |
|---|---|---|
| 2013/0178670 A1* | 7/2013 | Zhou ................ B01J 23/888 |
| | | 568/885 |
| 2015/0306578 A1 | 10/2015 | Jia et al. |

FOREIGN PATENT DOCUMENTS

| CN | 1055877 C | 8/2000 |
|---|---|---|
| CN | 1325942 A | 12/2001 |
| CN | 1488441 A | 4/2004 |
| CN | 101092573 A | 12/2007 |
| CN | 101450327 A | 6/2009 |
| CN | 101591566 A | 12/2009 |
| CN | 102311759 A | 1/2012 |
| CN | 102876374 A | 1/2013 |
| CN | 104338538 A | 2/2015 |
| CN | 104437517 A | 3/2015 |
| CN | 104437518 A | 3/2015 |
| CN | 105985799 A | 10/2016 |
| CN | 109718866 A | 5/2019 |
| CN | 109718867 A | 5/2019 |
| GB | 960018 B1 | 6/1964 |
| GN | 104437518 A | 3/2015 |
| JP | 2007152324 A | 6/2007 |

OTHER PUBLICATIONS

Lloyd, Lawrie., Chapter 6 Refinery Catalysts. Handbook of Industrial Catalysts, Springer US, Jul. 26, 2011, pp. 224-225 pp. 224-225.

* cited by examiner

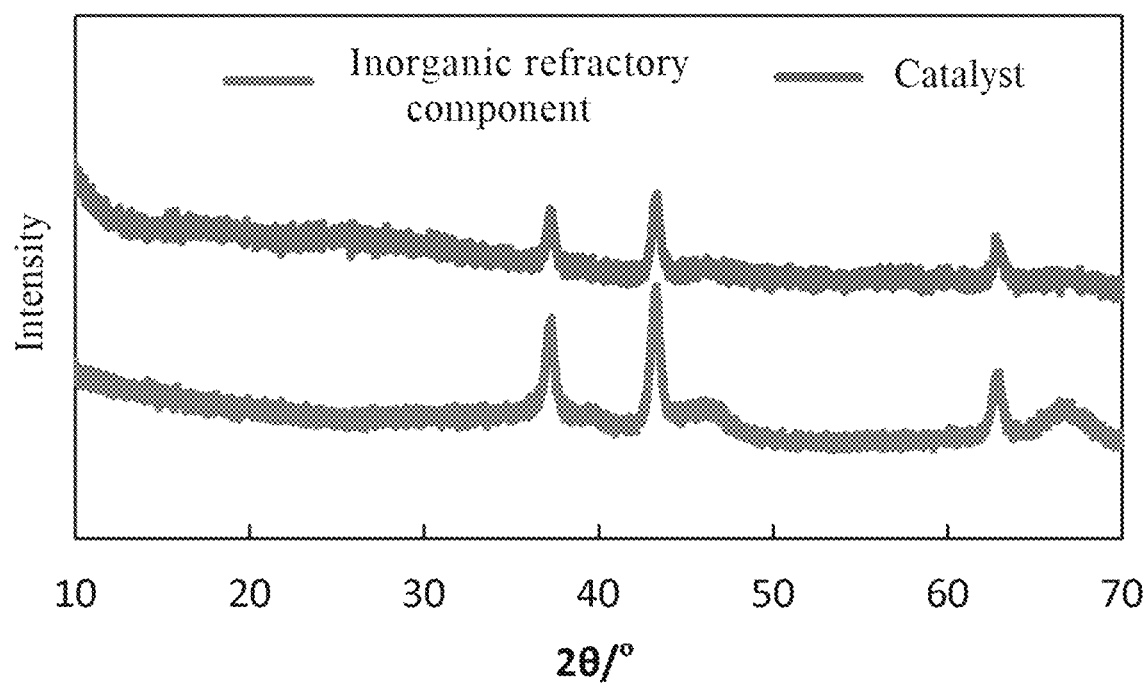

HYDROFINING CATALYST, ITS PREPARATION AND APPLICATION THEREOF

CROSS-REFERENCE TO RELATED APPLICATIONS

The present application is a national stage application of PCT/CN2019/081915 (filed Apr. 9, 2019), which claims the priority of Chinese patent application No. 201810317849.X, titled "Hydrofining catalyst, its preparation, application thereof, and process for hydrofining of distillates", filed before the CNIPA on Apr. 10, 2018, the priority of Chinese patent application No. 201810317845.1, titled "Hydrofining catalyst, its preparation, application thereof, and process for hydrofining of distillates", filed before the CNIPA on Apr. 10, 2018, the priority of Chinese patent application No. 201810316695.2, titled "Hydrofining catalyst system, its application, preparation thereof, and process for hydrofining of distillates", filed before the CNIPA on Apr. 10, 2018, and the priority of Chinese patent application No. 201810317848.5, titled "Hydrofining catalyst system, its application, preparation thereof, and process for hydrofining of distillates", filed before the CNIPA on Apr. 10, 2018, the contents of which are hereby incorporated by reference in their entireties.

TECHNICAL FIELD

The present application relates to the field of hydrofining of distillate oils, particularly to a hydrofining catalyst, its preparation and application thereof.

BACKGROUND ART

Hydrotreating is a mainstay technology of modern oil refining industry, and plays an important role in production of clean fuels, improvement of product quality, full utilization of petroleum resources, pretreatment of raw materials and the like. With the development of economy, environmental protection and society, oil refining enterprises raise higher and higher requirements on the activity and stability of hydrotreating catalysts, and thus the activity and selectivity of hydrofining catalysts must be continuously improved. Among others, the hydrodesulfurization activity is an important index for measuring the performance of the hydrofining catalyst.

Generally speaking, hydrofining catalysts comprise a sulfide of a VIB Group metal (Mo and/or W) as a main active component, and a sulfide of a VIII Group metal (Co and/or Ni) as an auxiliary active component, and the rest of the catalyst is a carrier. Hydrofining catalysts are normally prepared by impregnation methods or kneading methods. Impregnation methods generally comprise the following steps: (1) preparing a shaped alumina carrier by adding an extrusion aid and a binder to pseudo-boehmite powder used as a raw material, shaping, drying at a temperature of 100-200° C. and then calcining at a temperature of 400-1000° C.; (2) formulating a precursor comprising an active metal component into an impregnation solution; (3) impregnating the shaped alumina carrier with the impregnation solution, and then drying and/or calcining to obtain a catalyst in oxidized state. Kneading methods generally comprise the following steps: (1) mixing pseudo-boehmite powder, an active metal precursor (or a solution containing the precursor), an auxiliary agent and a binder to obtain a powder; (2) shaping the mixed powder, and drying and/or calcining to obtain a catalyst in oxidized state. For years, many inventions are developed based on the two methods, in which some operations of the preparation methods are modified, so that the performance of the catalyst is further improved. Other methods for the preparation of hydrogenation catalysts include multi-step impregnation methods, coprecipitation methods and the like, but such methods are complicated and thus are not widely used in industries. However, when used in the treatment of more inferior feedstock oil, the performance of the catalyst prepared by conventional methods still cannot fully meet the requirement.

In addition, research shows that the pore structure of catalysts has a significant influence on the reaction performance thereof, and catalysts should have a proper pore structure to adapt to the diffusion of reactants. Therefore, many patents and research have been directed to the research and development of carriers. With the deterioration of the hydrogenation feedstock, the size of reactant molecules growing bigger and bigger, and carriers having a pore structure with larger channels are required to better meet the requirement of reactant diffusion. Commonly used methods for increasing pore size mainly include mixing different pseudo-boehmite (e.g., CN 1488441A), using pore-expanding agents (e.g., CN1160602A, U.S. Pat. No. 4,448,896, CN1055877C, etc.), and the like. For example, CN101450327A discloses a method in which alumina monohydrate is heat-treated at a temperature of 150-300° C., then mixed with one or more pore-expanding agents selected from the group consisting of graphite, stearic acid, sodium stearate and aluminum stearate, kneaded uniformly, dried at a temperature of 100-150° C. and then calcined at a temperature of 700-1000° C. to obtain an alumina carrier. In the above method using pore-expanding agent, the pore-expanding agent and the pseudo-boehmite are not uniformly mixed, which results in poor pore-expanding effect, and the addition of the pore-expanding agent also increases the cost. CN1087289A discloses a method for the preparation of a macroporous alumina carrier, which comprises the steps of raising the temperature of hydrous pseudo-boehmite from room temperature to 500-650° C. instantly, and keeping at such a high temperature for 2-4 hours. The method makes use of the rapid evaporation of water at high temperature to expand the pores of the carrier, but the activity of the hydrogenation catalyst prepared from the carrier needs to be further improved.

In addition, distillate oils contain, in addition to sulfides, a large amount of nitrides and aromatics, which can interact with the active center of the catalyst and inhibit the activity of the catalyst. The $H_2S$ gradually generated during the reaction can also interact with the active center of the catalyst to inhibit the activity of the catalyst. Furthermore, as the reaction goes deeper, the contents and types of sulfides and nitrides in the material stream may vary greatly, and the impurity content in the diesel oil can be better reduced by selecting a proper hydrodesulfurization catalyst according to the properties of the oil in different reaction stages.

To solve this problem, many patents employ specific grading schemes to combine the overall performance of the catalysts. CN101092573A discloses a grading scheme, in which a reactor is filled with a hydrogenation protective agent, a hydrofining catalyst I, a hydrofining catalyst II and an optional hydrofining catalyst III, the hydrofining catalyst I is a supported metal-based catalyst, with the metal component being a VIB Group metal or VIII Group non-noble metal or a combination thereof; the hydrofining catalyst II contains a silica-alumina carrier, nickel oxide, molybdenum oxide, tungsten oxide, fluorine, phosphorus oxide and other components; the hydrofining catalyst III is a supported metal-based catalyst, with the metal component being a VIB Group metal or VIII Group non-noble metal or a combination thereof. The scheme gives full play to the advantages of each catalyst in different desulfurization stages, and can produce low-sulfur diesel oil meeting Europe III standard and Europe IV standard. However, due to the demand for higher quality diesel oil, the activity of the catalyst needs to be further improved.

CN101591566A discloses a solution in which the reactor is divided into four reaction zones, which are filled sequentially with a hydrogenation protective agent, a hydrofining catalyst I comprising active metal cobalt-molybdenum, a mixture of the hydrofining catalyst I and a hydrofining catalyst II comprising active metal nickel-tungsten, and the hydrofining catalyst II. The catalyst system improves the activity of the whole catalyst through the synergistic effect among the catalysts. However, this system cannot produce diesel oil with lower sulfur content at relatively lower reaction temperatures.

CN102311759A discloses a solution in which two or more beds of mixed catalysts consisting of Mo—Co type catalyst and Mo—Ni type catalyst are provided, with the rated of the Mo—Ni catalyst being gradually increased in those mixed beds.

CN102876374A discloses a solution in which a reactor is divided into four reaction zones, the first reaction zone is filled with a first kind of catalyst, the second reaction zone is filled with a mixture of the first kind of catalyst and a second kind of catalyst, the third reaction zone is filled with a second kind of catalyst, and the fourth reaction zone is filled with the first kind of catalyst, with the first kind of catalyst being a Mo—Co catalyst, and the second kind of catalyst being a W—Mo—Ni catalyst or a W—Ni catalyst. In the patent application, high-sulfur and high-nitrogen poor diesel oils can be treated by means of the grading of different catalysts.

In order to meet stricter oil quality requirements and treat poorer feedstocks, the desulfurization, denitrification and dearomatization performance of the hydrofining catalyst needs to be further improved, and the existing catalyst grading system cannot meet the requirements.

SUMMARY OF THE INVENTION

An object of the present application is to overcome the defects of insufficient activity and small pore size of hydrofining catalysts in the prior art, and to provide a novel hydrofining catalyst having a high catalytic activity and pores with a pore size in the range of 100-300 nm, in which the proportion of the volume of pores having a pore size in the range of 100-300 nm to the total pore volume can be up to 30%.

Another object of the present application is to overcome the defect of insufficient activity of hydrofining catalyst systems in the prior art, and to provide a novel hydrofining catalyst system having at least one of improved desulfurization, denitrification and dearomatization performances in treating low-quality oils.

In order to achieve the above objects, in an aspect, the present application provides a hydrofining catalyst comprising:

an inorganic refractory component comprising a first hydrodesulfurization catalytically active component in a mixture with at least one oxide selected from the group consisting of alumina, silica, magnesia, calcium oxide, zirconia and titanic;

a second hydrodesulfurization catalytically active component supported on the inorganic refractory component; and an organic component supported on the inorganic refractory component and comprising a carboxylic acid and optionally an alcohol.

Preferably, the hydrofining catalyst has pores with pore sizes in the ranges of 2-40 nm and 100-300 nm, respectively, in which the volume of pores having a pore size in the range of 2-40 nm is about 60-95% of the total pore volume and the volume of pores having a pore size in the range of 100-300 nm is about 0.5-30% of the total pore volume, as determined after being calcined at 400° C. for 3 h.

In another aspect, the present application provides a method for preparing a hydrofining catalyst, comprising the steps of:

(1) mixing a precursor of the first hydrodesulfurization catalytically active component with a precursor of at least one oxide selected from the group consisting of alumina, silica, magnesia, calcium oxide, zirconia and titanic, and calcining to obtain an inorganic refractory component;

(2) mixing a precursor of the second hydrodesulfurization catalytically active component with an organic component and optionally a phosphorus-containing compound to obtain an impregnation solution, in which the organic component comprises a carboxylic acid and optionally an alcohol; and (3) mixing the inorganic refractory component with the impregnation solution, and shaping and drying the resulting mixture to obtain the hydrofining catalyst.

In a further aspect, the present application provides a hydrofining catalyst system comprising a first catalyst and a second catalyst, in which the first catalyst is a hydrofining catalyst according to the present application and the second catalyst comprises a second inorganic refractory component comprising alumina, a third hydrodesulfurization catalytically active component supported on the second inorganic refractory component and an organic component supported on the second inorganic refractory component and selected from the group consisting of carboxylic acids and alcohols, and in which the pore size of the second catalyst is concentrated in the range of 2-100 nm, and the volume ratio of the first catalyst to the second catalyst is from about 1:1 to about 1:8.

In yet another aspect, the present application provides a method for preparing a hydrofining catalyst system comprising a first catalyst and a second catalyst, comprising the steps of:

(1) preparing a first catalyst according to the method for preparing a hydrofining catalyst of the present application;

(2) preparing a second catalyst by the steps of:
- (2a) mixing an alumina precursor with an extrusion aid and a peptizing agent, and subjecting the resulting mixture to shaping, drying and calcining sequentially to obtain a second inorganic refractory component;
- (2b) mixing a precursor of a third hydrodesulfurization catalytically active component with an organic component selected from the group consisting of carboxylic acids and alcohols, and optionally a phosphorus-containing compound to obtain a second impregnation solution;
- (2c) mixing the second impregnation solution with the second inorganic refractory component and then drying to obtain the second catalyst; and (3) loading the first catalyst and the second catalyst into a first catalyst bed and a second catalyst bed, respectively, in a volume ratio of about 1:1 to about 1:8 to obtain the hydrofining catalyst system.

In a further aspect, the present application provides the use of a hydrofining catalyst or hydrofining catalyst system according to the present application in the hydrofining of distillate oils.

In a further aspect, the present application provides a process for the hydrofining of distillate oils, comprising the steps of:

subjecting a hydrofining catalyst or hydrofining catalyst system according to the present application to sulfurization; and contacting a distillate oil to be hydrodesulfurized with the sulfurized hydrofining catalyst or hydrofining catalyst system under hydrodesulfurization conditions.

The hydrofining catalyst and hydrofining catalyst system, and methods for preparing the same, of the present application can provide one or more of the following advantages:

1. The pore sizes of the hydrofining catalyst according to the present application are concentrated at 2-40 nm and 100-300 nm, respectively. In poor-quality distillate oils, reactant molecules have a relative larger size, and thus need a relatively larger reaction space. Pore channels in the catalyst with a pore size of 100-300 nm can provide sufficient place for the diffusion of reactants, so that the accessibility of the reactants to the active center can be promoted, thereby improving the performance of the catalyst.

2. The method for preparing the hydrofining catalyst according to the present application is characterized in that a precursor of the carrier is calcined before band extrusion shaping. On one hand, the heat treatment can reduce the number of hydroxyl groups in the particles of the carrier precursor, reduce the probability of pore condensation and increase the pore size of the catalyst; on another hand, the shaped catalyst does not need to be treated at a higher temperature, and the pore wall s of the carrier do not need to be subjected to excessive condensation, so that the utilization of the carrier can be improved; on the other hand, the carrier precursor is subjected to heat treatment before shaping, and a part of secondary particles are also condensed, so that the sizes of the resulting alumina particles become substantially the same, and the channels in the shaped catalyst are more uniform, which is beneficial to the diffusion of reactants. Thus, the catalyst of the present application is more effective than conventional catalysts, especially for heavier and inferior oil products.

3. In the present application, a part of the hydrodesulfurization catalytically active component, more preferably a part of the Group VIII metal, is mixed into the carrier precursor and calcined to form an inorganic refractory powder. Then, an impregnation solution containing the rest of the active component is mixed with the inorganic refractory powder, thereby increasing the content of the active component in the catalyst and improving the hydrofining performance of the catalyst.

4. Compared with the prior art, the method for preparing the hydrofining catalyst according to the present application is short in process, and can greatly save the cost and time for production. On the other hand, the method for preparing the catalyst of the present application can eliminate the need for the peptizing agent of nitric acid and the need for the extrusion aid of sesbania powder, lower the emission of hazardous substances (such as $NO_x$), reduce the cost for materials and environmental protection, and realize a green production of the catalyst.

5. In the catalyst system of the present application, the pore size of the second catalyst is concentrated at 2-100 nm, a small amount of active metal component is used in the preparation process, and an organic carboxylic acid and/or alcohol compound is added, so that the active component is highly dispersed, the active metal can be fully utilized, a catalyst with higher activity can be produced, and the production cost of the catalyst can be greatly reduced.

6. In the present application, the first catalyst and the second catalyst is combined for use, in which the first catalyst with higher activity is used in the first catalyst bed, thereby making full use of the high activity of the catalyst and providing a better removal of impurities in oil products. In addition, because the hydrofining reaction temperature of the second catalyst bed is relatively higher, if the active center is excessively concentrated, more heat will be released, thereby increasing the coking of the catalyst. The active component in the second catalyst of the present application is highly dispersed, and the pore size of the catalyst is relative larger, so that the reaction heat is released in a more moderate manner, and can be quickly taken away by the reaction stream, therefore a better effect of reaction can be achieved.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings:

FIG. 1 shows the XRD pattern of the inorganic refractory component and the catalyst obtained in Example I-8 of the present application.

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entireties.

In the present application, the term "carboxylic acid" refers to an organic compound having the general formula $R(COOH)_n$ that comprises one or more carboxyl groups (—COOH) linked to a hydrocarbon group, in which n is an integer equal to or greater than 1, preferably from 1 to 5, and R is a substituted or unsubstituted aliphatic hydrocarbon group (including alicyclic hydrocarbon groups) or an aromatic hydrocarbon group. The substituent(s) on the hydrocarbon group is not particularly limited, and may include, but is not limited to, alkyl group, halogen, hydroxyl group, and the like. The carboxylic acid may include aliphatic acids and aromatic acids, in accordance with the hydrocarbon group; may include mono-, di- and poly-acids, in accordance with the number of carboxyl groups; and may include saturated acids and unsaturated acids, in accordance with the presence or absence of unsaturated bond(s).

In the present application, the term "alcohol" refers to an organic compound having the general formula $R(OH)_n$ that comprises one or more hydroxyl groups (—OH) linked to a hydrocarbon group, in which n is an integer equal to or greater than 1, preferably from 1 to 5, and R is a substituted or unsubstituted aliphatic hydrocarbon group (including alicyclic hydrocarbon group) or aromatic hydrocarbon group. The substituent(s) on the hydrocarbon group is not particularly limited, and may include, but is not limited to, alkyl group, halogen, and the like. The alcohol may include aliphatic alcohols and aromatic alcohols (including phenols), in accordance with the hydrocarbon group; may include monohydric, dihydric and polyhydric alcohols, in accordance with the number of the hydroxyl group; and may include saturated and unsaturated alcohols, in accordance with the presence or absence of unsaturated bond(s).

In the present application, unless otherwise stated, the specific surface area, pore distribution, pore size (including average pore size) and pore volume (including total pore volume) of the catalyst are determined after being calcined at 400° C. for 3 hours.

In the present application, unless otherwise stated, the specific surface area, and the distribution, size and volume of the pores having a pore size in the range of 2 to 40 nm of the catalyst are determined by the low-temperature nitrogen adsorption method (in accordance with GB/T5816-1995 standard), and the distribution, size and volume of the pores having a pore size in range of 100-300 nm are determined by the mercury intrusion method (in accordance with GB/T21650.1-2008). The volume of the pores having a pore size less than 100 nm of the catalyst is determined by the low-temperature nitrogen adsorption method (according to GB/T5816-1995 standard), the volume of the pores having a pore size no less than 100 nm of the catalyst is determined by the mercury intrusion method (according to GB/T21650.1-2008), and the total pore volume of the catalyst is the sum of the above two pore volumes. The average pore size of the catalyst is calculated using the cylindrical type pore model (i.e. average pore size=total pore volume× 4000/specific surface area).

In the present application, unless otherwise stated, the expressions "pore size in the range of 2-4 nm", "pore size is 2 to 4 nm" or "pore size of 2 to 4 nm" indicate that the pore size is equal to or greater than 2 nm and less than 4 nm; the expressions "pore size in the range of 2 to 40 nm", "pore size is 2 to 40 nm" or "pore size of 2 to 40 nm" indicate that the pore size is equal to or greater than 2 nm and less than 40 nm; the expressions "pore size in the range of 100 to 300 nm", "pore size is 100 to 300 nm" or "pore size of 100 to 300 nm" indicate that the pore size is equal to or greater than 100 nm and less than 300 nm; and the expressions "pore size in the range of 2 to 100 nm", "pore size is 2 to 100 nm" or "pore size of 2 to 100 nm" indicate that the pore size is equal to or greater than 2 nm and less than 100 nm. The expression "average pore size of 5 to 25 nm" indicates that the average of the pore sizes of all pores of the catalyst is no less than 5 nm and no more than 25 nm.

In the present application, the expression "pore size concentrated in the range of 2 to 100 nm" means that the percentage of the volume of pores having a pore size in the range of 2 to 100 nm to the total pore volume is at least about 90%, for example, about 91%, about 92%, about 93%, about 94%, about 95%, about 96%, about 97%, about 98%, about 99%, about 100%, preferably at least about 95%, more preferably at least about 98%, and particularly preferably at least about 99.5%.

In the present application, unless otherwise indicated, the amount (including the ratio to other component(s)) and content of the inorganic refractory component provided, respectively, refer to the total amount and total content, by weight on a dry basis, of those constituents, other than the first hydrodesulfurization catalytically active component, of the inorganic refractory component.

In the present application, unless otherwise stated, the weight on a dry basis of the inorganic refractory powder refers to the weight determined after the calcination of its sample at 600° C. for 4 hours; and the weight on a dry basis of the catalyst refers to the weight determined after the calcination of its sample at 400° C. for 3 hours. Meanwhile, it should be noted that, since the alcohol and the organic carboxylic acid comprised in the catalyst will be decomposed and volatilized at a high temperature, the amount and content of the alcohol and the organic carboxylic acid are not expressed on a dry basis in the present application.

Hydrofining Catalyst

In a first aspect, the present application provides a hydrofining catalyst comprising:

an inorganic refractory component comprising a first hydrodesulfurization catalytically active component in a mixture with at least one oxide selected from the group consisting of alumina, silica, magnesia, calcium oxide, zirconia and titania;

a second hydrodesulfurization catalytically active component supported on the inorganic refractory component; and an organic component supported on the inorganic refractory component and comprising a carboxylic acid and optionally an alcohol, preferably, the hydrofining catalyst has pores with pore sizes in the ranges of 2-40 nm and 100-300 nm, respectively, as determined after being calcined at 400° C. for 3 h, in which the volume of pores having a pore size in the range of 2-40 nm is about 60-95% of the total pore volume and the volume of pores having a pore size in the range of 100-300 nm is about 0.5-30% of the total pore volume.

In a particular embodiment, the inorganic refractory component of the catalyst according to the present application is subjected to a calcination treatment before loading the second hydrodesulphurization catalytically active component and the organic component, the calcination preferably being carried out under the following conditions: a calcining temperature of about 300-900° C., and preferably about 400-700° C.; and a calcining time of about 1-15 hours, preferably about 3-8 hours.

In some embodiments, the catalyst of the present application does not contain any pore-expanding agent, such as carbon black, graphite, stearic acid, sodium stearate, aluminum stearate, and the like, or components like surfactants.

The alumina, silica, magnesia, calcium oxide, zirconia and titania used in the inorganic refractory component of the present application are substantially inert materials and are difficult to combine with a Group VIII element to form a compound with a stable structure, so that the utilization of the Group VIII element can be improved. In addition, the interaction between those materials and other active component in the catalyst is relatively weak, so that the growth of the active phase of the catalyst can be facilitated, and the performance of the catalyst can be enhanced.

Preferably, in the catalyst of the present application, the volume of pores having a pore size in the range of 2-40 nm is about 75-90% of the total pore volume, and the volume of pores having a pore size in the range of 100-300 nm is about 5-15% of the total pore volume. Further preferably, the volume of pores having a pore size in the range of 2-4 nm is no more than about 10% of the total pore volume.

Preferably, the hydrofining catalyst has a specific surface area of about 70-200 m$^2$/g, preferably about 90-180 m$^2$/g, a total pore volume of about 0.15-0.6 mL/g, preferably about 0.2-0.4 mL/g, and an average pore size of 5-25 nm, preferably about 8-15 nm, as determined after being calcined at 400° C. for 3 h.

According to the present application, the hydrodesulphurization catalytically active component may be any component known to be useful as a hydrodesulphurization active component in hydrofining catalysts, for example, the active component may be selected from the group consisting of Group VIII metal elements and Group VIB metal elements. Preferably, the first hydrodesulfurization catalytically active component comprises at least one metal element selected from the group consisting of Group VIII metal elements and Group VIB metal elements and the second hydrodesulfurization catalytically active component comprises at least one Group VIII metal element and at least one Group VIB metal element. Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

In the catalyst of the present application, the content of the active component can be varied within wide limits. Preferably, the total content of the Group VIII metal element in the hydrofining catalyst is about 15-35 wt %, preferably about 20-30 wt %; and the total content of the Group VIB metal element is about 35-75 wt %, preferably about 40-65 wt %, based on the weight on a dry basis of the catalyst and calculated as oxides.

The inventors of the present application have found in research that by comprising part of the hydrodesulfurization catalytically active component, in particular part of the Group VIII metal element(s), in the inorganic refractory component, the content of the active component in the catalyst can be increased, thereby improving the hydrofining performance of the catalyst. The amount of the hydrodesulfurization catalytically active component, such as the Group VIII metal element(s), contained in the inorganic refractory component is not particularly limited and may be selected within a wide range. Preferably, the first hydrodesulfurization catalytically active component contained in the inorganic refractory component may comprise at least one Group VIII metal element in an amount of about 60-90% of the total amount of the Group VIII metal element in the hydrofining catalyst.

Preferably, the total content of those constituents, other than the first hydrodesulfurization catalytically active component, of the inorganic refractory component is about 5-40 wt %, preferably about 10-30 wt %, based on the weight on a dry basis of the catalyst.

The inventors of the present application have found in research that the introduction of a carboxylic acid compound into a hydrofining catalyst can protect the active component of the catalyst and improve the activity of the catalyst, and the further introduction of an alcohol can more effectively protect the active component of the catalyst, and in the case where both of them are present, a synergistic effect can be obtained. Preferably, in the catalyst of the present application, when the organic component comprises only a carboxylic acid, the ratio of the amount by weight of the carboxylic acid to the weight on a dry basis of those constituents, other than the first hydrodesulfurization catalytically active component, of the inorganic refractory component is about 0.1-0.8:1, preferably about 0.2-0.6:1; alternatively, when the organic component comprises both a carboxylic acid and an alcohol, the ratio of the amount by weight of the carboxylic acid to the weight on a dry basis of those constituents, other than the first hydrodesulfurization catalytically active component, of the inorganic refractory component is about 0.002-0.1:1, preferably about 0.02-0.06:1; the ratio of the molar amount of the alcohol to the weight on a dry basis of those constituents, other than the first hydrodesulfurization catalytically active component, of the inorganic refractory component is about 0.005-0.03:1, preferably about 0.01-0.02:1.

In the present application, the carboxylic acid is not particularly limited. Preferably, the carboxylic acid is at least one selected from the group consisting of $C_{1-18}$ monobasic saturated carboxylic acids, for example, C1, C2, C3, C4, C5, C6, C7, C8, C9, C10, C11, C12, C13, C14, C15, C16, C17 and C18 monobasic saturated carboxylic acids, including but not limited to formic acid, acetic acid, propionic acid, octanoic acid, pentanoic acid, hexanoic acid, decanoic acid, octadecanoic acid, and the like; $C_{7-10}$ phenyl acids, for example, C7, C8, C9 and C10 phenyl acids, including but not limited to benzoic acid, phenylacetic acid, phthalic acid and terephthalic acid, and the like; citric acid, adipic acid, malonic acid, succinic acid, maleic acid, tartaric acid, and the like.

In the present application, the alcohol is not particularly limited. Preferably, the alcohol is at least one selected from the group consisting of $C_{1-18}$ monohydric alcohols, preferably $C_{1-10}$ monohydric alcohols, for example, C1, C2, C3, C4, C5, C6, C7, C8, C9 and C10 monohydric alcohols, including but not limited to methanol, ethanol, propanol, isopropanol, butanol, isobutanol, pentanol, heptanol, and the like; ethylene glycol, polyethylene glycol, glycerol, polyglycerol, erythritol, pentaerythritol, xylitol, sorbitol, and trimethylolethane.

In certain preferred embodiments of the present application, to further improve the performance of the catalyst, the hydrofining catalyst may further comprise phosphorus, preferably in the form of $P_2O_5$. Preferably, the phosphorus element is present in an amount of about 0.8-10 wt %, more preferably about 1-8 wt %, based on the weight on a dry basis of the catalyst and calculated as $P_2O_5$.

According to the present application, preferably, the hydrofining catalyst is a shaped catalyst, which preferably has a shape of a cylinder, a clover, a four-leaf clover or a honeycomb.

The pore size of the catalyst according to the present application is concentrated at 2-40 nm and 100-300 nm, respectively, and pore channels having a pore size in the range of 100-300 nm in the catalyst can provide sufficient place for the diffusion of reactants, so that the accessibility of the reactants to the active center can be promoted, thereby improving the performance of the catalyst.

Further, since the inorganic refractory component in the catalyst of the present application has been subjected to a calcination treatment, the XRD patterns of the inorganic refractory component and the hydrofining catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements. The XRD characteristic peaks of these oxides and metal oxides can be referenced to their standard XRD patterns.

Method for Preparing a Hydrofining Catalyst

In a second aspect, the present application provides a method for preparing a hydrofining catalyst, comprising the steps of:

(1) mixing a precursor of a first hydrodesulfurization catalytically active component with a precursor of at least one oxide selected from the group consisting of alumina, silica, magnesia, calcium oxide, zirconia and titania, and calcining to obtain an inorganic refractory component;

(2) mixing a precursor of a second hydrodesulfurization catalytically active component with an organic component and optionally a phosphorus-containing compound to obtain an impregnation solution, in which the organic component comprises a carboxylic acid and optionally an alcohol;

(3) mixing the inorganic refractory component with the impregnation solution, and shaping and drying the resulting mixture to obtain the hydrofining catalyst.

Preferably, the precursor of the first hydrodesulfurization catalytically active component comprises a precursor of at least one metal element selected from the group consisting of Group VIII metal elements and Group VIB metal elements, and the precursor of the second hydrodesulfurization catalytically active component comprises a precursor of at least one Group VIII metal element and a precursor of at least one Group VIB metal element.

Preferably, the precursors of the first and second hydrodesulfurization catalytically active components are used in such amounts that the total content of the Group VIII metal element in the hydrofining catalyst is about 15-35 wt %, preferably about 20-30 wt %, and the total content of the Group VIB metal element in the hydrofining catalyst is about 35-75 wt %, preferably about 40-65 wt %, based on the weight on a dry basis of the catalyst and calculated as oxides.

Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

According to the present application, as the precursors of the first and second hydrodesulfurization catalytically active components, the precursor of the iron element may include, but is not limited to, one or more of iron nitrate, iron oxide, basic iron carbonate, and iron acetate; the precursor of the cobalt element may include, but is not limited to, one or more of cobalt nitrate, basic cobalt carbonate, cobalt acetate and cobalt oxide; the precursor of the nickel element may include, but is not limited to, one or more of nickel nitrate, basic nickel carbonate, nickel acetate and nickel oxide; the precursor of the ruthenium element may include, but is not limited to, one or more of ruthenium nitrate, ruthenium acetate, ruthenium oxide, and ruthenium hydroxide; the precursor of rhodium element may include, but is not limited to, one or more of rhodium nitrate, rhodium hydroxide, and rhodium oxide; the precursor of the palladium element may include, but is not limited to, one or more of palladium nitrate, palladium oxide, and palladium hydroxide; the precursor of the chromium element may include, but is not limited to, one or more of chromium nitrate, chromium oxide, chromium hydroxide and chromium acetate; the precursor of the molybdenum element may include, but is not limited to, one or more of ammonium heptamolybdate, ammonium molybdate, ammonium phosphomolybdate and molybdenum oxide; the precursor of the tungsten element may include, but is not limited to, one or more of ammonium metatungstate, ammonium ethylmetatungstate, and tungsten oxide.

The inventors of the present application have found in research that by combining a part of the precursor of the hydrodesulfurization catalytically active component, particularly a part of the precursor of the Group VIII metal element, into the inorganic refractory component and combining the remaining hydrodesulfurization catalytically active component, such as the remaining of the precursor of the Group VIII metal element and the precursor of the Group VIB metal element, into the impregnation solution to impregnate the inorganic refractory component, the content of the active component in the catalyst can be increased, thereby improving the hydrofining performance of the catalyst. The amount of the precursor of the first hydrodesulfurization catalytically active component used for preparing the inorganic refractory component is not particularly limited and can be selected within wide limits. Preferably, in step (1), the precursor of the first hydrodesulfurization catalytically active component used comprises a precursor of at least one Group VIII metal element in an amount of about 60-90% of the total amount of the precursor of the Group VIII metal element.

According to the present application, in step (1), the precursors of alumina, silica, magnesia, calcium oxide, zirconia and titania may be any known materials that can provide alumina, silica, magnesia, calcium oxide, zirconia and/or titania under calcining conditions. For example, the precursor of the alumina may include, but is not limited to, pseudo-boehmite, aluminum hydroxide powder, aluminum nitrate, aluminum carbonate, aluminum citrate, and the like; the precursor of the silica may include, but is not limited to, silica sol, white carbon black, silica and the like; the precursor of the magnesium oxide may include, but is not limited to, magnesium hydroxide, magnesium nitrate, magnesium carbonate, magnesium acetate, magnesium oxide and the like; the precursor of the calcium oxide may include, but is not limited to, calcium hydroxide, calcium carbonate, calcium oxalate, calcium nitrate, calcium acetate, calcium oxide and the like; the precursor of the zirconia may include, but is not limited to, zirconium hydroxide, zirconium carbonate, zirconium nitrate, zirconium acetate, zirconium oxide, and the like; the precursor of the titania may include, but is not limited to, titanium hydroxide, titanium nitrate, titanium acetate, titanium oxide, and the like.

Preferably, in step (3), the inorganic refractory component is used in such an amount that the total content of those constituents, other than the first hydrodesulfurization catalytically active component, of the inorganic refractory component is about 5-40 wt %, preferably about 10-30 wt %, based on the weight on a dry basis of the hydrofining catalyst.

Preferably, in step (2), when the organic component comprises only a carboxylic acid, the ratio of the weight of the carboxylic acid used to the weight on a dry basis of those constituents, other than the first hydrodesulfurization catalytically active component, of the inorganic refractory component is about 0.1-0.8:1, preferably about 0.2-0.6:1; alternatively, when the organic component comprises both a carboxylic acid and an alcohol, the ratio of the weight of the carboxylic acid used to the weight on a dry basis of those constituents, other than the first hydrodesulfurization catalytically active component, of the inorganic refractory component is about 0.002-0.1:1, preferably about 0.02-0.06:1, and the ratio of the molar amount of the alcohol used to the weight on a dry basis of those constituents, other than the first hydrodesulfurization catalytically active component, of the inorganic refractory component is about 0.005-0.03:1, preferably about 0.01-0.02:1.

According to the present application, the introduction of a carboxylic acid material into the impregnation solution can protect the hydrodesulfurization catalytically active component and facilitate the shaping of the catalyst, and the further introduction of an alcohol can more effectively protect the hydrodesulfurization catalytically active component, thereby effectively improving the performance of the catalyst.

Preferably, to further improve the performance of the final catalyst, the average pore size of the precursors of alumina, silica, magnesia, calcium oxide, zirconia and titania used is not less than about 10 nm. More preferably, in the precursor, the volume of pores having a pore size in the range of 2-6 nm is no more than about 15% of the total pore volume and the volume of pores having a pore size in the range of 6-40 nm is no less than about 75% of the total pore volume.

According to the present application, to further improve the solubility of the precursor of the hydrodesulfurization catalytically active component in the prepared impregnation solution and improve the performance of the final catalyst, a phosphorus-containing compound is preferably added during the preparation of the impregnation solution, and the phosphorus-containing compound is preferably a phosphorus-containing inorganic acid, and is further preferably at least one of phosphoric acid, hypophosphorous acid, ammonium phosphate and ammonium dihydrogen phosphate. Further preferably, the phosphorus-containing compound is used in such an amount that the phosphorus element is present in the final catalyst in an amount of about 0.8-10 wt %, preferably about 1-8 wt %, more preferably about 2-8 wt %, based on the weight on a dry basis of the final catalyst and calculated as $P_2O_5$.

According to the present application, the order of addition of the precursor of the catalytically active component, the organic component including the organic carboxylic acid and the optional organic alcohol compound, and the optional phosphorus-containing compound is not particularly limited when preparing the impregnation solution. In a preferred embodiment, when preparing the impregnation solution, the alcohol compound and precursors comprising the Group VIB metal element and the Group VIII metal element, respectively, are first added to an aqueous solution of the phosphorus-containing compound, and then stirred at about 40-100° C. for about 1-8 hours until all the compounds are dissolved. Finally, the organic carboxylic acid is added until the organic carboxylic acid is completely dissolved.

According to the present application, in the step (1), the calcining conditions may be selected within a wide range, and preferably include a calcining temperature of about 300-900° C., preferably about 400-700° C.; and a calcining time of about 1-15 hours, preferably about 3-8 hours.

According to the present application, in the step (3), the drying conditions may be selected within a wide range, and preferably include a drying temperature of about 50-250° C., preferably about 100-200° C.; and a drying time of about 2-10 hours, preferably about 3-8 hours.

According to the present application, the catalyst can be shaped by various conventional shaping methods, such as band extrusion shaping and rolling ball shaping. The band extrusion shaping can be performed in a manner known in the prior art, where the inorganic refractory component to be shaped by band extrusion and the impregnation solution containing the metal component are uniformly mixed and then extruded into a desired shape, such as a shape of a cylinder, a clover, a four-leaf clover, a honeycomb and the like.

In the prior art, the preparation of a hydrofining catalyst generally comprises the steps of: (1) mixing an alumina precursor (such as pseudo-boehmite), or a mixture thereof with a precursor containing other powder or element, with a peptizing agent and an extrusion aid, (2) shaping the mixture by band extrusion, and (3) calcining the shaped alumina precursor to produce an alumina carrier; (4) preparing an impregnation solution containing a metal component; (5) uniformly impregnating the calcined alumina carrier with the impregnation solution to produce a catalyst precursor; and (6) drying or calcining the catalyst precursor to obtain the hydrofining catalyst. It can be seen that the preparation of the catalyst in the prior art has a long process and high production cost. As mentioned above, the method for preparing the catalyst according to the present application is short in process, and can greatly save the cost and time for production. On the other hand, the method for preparing the catalyst of the present application can eliminate the need for the peptizing agent of nitric acid and the need for the extrusion aid of sesbania powder, lower the emission of hazardous substances (such as $NO_x$), reduce the cost for materials and environmental protection, and realize a green production of the catalyst.

Meanwhile, the inventors of the present application have found in research that the carrier of hydrogenation catalysts is generally obtained by shaping a carrier precursor (such as pseudo-boehmite powder), a peptizing agent and an extrusion aid by band extruding, and then drying and calcining. Because hydrogenation reaction requires the catalyst to have a structure with relatively larger pore channels, and before calcination, the pore size is generally concentrated at 2-12 nm, the pore size of the catalyst is generally increased by calcining the shaped carrier to increase the pore size of the carrier. The pore size of the calcined carrier is generally concentrated at 2-100 nm, and the average pore size of the carrier is increased. It is generally considered that the higher the calcining temperature, the larger the pore size obtained. However, the inventors of the present application have found in research that collapse and condensation of the pore walls of the carrier may occur with an increase of the calcining temperature. Although the condensation of the pore walls may increase the average pore size of the carrier, the condensed pore walls may reduce the utilization of alumina, thereby reducing the catalytic activity of the catalyst. According to the method for preparing a hydrofining catalyst according to the present application, the precursor of the carrier is calcined before extrusion shaping. On one hand, the heat treatment can reduce the number of hydroxyl groups in the particles of the carrier precursor, reduce the probability of pore condensation and increase the pore size of the catalyst; on another hand, the shaped catalyst does not need to be treated at a higher temperature, and the pore walls of the carrier do not need to be subjected to excessive condensation, so that the utilization of the carrier can be improved; on the other hand, the carrier precursor is subjected to heat treatment before shaping, and a part of secondary particles are also condensed, so that the sizes of the resulting alumina particles become substantially the same, and the channels in the shaped catalyst are more uniform, which is beneficial to the diffusion of reactants. Thus, the catalyst of the present application is more effective than conventional catalysts, especially for heavier and inferior oil products.

In addition, the inventors of the present application have found in research that the metal load of the catalyst prepared by the conventional impregnation method is relatively low, the content of Group VIII metal(s) is usually less than 10%, and the content of Group VIB metal(s) is usually less than 35%. This limits the number of metallic active centers in the catalyst and the activity of the catalyst cannot reach a higher level. Preparing the catalyst by the kneading method can improve the active metal load in the catalyst, but the hydrofining activity of the catalyst is not high, and the utilization of the active metal is low. Thus, such method is not generally adopted in the preparation of catalysts recently. In the present application, a part of the precursor of the hydrodesulfurization catalytically active component, preferably a part of the precursor of the Group VIII metal, is mixed into the carrier precursor and calcined to form an inorganic refractory powder. Then, an impregnation solution containing the rest of the precursor of the active metal is mixed with the inorganic refractory powder, thereby increasing the content of the active component in the catalyst and improving the hydrofining performance of the catalyst.

In addition, the pore size of the catalyst prepared by the method of the present application is concentrated at 2-40 nm and 100-300 nm, respectively, and pore channels having a pore size in the range of 100-300 nm can provide a larger place for the diffusion of reactants, so that the accessibility of the reactants to the active center can be promoted, thereby improving the performance of the catalyst.

Further, in the method for preparing a hydrofining catalyst of the present application, since the inorganic refractory component has been subjected to a calcination treatment, the XRD patterns of the resulting inorganic refractory component and the hydrofining catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements. The XRD characteristic peaks of these oxides and metal oxides can be referenced to their standard XRD patterns.

Hydrofining Catalyst System

In a third aspect, the present application provides a hydrofining catalyst system comprising a first catalyst and a second catalyst, in which:

the first catalyst is a hydrofining catalyst according to the present application or a hydrofining catalyst prepared by the method of the present application;

the second catalyst comprises a second inorganic refractory component comprising alumina, a third hydrodesulfurization catalytically active component supported on the second inorganic refractory component, and an organic component supported on the second inorganic refractory component, in which the pore size of the second catalyst is concentrated in the range of 2-100 nm;

in which the volume ratio of the first catalyst to the second catalyst is from about 1:1 to about 1:8, preferably from about 1:2 to about 1:6.

In a specific embodiment, the hydrofining catalyst system of the present application comprises a first catalyst disposed within a first catalyst bed and a second catalyst disposed within a second catalyst bed, in which:

the first catalyst comprises:

a first inorganic refractory component comprising a first hydrodesulfurization catalytically active component in a mixture with at least one oxide selected from the group consisting of alumina, silica, magnesia, calcium oxide, zirconia and titania;

a second hydrodesulfurization catalytically active component supported on the first inorganic refractory component; and an organic component supported on the first inorganic refractory component, the organic component comprising a carboxylic acid and optionally an alcohol, preferably, the first catalyst has pores with pore sizes in the ranges of 2-40 nm and 100-300 nm, respectively, in which the volume of pores having a pore size in the range of 2-40 nm is about 60-95% of the total pore volume and the volume of pores having a pore size in the range of 100-300 nm is about 0.5-30% of the total pore volume, as determined after being calcined at 400° C. for 3 h;

the second catalyst comprises a second inorganic refractory component comprising alumina, a third hydrodesulfurization catalytically active component supported on the second inorganic refractory component, and an organic component supported on the second inorganic refractory component, in which the pore size of the second catalyst is concentrated in the range of 2-100 nm;

in which the volume ratio of the first catalyst to the second catalyst is from about 1:1 to about 1:8, preferably from about 1:2 to about 1:6.

First Catalyst

As described above, the first catalyst of the present application comprises:

a first inorganic refractory component comprising a first hydrodesulfurization catalytically active component in a mixture with at least one oxide selected from the group consisting of alumina, silica, magnesia, calcium oxide, zirconia and titania;

a second hydrodesulfurization catalytically active component supported on the first inorganic refractory component; and an organic component supported on the first inorganic refractory component, the organic component comprising a carboxylic acid and optionally an alcohol, preferably, the first catalyst has pores with pore sizes in the ranges of 2-40 nm and 100-300 nm, respectively, in which the volume of pores having a pore size in the range of 2-40 nm is about 60-95% of the total pore volume and the volume of pores having a pore size in the range of 100-300 nm is about 0.5-30% of the total pore volume, as determined after being calcined at 400° C. for 3 h.

In a particular embodiment, the first inorganic refractory component of the first catalyst is subjected to a calcination treatment before loading the second hydrodesulfurization catalytically active component and the organic component, the calcination preferably being carried out under the following conditions: a calcining temperature of about 300-900° C., and preferably about 400-700° C.; and a calcining time of about 1-15 hours, preferably about 3-8 hours.

In some particular embodiments, the first catalyst of the present application does not contain any pore-expanding agent, such as carbon black, graphite, stearic acid, sodium stearate, aluminum stearate, and the like, nor any surfactant, or the like.

The alumina, silica, magnesia, calcium oxide, zirconia and titania used in the first inorganic refractory component of the present application are substantially inert materials and can hardly be combined with a Group VIII element to form a compound stable in structure, and thus the utilization of the Group VIII element can be improved. In addition, the interaction between those materials and other active component in the catalyst is relatively weak, so that the growth of the active phase of the catalyst can be facilitated, and the performance of the first catalyst can be enhanced.

Preferably, in the first catalyst of the present application, the volume of pores having a pore size in the range of 2-40 nm is about 75-90% of the total pore volume and the volume of pores having a pore size in the range of 100-300 nm is about 5-15% of the total pore volume. Further preferably, the volume of pores having a pore size in the range of 2-4 nm is no more than about 10% of the total pore volume.

Preferably, the first catalyst has a specific surface area of about 70-200 m$^2$/g, preferably about 90-180 m$^2$/g, a total pore volume of about 0.15-0.6 mL/g, preferably about 0.2-0.4 mL/g, and an average pore size of 5-25 nm, preferably about 8-15 nm, as determined after being calcined at 400° C. for 3 hours.

According to the present application, the hydrodesulphurization catalytically active component of the first catalyst may be any component known to be useful as a hydrodesulphurization active component in hydrofining catalysts, for example, the active component may be selected from the group consisting of Group VIII metal elements and Group VIB metal elements. Preferably, the first hydrodesulfurization catalytically active component comprises at least one metal element selected from the group consisting of Group VIII metal elements and Group VIB metal elements and the second hydrodesulfurization catalytically active component comprises at least one Group VIII metal element and at least one Group VIB metal element. Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

The content of the active component in the first catalyst may vary within wide limits. Preferably, the total content of the Group VIII metal element in the first catalyst is about 15-35 wt %, preferably about 20-30 wt %; and the total content of the Group VIB metal element is about 35-75 wt %, preferably about 40-65 wt %, based on the weight on a dry basis of the first catalyst and calculated as oxides.

The inventors of the present application have found in research that by including a part of the hydrodesulfurization catalytically active component, in particular a part of the Group VIII metal element, in the first inorganic refractory component, the content of the active component in the first catalyst can be increased, thereby improving the hydrofining performance of the first catalyst. The amount of the hydrodesulfurization catalytically active component, such as the Group VIII metal element, contained in the first inorganic refractory component is not particularly limited and may be selected within a wide range. Preferably, the first hydrodesulfurization catalytically active component contained in the first inorganic refractory component comprises at least one Group VIII metal element in an amount of about 60-90% of the total amount of the Group VIII metal element in the first catalyst.

Preferably, the total content of those constituents, other than the first hydrodesulfurization catalytically active component, of the first inorganic refractory component is about 5-40 wt %, more preferably about 10-30 wt %, based on the weight on a. dry basis of the first catalyst.

The inventors of the present application have found in research that the introduction of a carboxylic acid compound into the first catalyst can protect the active component of the catalyst and improve the activity of the catalyst, while the further introduction of an alcohol, preferably an organic alcohol compound, can more effectively protect the active component of the catalyst, and in the case where both of them are present, a synergistic effect can be obtained. Preferably, in the first catalyst, when the organic component comprises only a carboxylic acid, the ratio of the amount by weight of the carboxylic acid to the weight on a dry basis of those constituents, other than the first hydrodesulfurization catalytically active component, of the first inorganic refractory component is about 0.1-0.8:1, preferably about 0.2-0.6:1; or when the organic component comprises both a carboxylic acid and an alcohol, the ratio of the amount by weight of the carboxylic acid to the weight on a dry basis of those constituents, other than the first hydrodesulfurization catalytically active component, of the first inorganic refractory component is about 0.002-0.1:1, preferably about 0.02-0.06:1; the ratio of the molar amount of the alcohol to the weight on a dry basis of those constituents, other than the first hydrodesulfurization catalytically active component, of the first inorganic refractory component is about 0.005-0.03:1, preferably about 0.01-0.02:1.

In the present application, the carboxylic acid is not particularly limited. Preferably, the carboxylic acid is at least one selected from the group consisting of $C_{1-18}$ monobasic saturated carboxylic acids, for example, C1, C2, C3, C4, C5, C6, C7, C8, C9, C10, C11, C12, C13, C14, C15, C16, C17 and C18 monobasic saturated carboxylic acids, including but not limited to formic acid, acetic acid, propionic acid, octanoic acid, pentanoic acid, hexanoic acid, decanoic acid, octadecanoic acid, and the like; $C_{7-10}$ phenyl acids, for example, C7, C8, C9 and C10 phenyl acids, including but not limited to benzoic acid, phenylacetic acid, phthalic acid and terephthalic acid, and the like; citric acid, adipic acid, malonic acid, succinic acid, maleic acid, tartaric acid, and the like.

In the present application, the alcohol is not particularly limited. Preferably, the alcohol is at least one selected from the group consisting of $C_{1-18}$ monohydric alcohols, preferably $C_{1-10}$ monohydric alcohols, for example, C1, C2, C3, C4, C5, C6, C7, C8, C9 and C10 monohydric alcohols, including but not limited to methanol, ethanol, propanol, isopropanol, butanol, isobutanol, pentanol, heptanol, and the like; ethylene glycol, polyethylene glycol, glycerol, polyglycerol, erythritol, pentaerythritol, xylitol, sorbitol, and trimethylolethane.

In certain preferred embodiments of the present application, to further improve the performance of the catalyst, the first catalyst may further comprise phosphorus, preferably in the form of $P_2O_5$. Preferably, the phosphorus element is present in an amount of about 0.8-10 wt %, more preferably about 1-8 wt %, based on the weight on a dry basis of the first catalyst and calculated as $P_2O_5$.

According to the present application, preferably, the first catalyst is a shaped catalyst, which preferably has a shape of a cylinder, a clover, a four-leaf clover or a honeycomb.

The pore size of the first catalyst is concentrated at 2-40 nm and 100-300 nm, respectively, and pore channels having a pore size in the range of 100-300 nm in the catalyst can provide sufficient place for the diffusion of reactants, so that the accessibility of the reactants to the active center can be promoted, thereby improving the performance of the catalyst.

Further, in the first catalyst of the hydrofining catalyst system of the present application, since the first inorganic refractory component has been subjected to a calcination treatment, the XRD patterns of the first inorganic refractory component and the first catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements. The XRD characteristic peaks of these oxides and metal oxides can be referenced to their standard XRD patterns.

Second Catalyst

As described above, the second catalyst of the present application comprises a second inorganic refractory component comprising alumina, a third hydrodesulfurization catalytically active component supported on the second inorganic refractory component, and an organic component supported on the second inorganic refractory component, in which the pore size of the second catalyst is concentrated in the range of 2 to 100 nm.

According to the present application, the specific surface area and the distribution, size and volume of the pores having a pore size in the range of 2-100 nm of the second catalyst are determined by the low-temperature nitrogen adsorption method (in accordance with GB/T5816-1995 standard). The average pore size is calculated using the cylindrical type pore model (i.e. average pore size=total pore volume×4000/specific surface area).

Preferably, the second catalyst has a specific surface area of about 130-300 $m^2$/g, preferably about 160-270 $m^2$/g, a pore volume of about 0.2-0.7 mL/g, preferably about 0.3-0.6 mL/g, and an average pore size of 6-20 nm, preferably about 7-15 nm, as determined after being calcined at 400° C. for 3 h.

According to the present application, the third hydrodesulphurization catalytically active component may be any component known to be useful as a hydrodesulphurization active component in hydrofining catalysts, for example, the active component may be selected from the group consisting of Group VIII metal elements and Group VIB metal elements. Preferably, said third hydrodesulfurization catalytically active component comprises at least one Group VIII metal element and at least one Group VIB metal element.

Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

The content of the active component in the second catalyst may vary within wide limits. Preferably, in the second catalyst, the total content of the Group VIII metal element is about 1-8 wt %, preferably about 2-6 wt %; and the total content of the Group VIB metal element is about 10-35 wt %, preferably about 15-30 wt %, based on the weight on a dry basis of the second catalyst and calculated as oxides.

Preferably, according to the present application, the second inorganic refractory component is present in an amount of about 60-85 wt %, more preferably about 70-80 wt %, based on the weight on a dry basis of the second catalyst. The second inorganic refractory component is preferably alumina, and the interaction between the alumina and the active component is relatively strong, so that a high dispersion of the active component can be ensured, and a relatively large number of active centers can be generated at a low content of the active component, thereby improving the performance of the second catalyst.

The inventors of the present application have found in research that the introduction of an organic component selected from the group consisting of carboxylic acids and alcohols into the second catalyst can effectively protect the catalytically active component and make the dispersion of the active component better, resulting in more active centers. Preferably, the molar ratio of the organic component to the Group VIII element of the second catalyst is about 0.5-8, preferably about 1-5.

In the present application, the carboxylic acid is not particularly limited. Preferably, the carboxylic acid is at least one selected from the group consisting of $C_{1-18}$ monobasic saturated carboxylic acids, for example, C1, C2, C3, C4, C5, C6, C7, C8, C9, C10, C11, C12, C13, C14, C15, C16, C17 and C18 monobasic saturated carboxylic acids, including but not limited to formic acid, acetic acid, propionic acid, octanoic acid, pentanoic acid, hexanoic acid, decanoic acid, octadecanoic acid, and the like; $C_{7-10}$ phenyl acids, for example, C7, C8, C9 and C10 phenyl acids, including but not limited to benzoic acid, phenylacetic acid, phthalic acid and terephthalic acid, and the like; citric acid, adipic acid, malonic acid, succinic acid, maleic acid, tartaric acid, and the like.

In the present application, the alcohol is not particularly limited. Preferably, the alcohol is at least one selected from the group consisting of $C_{1-18}$ monohydric alcohols, preferably $C_{1-10}$ monohydric alcohols, for example, C1, C2, C3, C4, C5, C6, C7, C8, C9 and C10 monohydric alcohols, including but not limited to methanol, ethanol, propanol, isopropanol, butanol, isobutanol, pentanol, heptanol, and the like; ethylene glycol, polyethylene glycol, glycerol, polyglycerol, erythritol, pentaerythritol, xylitol, sorbitol, and trimethylolethane.

In certain preferred embodiments of the present application, to further improve the performance of the catalyst, the second catalyst may further comprise phosphorus, preferably in the form of $P_2O_5$. Preferably, the phosphorus element is present in an amount of about 0.8-10 wt %, more preferably about 1-8 wt %, based on the weight on a dry basis of the second catalyst and calculated as $P_2O_5$.

According to the present application, preferably, the second catalyst is a shaped catalyst, which preferably has a shape of a cylinder, a clover, a four-leaf clover or a honeycomb.

According to the present application, since the first catalyst has a relatively higher activity, the cost of the entire catalyst system can be reduced by using a small amount of the first catalyst in the first bed of the catalyst system. The second catalyst has a well dispersion of the active component, and thus can withstand the harsh reaction conditions of the second bed; and the second catalyst has a relatively lower content of active metal and thus is lower in cost. By using a combination of the two catalysts, the goal of improving the catalytic activity can be achieved with a good control of the cost of the catalyst system.

In addition, the first catalyst with a relatively higher activity is used in the first bed, so that the high activity of the catalyst can be fully utilized, and impurities in the oil product can be better removed. Meanwhile, the temperature of the hydrofining reaction in the lower catalyst layer is relatively higher, and therefore, if the active centers are too concentrated, more heat will be released, causing an increase of the coking of the catalyst. The active component in the second catalyst of the present application is highly dispersed, and the pore size of the catalyst is relatively large, so that the reaction heat is released in a more moderate manner, and can be quickly taken away by the reaction stream, therefore a better effect of reaction can be achieved.

Method for Preparing a Hydrofining Catalyst System

In a fourth aspect, the present application provides a method for preparing a hydrofining catalyst system comprising a first catalyst and a second catalyst, comprising the steps of:

(1) preparing the first catalyst according to the method for preparing a hydrofining catalyst of the present application;
(2) preparing the second catalyst by the steps of:
  (2a) mixing an alumina precursor with an extrusion aid and a peptizing agent, and subjecting the resulting mixture to shaping, drying and calcining sequentially to obtain a second inorganic refractory component;
  (2b) mixing a precursor of a third hydrodesulfurization catalytically active component with an organic component selected from the group consisting of carboxylic acids and alcohols and optionally a phosphorus-containing compound to obtain a second impregnation solution;
  (2c) mixing the second impregnation solution with the second inorganic refractory component and then drying to obtain the second catalyst; and
(3) loading the first catalyst and the second catalyst into a first catalyst bed and a second catalyst bed, respectively, in a volume ratio of about 1:1 to about 1:8, preferably about 1:2 to about 1:6 to obtain the hydrofining catalyst system.

In a specific embodiment, the method for preparing a hydrofining catalyst system of the present application comprises the steps of:

(1) preparing the first catalyst by the steps of:
  (1a) mixing a precursor of a first hydrodesulfurization catalytically active component with a precursor of at least one oxide selected from the group consisting of alumina, silica, magnesia, calcium oxide, zirconia and titania, and calcining to obtain a first inorganic refractory component;
  (1b) mixing a precursor of a second hydrodesulfurization catalytically active component with an organic component and optionally a phosphorus-containing compound to obtain a first impregnation solution, in which the organic component comprises a carboxylic acid and optionally an alcohol;
  (1c) mixing the first inorganic refractory component with the first impregnation solution, shaping and drying the resulting mixture to obtain the first catalyst;
(2) preparing the second catalyst by the steps of:
  (2a) mixing an alumina precursor with an extrusion aid and a peptizing agent, and subjecting the resulting mixture to shaping, drying and calcining sequentially to obtain a second inorganic refractory component;
  (2b) mixing a precursor of a third hydrodesulfurization catalytically active component with an organic component selected from the group consisting of carboxylic acids and alcohols and optionally a phosphorus-containing compound to obtain a second impregnation solution;
  (2c) mixing the second impregnation solution with the second inorganic refractory component and then drying to obtain the second catalyst; and
(3) loading the first catalyst and the second catalyst into a first catalyst bed and a second catalyst bed, respectively, in a volume ratio of about 1:1 to about 1:8, preferably about 1:2 to about 1:6 to obtain the hydrofining catalyst system.

Preparation of the First Catalyst

As described above, the preparation of the first catalyst of the present application comprises the steps of:

(1a) mixing a precursor of a first hydrodesulfurization catalytically active component with a precursor of at least one oxide selected from the group consisting of alumina, silica, magnesia, calcium oxide, zirconia and titania, and calcining to obtain a first inorganic refractory component;
(1b) mixing a precursor of a second hydrodesulfurization catalytically active component with an organic component and optionally a phosphorus-containing compound to obtain a first impregnation solution, in which the organic component comprises a carboxylic acid and optionally an alcohol; and
(1c) mixing the first inorganic refractory component with the first impregnation solution, shaping and drying the resulting mixture to obtain the first catalyst.

Preferably, the precursor of the first hydrodesulfurization catalytically active component comprises a precursor of at least one metal element selected from the group consisting of Group VIII metal elements and Group VIB metal elements, and the precursor of the second hydrodesulfurization catalytically active component comprises a precursor of at least one Group VIII metal element and a precursor of at least one Group VIB metal element.

Preferably, the precursors of the first and second hydrodesulfurization catalytically active components are used in such amounts that, in the first catalyst, the total content of the Group VIII metal element is about 15-35 wt %, preferably about 20-30 wt %, and the total content of the Group VIB metal element is about 35-75 wt %, preferably about 40-65 wt %, based on the weight on a dry basis of the catalyst and calculated as oxides.

Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

According to the present application, in the precursors of the first and second hydrodesulfurization catalytically active components, the precursor of the iron element may include, but is not limited to, one or more of iron nitrate, iron oxide, basic iron carbonate, and iron acetate; the precursor of the cobalt element may include, but is not limited to, one or more of cobalt nitrate, basic cobalt carbonate, cobalt acetate and cobalt oxide; the precursor of the nickel element may include, but is not limited to, one or more of nickel nitrate, basic nickel carbonate, nickel acetate and nickel oxide; the precursor of the ruthenium element may include, but is not limited to, one or more of ruthenium nitrate, ruthenium acetate, ruthenium oxide, and ruthenium hydroxide; the precursor of rhodium element may include, but is not limited to, one or more of rhodium nitrate, rhodium hydroxide, and rhodium oxide; the precursor of the palladium element may include, but is not limited to, one or more of palladium nitrate, palladium oxide, and palladium hydroxide; the precursor of the chromium element may include, but is not limited to, one or more of chromium nitrate, chromium oxide, chromium hydroxide and chromium acetate; the precursor of the molybdenum element may include, but is not limited to, one or more of ammonium heptamolybdate, ammonium molybdate, ammonium phosphomolybdate and molybdenum oxide; the precursor of the tungsten element may include, but is not limited to, one or more of ammonium metatungstate, ammonium ethylmetatungstate, and tungsten oxide.

The inventors of the present application have found in research that, by combining a part of the precursor of the hydrodesulfurization catalytically active component, particularly a part of the precursor of the Group VIII metal element, into the first inorganic refractory component and combining the rest of the hydrodesulfurization catalytically active component, such as the rest of the precursor of the Group VIII metal element and the rest of the precursor of the Group VIB metal element, into the first impregnation solution to impregnate the first inorganic refractory component, the content of the active component in the first catalyst can be increased, and the hydrofining performance of the first catalyst can be improved. The amount of the precursor of the first hydrodesulfurization catalytically active component used for preparing the first inorganic refractory component is not particularly limited and may be selected within wide limits. Preferably, in step (1a), the precursor of the first hydrodesulfurization catalytically active component used comprises a precursor of at least one Group VIII metal element in an amount of about 60-90% of the total amount of the precursor of the Group VIII metal element.

According to the present application, in step (1a), the precursors of alumina, silica, magnesia, calcium oxide, zirconia and titania may be any known materials that can provide alumina, silica, magnesia, calcium oxide, zirconia and/or titania under calcining conditions. For example, the precursor of the alumina may include, but is not limited to, pseudo-boehmite, aluminum hydroxide powder, aluminum nitrate, aluminum carbonate, aluminum citrate, and the like; the precursor of the silica may include, but is not limited to, silica sol, white carbon black, silica and the like; the precursor of the magnesium oxide may include, but is not limited to, magnesium hydroxide, magnesium nitrate, magnesium carbonate, magnesium acetate, magnesium oxide and the like; the precursor of the calcium oxide may include, but is not limited to, calcium hydroxide, calcium carbonate, calcium oxalate, calcium nitrate, calcium acetate, calcium oxide and the like; the precursor of the zirconia may include, but is not limited to, zirconium hydroxide, zirconium carbonate, zirconium nitrate, zirconium acetate, zirconium oxide, and the like; the precursor of the titania may include, but is not limited to, titanium hydroxide, titanium nitrate, titanium acetate, titanium oxide, and the like.

Preferably, in step (1c), the first inorganic refractory component is used in such an amount that the total content of those constituents, other than the first hydrodesulfurization catalytically active component, of the first inorganic refractory component in the first catalyst is about 5-40 wt %, preferably about 10-30 wt %, based on the weight on a dry basis of the first catalyst.

Preferably, in step (1b), when the organic component comprises only a carboxylic acid, the ratio of the weight of the carboxylic acid used to the weight on a dry basis of those constituents, other than the first hydrodesulfurization catalytically active component, of the first inorganic refractory component is about 0.1-0.8:1, preferably about 0.2-0.6:1; alternatively, when the organic component comprises both a carboxylic acid and an alcohol, the ratio of the weight of the carboxylic acid used to the weight on a dry basis of those constituents, other than the first hydrodesulfurization catalytically active component, of the first inorganic refractory component is about 0.002-0.1:1, preferably about 0.02-0.06:1, and the ratio of the molar amount of the alcohol used to the weight on a dry basis of those constituents, other than the first hydrodesulfurization catalytically active component, of the first inorganic refractory component is about 0.005-0.03:1, preferably about 0.01-0.02:1.

According to the present application, the introduction of the carboxylic acid material into the first impregnation solution can protect the hydrodesulfurization catalytically active component and promote the shaping of the catalyst, and the further introduction of the alcohol can more effectively protect the hydrodesulfurization catalytically active component, so that the performance of the first catalyst can be effectively improved.

Preferably, to further improve the performance of the finally obtained first catalyst, the average pore size of the precursors of alumina, silica, magnesia, calcium oxide, zirconia and titanic used is not less than 10 nm. More preferably, in the precursor, the volume of pores having a pore size in the range of 2-6 nm is no more than about 15% of the total pore volume and the volume of pores having a pore size in the range of 6-40 nm is no less than about 75% of the total pore volume.

According to the present application, to further improve the solubility of the precursor of the hydrodesulfurization catalytically active component in the prepared first impregnation solution and improve the performance of the finally obtained first catalyst, a phosphorus-containing compound is preferably added during the preparation of the first impregnation solution, and the phosphorus-containing compound is preferably a phosphorus-containing inorganic acid, and is further preferably at least one of phosphoric acid, hypophosphorous acid, ammonium phosphate and ammonium dihydrogen phosphate. Further preferably, the phosphorus-containing compound is used in such an amount that the phosphorus element is present in the finally obtained first catalyst in an amount of about 0.8-10 wt %, preferably about 1-8 wt %, more preferably about 2-8 wt %, on a dry basis and calculated as $P_2O_5$.

According to the present application, the order of addition of the precursor of the catalytically active component, the organic component including the organic carboxylic acid and the optional organic alcohol compound, and the optional phosphorus-containing compound is not particularly limited when preparing the first impregnation solution. In a preferred embodiment, when preparing the first impregnation solution, the alcohol compound and the precursors containing the Group VIB metal element and the Group VIII metal element, respectively, are first added to an aqueous solution of the phosphorus-containing compound, and then stirred at about 40-100° C. for about 1-8 hours until all materials are dissolved. Finally, the organic carboxylic acid is added until the organic carboxylic acid is completely dissolved.

According to the present application, in the step (1a), the calcining conditions may be selected within a wide range, and preferably include a calcining temperature of about 300-900° C., preferably about 400-700° C.; and a calcining time of about 1-15 hours, preferably about 3-8 hours.

According to the present application, in the step (1c), the drying conditions may be selected within a wide range, and preferably include a drying temperature of about 50-250° C., preferably about 100-200° C.; and a drying time of about 2-10 hours, preferably about 3-8 hours.

According to the present application, the first catalyst may be shaped by various conventional shaping methods, for example, band extrusion shaping or rolling ball shaping. The band extrusion shaping can be performed in a manner known in the prior art, where the first inorganic refractory component to be shaped by band extrusion and the first impregnation solution containing the metal component are uniformly mixed and then extruded into a desired shape, such as a shape of a cylinder, a clover, a four-leaf clover, a honeycomb and the like.

In the preparation of the first catalyst of the present application, the precursor of the carrier is calcined before band extrusion shaping. On one hand, the heat treatment can reduce the number of hydroxyl groups in the particles of the carrier precursor, reduce the probability of pore condensation and increase the pore size of the catalyst; on another hand, the shaped catalyst does not need to be treated at a higher temperature, and the pore walls of the carrier do not need to be subjected to excessive condensation, so that the utilization of the carrier can be improved; on the other hand, the carrier precursor is subjected to heat treatment before shaping, and a part of secondary particles are also condensed, so that the sizes of the resulting alumina particles become substantially the same, and the channels in the shaped catalyst are more uniform, which is beneficial to the diffusion of reactants. Thus, when used in combination with a catalyst prepared using a carrier obtained by conventional methods, the first catalyst of the present application is more effective, especially for heavier and inferior oil products.

In the preparation of the first catalyst of the present application, a part of the hydrodesulfurization catalytically active component, more preferably a part of the Group VIII metal, is mixed into the carrier precursor and calcined to form an inorganic refractory powder. Then, an impregnation solution containing the rest of the active component is mixed with the inorganic refractory powder, thereby increasing the content of the active component in the catalyst and improving the hydrofining performance of the catalyst.

Furthermore, the method for preparing the first catalyst according to the present application is short in process, and can greatly save the cost and time for production. On the other hand, the method for preparing the first catalyst of the present application can eliminate the need for the peptizing agent of nitric acid and the need for the extrusion aid of sesbania powder, lower the emission of hazardous substances (such as $NO_x$), reduce the cost for materials and environmental protection, and realize a green production of the catalyst.

In addition, the pore size of the first catalyst prepared by the above-described steps is concentrated at 2-40 nm and 100-300 nm, respectively, in which pore channels having a pore size in the range of 100-300 nm can provide a larger place for the diffusion of reactants, so that the accessibility of the reactants to the active center can be promoted, thereby improving the performance of the first catalyst.

Further, in the method for preparing a hydrofining catalyst system of the present application, since the first inorganic refractory component in the first catalyst has been subjected to a calcination treatment, the XRD patterns of the first inorganic refractory component and the first catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements. The XRD characteristic peaks of these oxides and metal oxides can be referenced to their standard XRD patterns.

Preparation of the Second Catalyst

As described above, the preparation of the second catalyst of the present application comprises the steps of:

(2a) mixing an alumina precursor with an extrusion aid and a peptizing agent, and subjecting the resulting mixture to shaping, drying and calcining sequentially to obtain a second inorganic refractory component;

(2b) mixing a precursor of a third hydrodesulfurization catalytically active component with an organic component selected from the group consisting of carboxylic acids and alcohols and optionally a phosphorus-containing compound to obtain a second impregnation solution; and (2c) mixing the second impregnation solution with the second inorganic refractory component and then drying to obtain the second catalyst.

According to the present application, said precursor of the third hydrodesulfurization catalytically active component may be selected from precursors of Group VIII metal elements and Group VIB metal elements, preferably comprising a precursor of at least one Group VIII metal element and a precursor of at least one Group VIB metal element. Preferably, the precursors of the Group VIII and VIB metal elements are used in such amounts that the total content of the Group VIII metal element is about 1-8 wt %, preferably about 2-6 wt %; and the total content of the Group VIB metal element is about 10-35 wt %, preferably about 15-30 wt %, based on the weight on a dry basis of the second catalyst and calculated as oxides. Further preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

According to the present application, in the precursor of the third hydrodesulfurization catalytically active component, the precursor of the iron element may include, but is not limited to, one or more of iron nitrate, iron oxide, basic iron carbonate and iron acetate; the precursor of the cobalt element may include, but is not limited to, one or more of cobalt nitrate, basic cobalt carbonate, cobalt acetate and cobalt oxide; the precursor of the nickel element may include, but is not limited to, one or more of nickel nitrate, basic nickel carbonate, nickel acetate and nickel oxide; the precursor of the ruthenium element may include, but is not limited to, one or more of ruthenium nitrate, ruthenium acetate, ruthenium oxide, and ruthenium hydroxide; the precursor of rhodium element may include, but is not limited to, one or more of rhodium nitrate, rhodium hydroxide, and rhodium oxide; the precursor of the palladium element may include, but is not limited to, one or more of palladium nitrate, palladium oxide, and palladium hydroxide; the precursor of the chromium element may include, but is not limited to, one or more of chromium nitrate, chromium oxide, chromium hydroxide and chromium acetate; the precursor of the molybdenum element may include, but is not limited to, one or more of ammonium heptamolybdate, ammonium molybdate, ammonium phosphomolybdate and molybdenum oxide; the precursor of the tungsten element may include, but is not limited to, one or more of ammonium metatungstate, ammonium ethylmetatungstate, and tungsten oxide.

In step (2c), the second inorganic refractory component is used in such an amount that the second inorganic refractory component is present in the second catalyst in an amount of about 60-85 wt %, preferably about 70-80 wt %, based on the weight on a dry basis of the second catalyst. The second inorganic refractory component is preferably alumina, and the interaction between the alumina and the active component is relatively strong, so that a high dispersion of the active component can be ensured, and a relatively large number of active centers can be generated at a low content of the active component, thereby improving the performance of the second catalyst.

In the step (2a), the alumina precursor may be one or more of pseudo-boehmite, aluminum hydroxide powder, aluminum nitrate, aluminum carbonate, aluminum citrate and the like. Preferably, the alumina precursor is pseudo-boehmite powder, more preferably the pseudo-boehmite powder has a specific surface area of about 250-450 $m^2/g$, preferably about 280-400 $m^2/g$, and a total pore volume of about 0.85-1.4 mL/g, preferably about 0.9-1.2 mL/g. Further preferably, the conditions used in step (2a) are such that, in the resulting second inorganic refractory component (preferably an alumina carrier), the volume of pores having a pore size in the range of 2-4 nm is about 0-2% of the total pore volume, the volume of pores having a pore size in the range of 4-6 nm is about 2-15% of the total pore volume, the volume of pores having a pore size in the range of 6-40 nm is about 85-95% of the total pore volume, the remaining pores have a pore size in the range of 40-100 nm and there are no pores having a pore size of more than 100 nm.

According to the present application, in the step (2b), the introduction of the organic component selected from the group consisting of carboxylic acids and alcohols into the second impregnation solution may promote the dispersion of the active component, increase the number of active centers, and thus improve the performance of the catalyst. Preferably, the organic component is used in such an amount that its molar ratio to the Group VIII element of the second catalyst is about 0.5-8, preferably about 1-5. The selection of the carboxylic acid and the alcohol is as described above with regard to the second catalyst and will not be described in further detail here.

According to the present application, to further improve the solubility of the precursor of the hydrodesulfurization catalytically active component in the second impregnation solution and improve the performance of the finally obtained second catalyst, a phosphorus-containing compound is preferably added during the preparation of the second impregnation solution. The phosphorus-containing compound is preferably a phosphorus-containing inorganic acid, and is more preferably at least one of phosphoric acid, hypophosphorous acid, ammonium phosphate, and ammonium dihydrogen phosphate. Further preferably, the phosphorus-containing compound is used in such an amount that the phosphorus element is present in the finally obtained second catalyst in an amount of about 0.8-10 wt %, preferably about 1-8 wt %, more preferably about 2-8 wt %, on a dry basis and calculated as $P_2O_5$.

According to the present application, the order of addition of the precursor of the catalytically active component, the organic component selected from the group consisting of carboxylic acids and alcohols, and optionally the phosphorus-containing compound, is not particularly limited when preparing the second impregnation solution. In a preferred embodiment, when preparing the second impregnation solution, the alcohol compound and the precursors containing the Group VIB metal element and the Group VIII metal element, respectively, are added to an aqueous solution of the phosphorus-containing compound, and then stirred at about 40-100° C. for about 1-8 hours until all materials are dissolved.

According to the present application, in the step (2a), the calcining conditions may be selected within a wide range, and preferably include a calcining temperature of about 400-1000° C., preferably about 500-800° C.; and a calcining time of about 1-15 hours, preferably about 3-8 hours.

According to the present application, in the step (2a), the drying conditions may be selected within a wide range, and preferably include a drying temperature of about 50-250° C., preferably about 100-200° C.; and a drying time of about 2-10 hours, preferably about 3-8 hours.

According to the present application, in the step (2a), the extrusion aid can be one or more of sesbania powder, methyl cellulose and starch. The peptizing agent can be one or more of nitric acid, citric acid and acetic acid.

According to the present application, the second catalyst can be shaped by various conventional shaping methods, for example, band extrusion shaping or rolling ball shaping. The band extrusion shaping can be performed in a manner known in the prior art, where the inorganic refractory component to be shaped by band extrusion and the impregnation solution containing the metal component are uniformly mixed and then extruded into a desired shape, such as a shape of a cylinder, a clover, a four-leaf clover, a honeycomb and the like.

In the preparation of the second catalyst, only a small amount of active metal component is used, and an organic component is added, so that high dispersion of the active component and high utilization of the active metal can be achieved, a catalyst with high activity can be obtained, and the cost of the catalyst can be greatly reduced.

In addition, the pore size of the second catalyst prepared by the above-described steps is concentrated in the range of 2-100 nm, and the average pore size is relatively large (6-20 nm), so that the purpose of promoting the accessibility of reactants to active centers can be achieved.

In a fifth aspect, the present application provides a hydrofining catalyst prepared by the method of the present application.

In a sixth aspect, the present application provides a hydrofining catalyst system prepared by the method of the present application.

In a seventh aspect, the present application provides the use of a hydrofining catalyst according to the present application or a hydrofining catalyst prepared by the method of the present application in the hydrofining of distillate oils.

In an eighth aspect, the present application provides the use of a hydrofining catalyst system according to the present application or a hydrofining catalyst system prepared by the method of the present application in the hydrofining of distillate oils.

The hydrofining catalyst and hydrofining catalyst system according to the present application, and the hydrofining catalyst and hydrofining catalyst system prepared by the method of the present application are particularly suitable for use in the hydrofining of distillate oils with a sulfur content of 5000-30000 ppm, a nitrogen content of 50-3000 ppm and an aromatic hydrocarbon content of 20-80 wt %. As demonstrated in the examples described herein below, when a distillate oil with a sulfur content of 9100 ppm, a nitrogen content of 532 ppm and an aromatic hydrocarbon content of 55 wt % is subjected to a hydrotreatment using the hydrofining catalyst or hydrofining catalyst system of the present application at 340° C., the sulfur content can be reduced to 15 ppm or less, the nitrogen content can be reduced to 5.5 ppm or less, the desulfurization rate can be as high as 99.8% or more, the denitrification rate can be as high as 99.0% or more, the aromatic hydrocarbon content can be reduced to 38.5 wt % or less, and the dearomatization rate can be as high as 30%.

In a ninth aspect, the present application provides a process for the hydrofining of distillate oils, comprising the steps of:

subjecting a hydrofining catalyst of the present application or a hydrofining catalyst prepared by the method of the present application to sulfurization; and contacting a distillate oil to be hydrodesulfurized with the sulfurized hydrofining catalyst under hydrodesulfurization conditions.

In a tenth aspect, the present application provides a process for the hydrofining of distillate oils, comprising the steps of:

subjecting a hydrofining catalyst system of the present application or a hydrofining catalyst system prepared by the method of the present application to sulfurization; and contacting a distillate oil to be hydrodesulfurized with the sulfurized hydrofining catalyst system under hydrodesulfurization conditions.

According to the present application, the sulfurization conditions for the hydrofining catalyst and hydrofining catalyst system may be those known for sulfurization of hydrofining catalysts. For example, the sulfurizing pressure may be about 0.1-15 MPa, the volume space velocity may be about 0.5-20 h$^{-1}$, and the hydrogen-to-oil volume ratio may be about 100-2000:1. The method for sulfurization is not particularly limited, and may be dry sulfurization or wet sulfurization.

According to the present application, the hydrodesulfurization conditions may be those known for hydrodesulfurization using a hydrofining catalyst. For example, the pressure may be about 0.1-8 MPa, the temperature may be about 260-410° C., the volume space velocity may be about 0.5-10 h$^{-1}$, and the hydrogen-oil volume ratio may be about 200-1000:1.

In some particularly preferred embodiments, the present application provides the following technical solutions:

A1. A hydrofining catalyst, comprising:

an inorganic refractory component comprising a first hydrodesulfurization catalytically active component in a mixture with at least one oxide selected from the group consisting of alumina, silica, magnesia, calcium oxide, zirconia and titanic;

a second hydrodesulfurization catalytically active component supported on the inorganic refractory component; and an organic component supported on the inorganic refractory component and comprising a carboxylic acid and optionally an alcohol, preferably, the hydrofining catalyst has pores with pore sizes in the ranges of 2-40 nm and 100-300 nm, respectively, in which the volume of pores having a pore size in the range of 2-40 nm accounts for about 60-95% of the total pore volume, and the volume of pores having a pore size in the range of 100-300 nm accounts for about 0.5-30% of the total pore volume, as determined after being calcined at 400° C. for 3 h, preferably, the inorganic refractory component is subjected to a calcination treatment before loading the second hydrodesulfurization catalytically active component and the organic component, the calcination preferably being carried out under the following conditions: a calcining temperature of about 300-900° C., and preferably about 400-700° C.; and a calcining time of about 1-15 hours, preferably about 3-8 hours.

A2. The hydrofining catalyst according to Item A1, in which said first hydrodesulfurization catalytically active component comprises at least one metal element selected from the group consisting of Group VIII metal elements and Group VIB metal elements, and said second hydrodesulfurization catalytically active component comprises at least one Group VIII metal element and at least one Group VIB metal element;

preferably, in the hydrofining catalyst, the total content of the Group VIII metal element is about 15-35 wt %, preferably about 20-30 wt %, and the total content of the Group VIB metal element is about 35-75 wt %, preferably about 40-65 wt %, based on the weight on a dry basis of the catalyst and calculated as oxides;

preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

A3. The hydrofining catalyst according to Item A2, in which the first hydrodesulfurization catalytically active component comprises at least one Group VIII metal element in an amount of about 60-90% of the total amount of the Group VIII metal element in the catalyst.

A4. The hydrofining catalyst according to any one of the preceding Items, in which the volume of pores with a pore size in the range of 2-40 nm is about 75-90% of the total pore volume, and the volume of pores with a pore size in the range of 100-300 nm is about 5-15% of the total pore volume;

preferably, the hydrofining catalyst is a shaped catalyst, which preferably has a shape of a cylinder, a clover, a four-leaf clover or a honeycomb;

preferably, the hydrofining catalyst has a specific surface area of about 70-200 m$^2$/g, a total pore volume of about 0.15-0.6 mL/g, and an average pore size of 5-25 nm;

preferably, in the hydrofining catalyst, the volume of pores having a pore size in the range of 2-4 nm is no more than about 10% of the total pore volume.

A5. The hydrofining catalyst according to any one of the preceding Items, in which the total content of those constituents, other than the first hydrodesulfurization catalytically active component, of the inorganic refractory component is about 5-40 wt %, preferably about 10-30 wt %, based on the weight on a dry basis of the catalyst.

A6. The hydrofining catalyst according to any one of the preceding Items, in which:

when the organic component comprises only a carboxylic acid, the ratio of the amount by weight of the carboxylic acid to the weight on a dry basis of those constituents, other than the first hydrodesulfurization catalytically active component, of the inorganic refractory component is about 0.1-0.8:1, preferably about 0.2-0.6:1; or when the organic component comprises both a carboxylic acid and an alcohol, the ratio of the amount by weight of the carboxylic acid to the weight on a dry basis of those constituents, other than the first hydrodesulfurization catalytically active component, of the inorganic refractory component is about 0.002-0.1:1, preferably about 0.02-0.06:1;

preferably, the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof.

A7. The hydrofining catalyst according to any one of the preceding Items, in which when the organic component comprises both a carboxylic acid and an alcohol, the ratio of the molar amount of the alcohol to the weight on a dry basis of those constituents, other than the first hydrodesulfurization catalytically active component, of the inorganic refractory component is about 0.005-0.03:1, preferably about 0.01-0.02:1;

preferably, the alcohol is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

A8. The hydrofining catalyst according to any one of the preceding Items, in which the hydrofining catalyst further comprises phosphorus in an amount of about 0.8-10 wt %, preferably about 1-8 wt %, based on the weight on a dry basis of the catalyst and calculated as $P_2O_5$.

A9. A method for preparing a hydrofining catalyst, comprising the steps of:

(1) mixing a precursor of a first hydrodesulfurization catalytically active component with a precursor of at least one oxide selected from the group consisting of alumina, silica, magnesia, calcium oxide, zirconia and titania, and calcining to obtain an inorganic refractory component;

(2) mixing a precursor of a second hydrodesulfurization catalytically active component with an organic component and optionally a phosphorus-containing compound to obtain an impregnation solution, in which the organic component comprises a carboxylic acid and optionally an alcohol;

(3) mixing the inorganic refractory component with the impregnation solution, and shaping and drying the resulting mixture to obtain the hydrofining catalyst.

A10. The method according to Item A9, in which the precursor of the first hydrodesulfurization catalytically active component comprises a precursor of at least one metal element selected from the group consisting of Group VIII metal elements and Group VIB metal elements, and the precursor of the second hydrodesulfurization catalytically active component comprises a precursor of at least one Group VIII metal element and a precursor of at least one Group VIB metal element;

preferably, the precursors of the first and second hydrodesulfurization catalytically active components are used in such amounts that, in the hydrofining catalyst, the total content of the Group VIII metal element is about 15-35 wt %, preferably about 20-30 wt %, and the total content of the Group VIB metal element is about 35-75 wt %, preferably about 40-65 wt %, based on the weight on a dry basis of the catalyst and calculated as oxides;

preferably, the Group VIII metal element is at least one selected from the group consisting of iron, cobalt, nickel, ruthenium, rhodium and palladium, and/or the Group VIB metal element, is at least one selected from the group consisting of chromium, molybdenum and tungsten.

A11. The method according to item A10, in which the precursor of the first hydrodesulfurization catalytically active component comprises a precursor of at least one Group VIII metal element in an amount of about 60-90% of the total amount of the precursor of the Group VIII metal element.

A12. The method according to any one of Items A9 to A11, in which the inorganic refractory component is used in such an amount that the total content of those constituents, other than the first hydrodesulfurization catalytically active component, of the inorganic refractory component is about 5-40% by weight, preferably about 10-30% by weight, based on the weight on a dry basis of the hydrofining catalyst.

A13. The method according to any one of Items A9 to A12, in which:

when the organic component comprises only a carboxylic acid, the ratio of the weight of the carboxylic acid used in step (2) to the weight on a dry basis of those constituents, other than the first hydrodesulfurization catalytically active component, of the inorganic refractory component is about 0.1-0.8:1, preferably about 0.2-0.6:1; or when the organic component comprises both a carboxylic acid and an alcohol, the ratio of the weight of the carboxylic acid used in step (2) to the weight on a dry basis of those constituents, other than the first hydrodesulfurization catalytically active component, of the inorganic refractory component is about 0.002-0.1:1, preferably from about 0.02 to 0.06:1;

preferably, the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof.

A14. The method according to any one of Items A9 to A13, in which when the organic component comprises both a carboxylic acid and an alcohol, the ratio of the molar amount of the alcohol used in step (2) to the weight on a dry basis of those constituents, other than the first hydrodesulfurization catalytically active component, of the inorganic refractory component is about 0.005-0.03:1, preferably about 0.01-0.02:1;

preferably, the alcohol is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

A15. The method according to any one of Items A9 to A14, in which the phosphorus-containing compound is used in step (2) in such an amount that the phosphorus element is present in an amount of about 0.8-10% by weight, preferably about 1-8% by weight, based on the weight on a dry basis of the hydrofining catalyst and calculated as $P_2O_5$;

preferably, the phosphorus-containing compound is selected from the group consisting of phosphoric acid, hypophosphorous acid, ammonium phosphate, ammonium dihydrogen phosphate, and combinations thereof.

A16. The method according to any one of Items A9 to A15, in which in step (1), the calcining conditions include: a calcining temperature of about 300-900° C., preferably about 400-800° C.; and a calcining time of about 1-15 hours, preferably about 3-8 hours.

A17. The method according to any one of Items A9 to A16, in which in step (3), the drying is carried out under the following conditions: a drying temperature of about 50-250° C., preferably about 100-200° C.; a drying time of 2-10 h, preferably about 3-8 h.

A18. The method according to any one of Items A9 to A17, in which the precursor of the alumina is selected from the group consisting of pseudo-boehmite, aluminum hydroxide powder, aluminum nitrate, aluminum carbonate, aluminum citrate, and combinations thereof; the precursor of the silica is selected from the group consisting of silica sol, white carbon black, silica and combination thereof; the precursor of the magnesium oxide is selected from the group consisting of magnesium hydroxide, magnesium nitrate, magnesium carbonate, magnesium acetate, magnesium oxide and combinations thereof; the precursor of the calcium oxide is selected from the group consisting of calcium hydroxide, calcium carbonate, calcium oxalate, calcium nitrate, calcium acetate, calcium oxide and combinations thereof; the precursor of the zirconia is selected from the group consisting of zirconium hydroxide, zirconium carbonate, zirconium nitrate, zirconium acetate, zirconium oxide and combinations thereof; the precursor of the titania is selected from the group consisting of titanium hydroxide, titanium nitrate, titanium acetate, titanium oxide and combinations thereof;

preferably, the precursors of alumina, silica, magnesia, calcium oxide, zirconia and titania have an average pore size of no less than about 10 nm, in which the volume of pores having a pore size in the range of 2 to 6 nm is not greater than about 15% of the total pore volume, and the volume of pores having a pore size in the range of 6-40 nm is not less than about 75% of the total pore volume.

A19. A hydrofining catalyst prepared by the method according to any one of Items A9 to A18.

A20. Use of a hydrofining catalyst according to any one of Items A1 to A8 and A19 in the hydrofining of distillate oils.

A21. The use according to Item A20, in which the distillate oil has a sulfur content of about 5000-30000 ppm, a nitrogen content of about 50-3000 ppm and an aromatics content of about 20-80 wt %.

A22. A process for the hydrofining of distillate oils, comprising the following steps:

subjecting a hydrofining catalyst according to any one of Items A1 to A8 and A19 to sulfurization; and contacting a distillate oil to be hydrodesulfurized with the sulfurized hydrofining catalyst under hydrodesulfurization conditions.

A23. A hydrofining catalyst system, comprising a first catalyst disposed within a first catalyst bed and a second catalyst disposed within a second catalyst bed, in which:

the first catalyst comprises:

a first inorganic refractory component comprising a first hydrodesulfurization catalytically active component in a mixture with at least one oxide selected from the group consisting of alumina, silica, magnesia, calcium oxide, zirconia and titania;

a second hydrodesulfurization catalytically active component supported on the first inorganic refractory component; and an organic component supported on the first inorganic refractory component, the organic component comprising a carboxylic acid and optionally an alcohol, preferably, the first catalyst has pores with pore sizes in the ranges of 2-40 nm and 100-300 nm, respectively, in which the volume of pores having a pore size in the range of 2-40 nm is about 60-95% of the total pore volume, the volume of pores having a pore size in the range of 100-300 nm is about 0.5-30% of the total pore volume, preferably, the first inorganic refractory component is subjected to a calcination treatment before loading the second hydrodesulfurization catalytically active component and the organic component, the calcination preferably being carried out under the following conditions: a calcining temperature of about 300-900° C., and preferably about 400-700° C.; and a calcining time of about 1-15 hours, preferably about 3-8 hours;

the second catalyst comprises a second inorganic refractory component comprising alumina, a third hydrodesulfurization catalytically active component supported on the second inorganic refractory component, and an organic component supported on the second inorganic refractory component, in which the pore size of the second catalyst is concentrated in the range of 2-100 nm;

in which the volume ratio of the first catalyst to the second catalyst is from about 1:1 to about 1:8, preferably from about 1:2 to about 1:6.

A24. The hydrofining catalyst system according to Item A23, in which:

in the first catalyst, the first hydrodesulfurization catalytically active component comprises at least one metal element selected from the group consisting of Group VIII metal elements and Group VIB metal elements, and the second hydrodesulfurization catalytically active component comprises at least one Group VIII metal element and at least one Group VIB metal element;

preferably, in the first catalyst, the total content of the Group VIII metal element is about 15-35 wt %, preferably about 20-30 wt %, and the total content of the Group VIB metal element is about 35-75 wt %, preferably about 40-65 wt %, based on the weight on a dry basis of the first catalyst and calculated as oxides; and/or in the second catalyst, the third hydrodesulfurization catalytically active component comprises at least one Group VIII metal element and at least one Group VIB metal element;

preferably, in the second catalyst, the total content of the Group VIII metal element is about 1-8 wt %, preferably about 2-6 wt %, and the total content of the Group VIB metal element is about 10-35 wt %, preferably about 15-30 wt %, based on the weight on a dry basis of the second catalyst and calculated as oxides;

preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

A25. The hydrofining catalyst system according to Item A24, in which in the first catalyst, the first hydrodesulfurization catalytically active component comprises at least one Group VIII metal element in an amount of about 60-90% of the total amount of the Group VIII metal element in the first catalyst.

A26. The hydrofining catalyst system according to any one of Items A23 to A25, in which:

in the first catalyst, the volume of pores having a pore size in the range of 2-40 nm accounts for about 75-90% of the total pore volume, the volume of pores having a pore size in the range of 100-300 nm accounts for about 5-15% of the total pore volume, and the volume of pores having a pore size in the range of 2-4 nm is no more than about 10% of the total pore volume;

preferably, the first catalyst has a specific surface area of about 70-200 m$^2$/g, a total pore volume of about 0.15-0.6 mL/g, and an average pore size of 5-25 nm; and/or the second catalyst has a specific surface area of about 130-300 m$^2$/g, a total pore volume of about 0.2-0.7 mL/g, and an average pore size of 6-20 nm;

preferably, the first catalyst and the second catalyst are each a shaped catalyst system, the shape of the first catalyst and the shape of the second catalyst each being independently selected from the group consisting of a cylinder, a clover, a four-leaf clover or a honeycomb.

A27. The hydrofining catalyst system according to any one of Items A23 to A26, in which:

the total content of those constituents, other than the first hydrodesulfurization catalytically active component, of the first inorganic refractory component in the first catalyst is about 5-40 wt %, preferably about 10-30 wt %, based on the weight on a dry basis of the first catalyst; and/or the second inorganic refractory component is present in the second catalyst in an amount of about 60-85 wt %, preferably about 70-80 wt %, based on the weight on a dry basis of the second catalyst.

A28. The hydrofining catalyst system according to any one of Items A23 to A27, in which:

in the first catalyst, when the organic component comprises only a carboxylic acid, the ratio of the amount by weight of the carboxylic acid to the weight on a dry basis of those constituents, other than the first hydrodesulfurization catalytically active component, of the first inorganic refractory component is about 0.1-0.8:1, preferably about 0.2-0.6:1; or when the organic component comprises both a carboxylic acid and an alcohol, the ratio of the amount by weight of the carboxylic acid to the weight on a dry basis of those constituents, other than the first hydrodesulfurization catalytically active component, of the first inorganic refractory component is about 0.002-0.1:1, preferably about 0.02-0.06:1;

preferably, the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof.

A29. The hydrofining catalyst system according to any one of Items A23 to A28, in which:

in the first catalyst, when the organic component comprises both a carboxylic acid and an alcohol, the ratio of the molar amount of the alcohol to the weight on a dry basis of those constituents, other than the first hydrodesulfurization catalytically active component, of the first inorganic refractory component is about 0.005-0.03:1, preferably about 0.01-0.02:1; and/or in the second catalyst, the molar ratio of the organic component to the Group VIII metal element contained in the second catalyst is about 0.5-8, preferably about 1-5;

preferably, the carboxylic acid in the first and second catalysts is independently selected from the group consisting of $C_{1-18}$ monobasic saturated carboxylic acid, $C_{7-10}$ phenyl acid, citric acid, adipic acid, malonic acid, succinic acid, maleic acid, tartaric acid, and combinations thereof;

preferably, the alcohols in the first and second catalysts are independently selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

A30. The hydrofining catalyst system according to any one of Items A23 to A29, in which the first catalyst may further comprise phosphorus in an amount of about 0.8-10 wt %, preferably about 1-8 wt %, based on the weight on a dry basis of the first catalyst and calculated as $P_2O_5$; and/or the second catalyst may further comprise phosphorus in an amount of about 0.8-10 wt %, preferably about 1-8 wt %, based on the weight on a dry basis of the second catalyst and calculated as $P_2O_5$.

A31. A method for preparing a hydrofining catalyst system comprising a first catalyst disposed within a first catalyst bed and a second catalyst disposed within a second catalyst bed, said method comprising:
(1) preparing the first catalyst by the steps of:
(1a) mixing a precursor of a first hydrodesulfurization catalytically active component with a precursor of at least one oxide selected from the group consisting of alumina, silica, magnesia, calcium oxide, zirconia and titania, and calcining to obtain a first inorganic refractory component;
(1b) mixing a precursor of a second hydrodesulfurization catalytically active component with an organic component and optionally a phosphorus-containing compound to obtain a first impregnation solution, in which the organic component comprises a carboxylic acid and optionally an alcohol;
(1c) mixing the first inorganic refractory component with the first impregnation solution, shaping and drying the resulting mixture to obtain the first catalyst;
(2) preparing the second catalyst by the steps of:
(2a) mixing an alumina precursor with an extrusion aid and a peptizing agent, and subjecting the resulting mixture to shaping, drying and calcining sequentially to obtain a second inorganic refractory component;
(2b) mixing a precursor of a third hydrodesulfurization catalytically active component with an organic component selected from the group consisting of carboxylic acids and alcohols and optionally a phosphorus-containing compound to obtain a second impregnation solution;
(2c) mixing the second impregnation solution with the second inorganic refractory component and then drying to obtain the second catalyst; and
(3) loading the first catalyst and the second catalyst into a first catalyst bed and a second catalyst bed, respectively, in a volume ratio of about 1:1 to about 1:8, preferably about 1:2 to about 1:6 to obtain the hydrofining catalyst system.

A32. The method according to Item A31, in which:

in step (1), the precursor of the first hydrodesulfurization catalytically active component comprises a precursor of at least one metal element selected from the group consisting of Group VIII metal elements and Group VIB metal elements, and the precursor of the second hydrodesulfurization catalytically active component comprises a precursor of at least one Group VIII metal element and a precursor of at least one Group VIB metal element;

preferably, the precursors of the first and second hydrodesulfurization catalytically active components are used in such amounts that, in the first catalyst, the total content of the Group VIII metal element is about 15-35 wt %, preferably about 20-30 wt %, and the total content of the Group VIB metal element is about 35-75 wt %, preferably about 40-65 wt %, based on the weight on a dry basis of the first catalyst and calculated as oxides; and/or in step (2), the precursor of the third hydrodesulfurization catalytically active component comprises a precursor of at least one Group VIII metal element and a precursor of at least one Group VIB metal element;

preferably, the precursor of the third hydrodesulfurization catalytically active component is used in such an amount that, in the second catalyst, the total content of the Group VIII metal element is about 1-8 wt %, preferably about 2-6 wt %; the total content of the Group VIB metal element is about 10-35 wt %, preferably about 15-30 wt %;

preferably, the Group VIII metal element is at least one selected from the group consisting of iron, cobalt, nickel, ruthenium, rhodium and palladium, and/or the Group VIB metal element is at least one selected from the group consisting of chromium, molybdenum and tungsten.

A33. The method according to Item A32, in which the precursor of the first hydrodesulfurization catalytically active component comprises a precursor of at least one Group VIII metal element in an amount of about 60-90% of the total amount of the precursor of the Group VIII metal element used in the preparation of the first catalyst.

A34. The method according to any one of Items A31 to A33, in which in step (1), the first inorganic refractory component is used in such an amount that the total content of those constituents, other than the first hydrodesulfurization catalytically active component, of the first inorganic refractory component in the first catalyst is about 5-40 wt %, preferably about 10-30 wt %, based on the weight on a dry basis of the first catalyst; and/or in step (2), the second inorganic refractory component is used in such an amount that the second inorganic refractory component is present in the second catalyst in an amount of about 60-85 wt %, preferably about 70-80 wt %, based on the weight on a dry basis of the second catalyst.

A35. The method according to any one of Items A31 to A34, in which:

in step (1b), when the organic component comprises only a carboxylic acid, the ratio of the weight of the carboxylic acid used to the weight on a dry basis of those constituents, other than the first hydrodesulfurization catalytically active component, of the inorganic refractory component is about 0.1-0.8:1, preferably about 0.2-0.6:1; or when the organic component comprises both a carboxylic acid and an alcohol, the ratio of the weight of the carboxylic acid used to the weight on a dry basis of those constituents, other than the first hydrodesulfurization catalytically active component, of the first inorganic refractory component is about 0.002-0.1:1, preferably about 0.02-0.06:1;

preferably, the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof.

A36. The method according to any one of Items A31 to A35, in which in step (1b), when the organic component comprises both a carboxylic acid and an alcohol, the ratio of the molar amount of the alcohol to the weight on a dry basis of those constituents, other than the first hydrodesulfurization catalytically active component, of the first inorganic refractory component is about 0.005-0.03:1, preferably about 0.01-0.02:1; and/or in step (2b), the molar ratio of the organic component to the Group VIII metal element used in the preparation of the second catalyst is about 0.5-8, preferably about 1-5;

preferably, the carboxylic acids used in step (1b) and step (2b) are independently selected from the group consisting of $C_{1-18}$ monobasic saturated carboxylic acid, $C_{7-10}$ phenyl acid, citric acid, adipic acid, malonic acid, succinic acid, maleic acid, tartaric acid, and combinations thereof;

preferably, the alcohols used in step (1b) and step (2b) are independently selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane and combinations thereof.

A37. The method according to any one of Items A31 to A36, in which in step (1b), the phosphorus-containing compound is used in such an amount that the phosphorus element is present in an amount of about 0.8-10% by weight, preferably about 1-8% by weight, based on the weight on a dry basis of the first catalyst and calculated as $P_2O_5$; and/or in step (2b), the phosphorus-containing compound is used in such an amount that the phosphorus element is present in an amount of about 0.8-10 wt %, preferably about 1-8 wt %, based on the weight on a dry basis of the second catalyst and calculated as $P_2O_5$;

preferably, the phosphorus-containing compounds used in step (1b) and step (2b) are independently selected from the group consisting of phosphoric acid, hypophosphorous acid, ammonium phosphate, ammonium dihydrogen phosphate and combinations thereof.

A38. The method according to any one of Items A31 to A37, in which:

in the step (1a), the calcining conditions include: a calcining temperature of about 300-900° C., preferably about 400-800° C.; and a calcining time of about 1-15 hours, preferably about 3-8 hours; and/or in the step (2a), the calcining conditions include: a calcining temperature of about 400-1000° C., preferably about 500-800° C.; and a calcining time of about 1-15 hours, preferably about 3-8 hours.

A39. The method according to any one of Items A31 to A38, in which in step (1c) and step (2c), the drying is independently performed under the following conditions: a drying temperature of about 50-250° C., preferably about 100-200° C.; and a drying time of about 2-10 hours, preferably about 3-8 hours.

A40. The method according to any one of Items A31 to A39, in which the precursor of the alumina is selected from the group consisting of pseudo-boehmite, aluminum hydroxide powder, aluminum nitrate, aluminum carbonate, aluminum citrate, and combinations thereof; the precursor of the silica is selected from silica sol, white carbon black, silica and combination thereof; the precursor of the magnesium oxide is selected from magnesium hydroxide, magnesium nitrate, magnesium carbonate, magnesium acetate, magnesium oxide and combinations thereof; the precursor of the calcium oxide is selected from calcium hydroxide, calcium carbonate, calcium oxalate, calcium nitrate, calcium acetate, calcium oxide and combinations thereof; the precursor of the zirconia is selected from the group consisting of zirconium hydroxide, zirconium carbonate, zirconium nitrate, zirconium acetate, zirconium oxide and combinations thereof; and the precursor of the titania is selected from the group consisting of titanium hydroxide, titanium nitrate, titanium acetate, titanium oxide and combinations thereof;

preferably, the precursors of alumina, silica, magnesia, calcium oxide, zirconia and titania have an average pore size of no less than about 10 nm, in which the volume of pores having a pore size in the range of 2 to 6 nm is not greater than about 15% of the total pore volume, and the volume of pores having a pore size in the range of 6-40 nm is not less than about 75% of the total pore volume.

A41. The method according to any one of Items A31 to A40, in which in step (2a), the conditions are such that, in the resulting second inorganic refractory component, the volume of pores having a pore size in the range of 2-4 nm accounts for about 0-2% of the total pore volume, the volume of pores having a pore size in the range of 4-6 nm accounts for about 2-15% of the total pore volume, the volume of pores having a pore size in the range of 6-40 nm accounts for about 85-95% of the total pore volume, and the remaining pores have pore sizes in the range of 40-100 nm, and there are no pores having a pore size of more than 100 nm.

A42. A hydrofining catalyst system prepared by the method according to any one of Items A31 to A41.

A43. Use of a hydrofining catalyst system according to any one of Items A23 to A30 and A42 in the hydrofining of distillate oils.

A44. The use according to Item A43, in which the distillate oil has a sulfur content of about 5000-30000 ppm, a nitrogen content of about 50-3000 ppm and an aromatics content of about 20-80 wt %.

A45. A process for the hydrofining of distillate oils, comprising the following steps:

subjecting the hydrofining catalyst system according to any one of hems A23 to A30 and A42 to sulfurization; and contacting a distillate oil to be hydrodesulfurized with the sulfurized hydrofining catalyst system under hydrodesulfurization conditions.

A46. The hydrofining catalyst according to any one of Items A1-A8 and A19, in which the XRD patterns of the inorganic refractory component and the hydrofining catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements.

A47. The method according to any one of Items A9 to A18, in which the XRD patterns of the resulting inorganic refractory component and the hydrofining catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements.

A48. The hydrofining catalyst system according to any one of Items A23 to A30 and A42, in which the XRD patterns of the first inorganic refractory component and the first catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements.

A49. The method according to any one of Items A31 to A41, in which the XRD patterns of the resulting first inorganic refractory component and the first catalyst have characteristic peaks corresponding to XRD characteristic peaks of at least one oxide selected from the group consisting of alumina, silica, magnesia, calcium oxide, zirconia and titania, and characteristic peaks corresponding to XRD characteristic peaks of an oxide of the metal element acting as the first hydrodesulfurization catalytically active component, which is preferably at least one selected from Group VIII metal elements and Group VIB metal elements.

B1. A hydrofining catalyst, comprising an inorganic refractory component, hydrodesulfurization catalytically active component, an alcohol and a carboxylic acid;

in which the inorganic refractory component comprises at least one of silica, magnesia, calcium oxide, zirconia and titania and a part of the hydrodesulfurization catalytically active component;

the catalyst has pores with pore sizes in the ranges of 2-40 nm and 100-300 nm, respectively, in which the volume of pores having a pore size in the range of 2-40 nm accounts for 60-95% of the total pore volume, and the volume of pores having a pore size in the range of 100-300 nm accounts for 0.5-30% of the total pore volume.

B2. The hydrofining catalyst according to Item B1, in which the hydrodesulphurization catalytically active component is a Group VIII metal element and a Group VIB metal element;

in which, in the hydrofining catalyst, the content of the Group VIII metal element is 15-35 wt %, preferably 20-30 wt %; the content of the Group VIB metal element is 35-75 wt %, preferably 40-65 wt %, based on the weight on a dry basis of the catalyst and calculated as oxides;

the Group VIII metal element is preferably at least one selected from the group consisting of iron, cobalt, nickel, ruthenium, rhodium and palladium, and the Group VIB metal element is preferably at least one selected from the group consisting of chromium, molybdenum and tungsten.

B3. The hydrofining catalyst according to Item B2, in which the part of the hydrodesulfurization catalytically active component is a part of the Group VIII metal element, and the amount of the part of the Group VIII metal element is 60-90% of the total amount of the Group VIII metal element.

B4. The hydrofining catalyst according to Item B1 or B2, in which the volume of pores having a pore size of 2-40 nm accounts for 75-90% of the total pore volume, and the volume of pores having a pore size of 100-300 nm accounts for 5-15% of the total pore volume;

preferably, the catalyst is a shaped catalyst, which preferably has a shape of a cylinder, a clover, a four-leaf clover or a honeycomb;

preferably, the hydrofining catalyst has a specific surface area of 70-200 m$^2$/g, a pore volume of 0.15-0.6 mL/g, and an average pore size of 5-25 nm;

preferably, in the hydrofining catalyst, the volume of pores having a pore size in the range of 2-4 nm is no more than 10% of the total pore volume.

B5. The hydrofining catalyst according to any one of Items B1 to B4, in which the inorganic refractory component is present in an amount of 5-40 wt %, preferably 10-30 wt %, based on the weight on a dry basis of the catalyst.

B6. The hydrofining catalyst according to any one of Items B1 to B5, in which the ratio of the amount of the carboxylic acid to the weight on a dry basis of the inorganic refractory component is 0.002-0.1:1, preferably 0.02-0.06:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

B7. The hydrofining catalyst according to any one of Items B1 to B5, in which the ratio of the molar amount of the alcohol to the weight on a dry basis of the inorganic refractory component is 0.005-0.03:1, preferably 0.01-0.02:1;

preferably, the alcohol is at least one selected from the group consisting of $C_{1-18}$ monohydric saturated alcohols, ethylene glycol, polyethylene glycol, glycerol, polyglycerol, erythritol, pentaerythritol, xylitol, sorbitol, and trimethylolethane.

B8. The hydrofining catalyst according to Item B1, in which the hydrofining catalyst further comprises phosphorus in an amount of 0.8-10 wt %, preferably, based on the weight on a dry basis of the catalyst and calculated as $P_2O_5$.

B9. A method for preparing a hydrofining catalyst, comprising the following steps:

(1) mixing a precursor of at least one of silica, magnesia, calcium oxide, zirconia and titania and a part of a precursor of a hydrodesulfurization catalytically active component and calcining, to obtain an inorganic refractory component;

(2) mixing an alcohol, a carboxylic acid and the remaining part of the precursor of the hydrodesulfurization catalytically active component to obtain an impregnation solution;

(3) mixing the inorganic refractory component with the impregnation solution, and shaping and drying the resulting mixture to obtain the hydrofining catalyst.

B10. The method according to item B9, in which the precursor of hydrodesulphurization catalytically active component is a precursor of a Group VIII metal element and a precursor of a Group VIB metal element;

in which the amount of the precursor of the Group VIII metal element and the amount of the precursor of the Group VIB metal element are such that, in the hydrofining catalyst, the content of the Group VIII metal element is 15-35 wt %, preferably 20-30 wt %; the content of the Group VIB metal element is 35-75 wt %, preferably 40-65 wt %, based on the weight on a dry basis of the catalyst and calculated as oxides;

the Group VIII metal element is preferably at least one selected from the group consisting of iron, cobalt, nickel, ruthenium, rhodium and palladium, and the Group VIB metal element is preferably at least one selected from the group consisting of chromium, molybdenum and tungsten.

B11. The method according to Item B10, in which the part of the precursor of the hydrodesulfurization catalytically active component is a part of the precursor of the Group VIII metal element, and the amount of the part of the precursor of the Group VIII metal element is 60-90% of the total amount of the precursor of the Group VIII metal element.

B12. The method according to any one of Items B9 to B11, in which the inorganic refractory component is used in such an amount that the inorganic refractory component is present in the hydrofining catalyst in an amount of 5-40 wt %, preferably 10-30 wt %, based on the weight on a dry basis of the hydrofining catalyst.

B13. The method according to any one of Items B9 to B12, in which in step (2) the ratio of the amount of the carboxylic acid to the weight on a dry basis of the inorganic refractory component is 0.002-0.1:1, preferably 0.02-0.06:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

B14. The method according to any one of Items B9 to B12, in which the ratio of the molar amount of the alcohol to the weight on a dry basis of the inorganic refractory component is 0.005-0.03:1, preferably 0.01-0.02:1;

preferably, the alcohol is at least one selected from the group consisting of $C_{1-18}$ monohydric saturated alcohols, ethylene glycol, polyethylene glycol, glycerol, polyglycerol, erythritol, pentaerythritol, xylitol, sorbitol, and trimethylolethane.

B15. The method according to Item B9, in which the impregnation solution obtained in step (2) further comprises a phosphorus-containing material in such an amount that the content of phosphorus element is 0.8-10 wt %, preferably 1-8 wt %, based on the weight on a dry basis of the hydrofining catalyst and calculated as $P_2O_5$;

preferably, the phosphorus-containing material is at least one selected from the group consisting of phosphoric acid, hypophosphorous acid, ammonium phosphate, and ammonium dihydrogen phosphate.

B16. The method according to Item B9, in which in step (1), the calcining conditions include: a calcining temperature of 300-900° C., preferably 400-800° C.; a calcining time of 1-15 h, preferably 3-8 h.

B17. The method according to Item B9, in which in step (3), the drying conditions include: a drying temperature of 50-250° C., preferably 100-200° C.; a drying time of 2-10 h, preferably 3-8 h.

B18. The method according to Item B9, in which the precursor of the silica is at least one of silica sol, white carbon black and silicon dioxide; the precursor of the magnesia is at least one of magnesium hydroxide, magnesium nitrate, magnesium carbonate, magnesium acetate and magnesium oxide; the precursor of the calcium oxide is at least one of calcium hydroxide, calcium carbonate, calcium oxalate, calcium nitrate, calcium acetate and calcium oxide; the precursor of the zirconia is at least one of zirconium hydroxide, zirconium carbonate, zirconium nitrate, zirconium acetate and zirconium oxide; and the precursor of the titania is at least one of titanium hydroxide, titanium nitrate, titanium acetate and titanium oxide;

preferably, the precursors of the silica, magnesia, calcium oxide, zirconia and titania have an average pore size of no less than 10 nm, in which the volume of pores having a pore size of 2-6 nm accounts for not more than 15% of the total pore volume, and the volume of pores having a pore size of 6-40 nm accounts for no less than 75% of the total pore volume.

B19. A hydrofining catalyst prepared by the method according to any one of Items B9 to B18.

B20. Use of a hydrofining catalyst according to any one of Items B1 to B8 and B19 in the hydrofining of distillate oils.

B21. The use according to Item B20, in which the distillate oil has a sulfur content of 5000-30000 ppm, a nitrogen content of 50-3000 ppm, and an aromatics content of 20-80 wt %.

B22. A process for the hydrofining of distillate oils, comprising the following steps: subjecting the hydrofining catalyst according to any one of Items B1-B8 and B19 to sulfurization, introducing a distillate oil to be hydrodesulfurized, and contacting the distillate oil to be hydrodesulfurized with the sulfurized hydrofining catalyst under hydrodesulfurization conditions.

C1. A hydrofining catalyst system, comprising a first catalyst bed and a second catalyst bed;

in which the first catalyst contained in the first catalyst bed comprises a first inorganic refractory component, a first hydrodesulfurization catalytically active component, an alcohol, and a carboxylic acid; in which the first inorganic refractory component comprises at least one of silica, magnesia, calcium oxide, zirconia and titania and a part of the first hydrodesulfurization catalytically active component;

the first catalyst has pores with pore sizes in the ranges of 2-40 nm and 100-300 nm, respectively, in which the volume of pores having a pore size in the range of 2 to 40 nm accounts for 60-95% of the total pore volume, and the volume of pores having a pore size in the range of 100-300 nm accounts for 0.5-30% of the total pore volume;

in which the second catalyst contained in the second catalyst bed comprises a second inorganic refractory component, a second hydrodesulfurization catalytically active component, and an alcohol; in which the second inorganic refractory component is alumina; the pore size of the second catalyst is concentrated in the range of 2 to 100 nm;

in which the volume ratio of the first catalyst to the second catalyst is 1:1-8.

C2. The hydrofining catalyst according to Item C1, in which in the first catalyst, the first hydrodesulfurization catalytically active component is a Group VIII metal element and a Group VIB metal element;

in which the content of the Group VIII metal element is 15-35 wt %, preferably 20-30 wt %; the content of the Group VIB metal element is 35-75 wt %, preferably 40-65 wt %, based on the weight on a dry basis of the catalyst and calculated as oxides; and/or in the second catalyst, the second hydrodesulfurization catalytically active component is a Group VIII metal element and a Group VIB metal element;

in which the content of the Group VIII metal element is 1-8 wt %, preferably 2-6 wt %; the content of the Group VIB metal element is 10-35 wt %, preferably 15-30 wt %, based on the weight on a dry basis of the second catalyst and calculated as oxides;

preferably, the Group VIII metal element is at least one selected from the group consisting of iron, cobalt, nickel, ruthenium, rhodium and palladium, and the Group VIB metal element is at least one selected from the group consisting of chromium, molybdenum and tungsten.

C3. The hydrofining catalyst according to Item C2, in which in the first catalyst, the part of the first hydrodesulfurization catalytically active component is a part of the Group VIII metal element, the amount of the part of the Group VIII metal element is 60-90% of the total amount of the Group VIII metal element.

C4. The hydrofining catalyst according to Item C1 or C2, in which in the first catalyst, the volume of pores having a pore size of 2-40 nm accounts for 75-90% of the total pore volume, the volume of pores having a pore size of 100-300 nm accounts for 5-15% of the total pore volume, and the volume of pores having a pore size of 2-4 nm is no more than 10% of the total pore volume;

preferably, the first catalyst has a specific surface area of 70-200 m$^2$/g, a pore volume of 0.15-0.6 mL/g, and an average pore size of 5-25 nm; and/or in the second catalyst, the second catalyst has a specific surface area of 130-300 m$^2$/g, a pore volume of 0.2-0.7 mL/g, and an average pore size of 6-20 nm;

preferably, the first catalyst and the second catalyst are each a shaped catalyst system, and the shape of the first catalyst and the shape of the second catalyst are each independently selected from the group consisting of a cylinder, a clover, a four-leaf-clover, and a honeycomb.

C5. The hydrofining catalyst according to any one of Items C1 to C4, in which the first inorganic refractory component is present in the first catalyst in an amount of 5-40 wt %, preferably 10-30 wt %, based on the weight on a dry basis of the first catalyst; and/or the second inorganic refractory component is present in the second catalyst in an amount of 60-85 wt %, preferably 70-80 wt %, based on the weight on a dry basis of the second catalyst.

C6. The hydrofining catalyst according to any one of Items C1 to C5, in which in the first catalyst, the ratio of the amount of the carboxylic acid to the weight on a dry basis of the first inorganic refractory component is 0.002-0.1:1, preferably 0.02-0.06:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

C7. The hydrofining catalyst according to any one of Items C1 to C5, in which in the first catalyst, the ratio of the molar amount of the alcohol to the weight on a dry basis of the first inorganic refractory component is 0.005-0.03:1, preferably 0.01-0.02:1; and/or in the second catalyst, the molar ratio of the alcohol to the Group VIII element contained in the second catalyst is from 0.5 to 8, preferably from 1 to 5;

preferably, the alcohol is at least one selected from the group consisting of $C_{1-18}$ monohydric saturated alcohols, ethylene glycol, polyethylene glycol, glycerol, polyglycerol, erythritol, pentaerythritol, xylitol, sorbitol, and trimethylolethane.

C8. The hydrofining catalyst according to Item C1, in which the first catalyst further comprises phosphorus in an amount of 0.8-10 wt %, preferably 1-8 wt %, based on the weight on a dry basis of the first catalyst and calculated as $P_2O_5$; and/or the second catalyst further comprises phosphorus in an amount of 0.8-10 wt %, preferably 1-8 wt %, based on the weight on a dry basis of the second catalyst and calculated as $P_2O_5$.

C9. A method for preparing a hydrofining catalyst system, in which the hydrofining catalyst system comprises a first catalyst bed and a second catalyst bed, the method comprising the following steps:

(1) preparing a first catalyst contained in a first catalyst bed by the steps of:

(1a) mixing a precursor of at least one of silica, magnesia, calcium oxide, zirconia and titania with a part of a precursor of a first hydrodesulfurization catalytically active component and performing first calcining to obtain a first inorganic refractory component;

(1b) mixing an alcohol, a carboxylic acid and the remaining part of the precursor of the first hydrodesulfurization catalytically active component to obtain a first impregnation solution;

(1c) mixing the first inorganic refractory component and the first impregnation solution, shaping and drying the resulting mixture to obtain the first catalyst;

(2) preparing a second catalyst contained in a second catalyst bed by the steps of:

(2a) mixing an alumina precursor with an extrusion aid and a peptizing agent, and sequentially shaping, drying and performing secondary calcining on the resulting mixture to produce an alumina carrier;

(2b) mixing an alcohol and a precursor of a second hydrodesulfurization catalytically active component to obtain a second impregnation solution;

(2c) mixing the second impregnation solution with the alumina carrier and then drying to obtain the second catalyst;

(3) loading the first catalyst and the second catalyst into a first catalyst bed and a second catalyst bed, respectively, in a volume ratio of 1:1-8 to obtain the hydrofining catalyst system.

C10. The method according to Item C9, in which in the step (1), the precursor of the first hydrodesulfurization catalytically active component is a precursor of a Group VIII metal element and a precursor of a Group VIB metal element;

in which the precursors of the Group VIII metal element and the Group VIB metal element are used in such an amount that, in the first catalyst, the content of the Group VIII metal element is 15-35 wt %, preferably 20-30 wt %; the content of the Group VIB metal element is 35-75 wt %, preferably 40-65 wt %, based on the weight on a dry basis of the first catalyst and calculated as oxides; and/or in the step (2), the precursor of the second hydrodesulfurization catalytically active component is a precursor of a Group VIII metal element and a precursor of a Group VIB metal element;

in which the precursors of the Group VIII metal element and the Group VIB metal element are used in such an amount that, in the second catalyst, the content of the Group VIII metal element is 1-8 wt %, preferably 2-6 wt %; the content of the Group VIB metal element is 10-35 wt %, preferably 15-30 wt %, based on the weight on a dry basis of the second catalyst and calculated as oxides;

preferably, the Group VIII metal element is at least one selected from the group consisting of iron, cobalt, nickel, ruthenium, rhodium and palladium, and the Group VIB metal element is at least one selected from the group consisting of chromium, molybdenum and tungsten.

C11. The method according to Item C10, in which in step (1a), the part of the precursor of the first hydrodesulfurization catalytically active component is a part of the precursor of the Group VIII metal element used in the preparation of the first catalyst, and the amount of the part of the precursor of the Group VIII metal element used in the preparation of the first catalyst is 60-90% of the total amount of the precursor of the Group VIII metal element used in the preparation of the first catalyst.

C12. The method according to any one of Items C9 to C11, in which in step (1) the first inorganic refractory component is used in such an amount that the first inorganic refractory component is present in the first catalyst in an amount of 5-40 wt %, preferably 10-30 wt %, based on the weight on a dry basis of the first catalyst; and/or in step (2), the second inorganic refractory component is used in such an amount that the content of the second inorganic refractory component in the second catalyst is 60-85 wt %, preferably 70-80 wt %, based on the weight on a dry basis of the second catalyst.

C13. The method according to any one of Items C9 to C12, in which in step (1), the ratio of the amount of the carboxylic acid to the weight on a dry basis of the first inorganic refractory component is 0.002-0.1:1, preferably 0.02-0.06:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

C14, The method according to any one of Items C9 to C12, in which in step (1), the ratio of the molar amount of the alcohol to the weight on a dry basis of the first inorganic refractory component is 0.005-0.03:1, preferably 0.01-0.02:1; and/or in step (2), the molar ratio of the alcohol to the Group VIII element in the preparation of the second catalyst is from 0.5 to 8, preferably from 1 to 5;

preferably, the alcohol is at least one selected from the group consisting of $C_{1-18}$ monohydric saturated alcohols, ethylene glycol, polyethylene glycol, glycerol, polyglycerol, erythritol, pentaerythritol, xylitol, sorbitol, and trimethylolethane.

C15. The method according to Item C9, in which the first impregnation solution further comprises a phosphorus-containing material used in such an amount that the phosphorus element is present in an amount of 0.8-10 wt %, preferably 1-8 wt %, based on the weight on a dry basis of the first catalyst and calculated as $P_2O_5$; and/or the second impregnation solution further comprises a phosphorus-containing material, and the content of the phosphorus-containing material is 0.8-10 wt %, preferably 1-8 wt %, based on the weight on a dry basis of the second catalyst and calculated by $P_2O_5$;

preferably, the phosphorus-containing material is at least one selected from the group consisting of phosphoric acid, hypophosphorous acid, ammonium phosphate, and ammonium dihydrogen phosphate.

C16. The method according to Item C9, in which:

conditions of the first calcining include: a calcining temperature of 300-900° C., preferably 400-800° C.; a calcining time of 1-15 h, preferably 3-8 h; and/or conditions of the second calcining include: a calcining temperature of 400-1000° C., and preferably 500-800° C.; a calcining time of 1-15 h, preferably 3-8 h.

C17. The method according to Item C9, in which, in step (1c) and step (2a), the drying conditions each independently includes: a drying temperature of 50-250° C., preferably 100-200° C.; a drying time of 2-10 h, preferably 3-8 h.

C18. The method according to Item C9, in which the precursor of the silica is at least one of silica sol, silica, and silica; the precursor of the magnesia is at least one of magnesium hydroxide, magnesium nitrate, magnesium carbonate, magnesium acetate and magnesium oxide; the precursor of the calcium oxide is at least one of calcium hydroxide, calcium carbonate, calcium oxalate, calcium nitrate, calcium acetate and calcium oxide; the precursor of the zirconia is at least one of zirconium hydroxide, zirconium carbonate, zirconium nitrate, zirconium acetate and zirconium oxide; the precursor of the titania is at least one of titanium hydroxide, titanium nitrate, titanium acetate and titanium oxide;

preferably, the precursors of the silica, magnesia, calcium oxide, zirconia and titania have an average pore size of no less than 10 nm, in which the volume of pores having a pore size of 2-6 nm accounts for no more than 15% of the total pore volume, and the volume of pores having a pore size of 6-40 nm accounts for no less than 75% of the total pore volume.

C19. The method according to Item C9, in which, in step (2a), the alumina carrier is prepared under conditions such that in the alumina carrier, the volume of pores having a pore size in the range of 2-4 nm accounts for 0-2% of the total pore volume, the volume of pores have a pore size in the range of 4 to 6 nm accounts for 2-15% of the total volume, the volume of pores have a pore size in the range of 6 to 40 nm accounts for 85-95% of the total volume, the remaining pores have a pore size in the range of 40-100 nm and there are no pores having a pore size greater than 100 nm.

C20. A hydrofining catalyst system prepared by the method according to any one of Items C9 to C19.

C21. Use of a hydrofining catalyst system according to any one of Items C1 to C8 and C20 in the hydrofining of distillate oils.

C22. The use according to Item C21, in which the distillate oil has a sulfur content of 5000-30000 ppm, a nitrogen content of 50-3000 ppm, and an aromatics content of 20-80 wt %.

C23. A process for the hydrofining of distillate oils, comprising the steps of: subjecting the hydrofining catalyst system according to any one of Items C1-C8 and C20 to sulfurization, introducing a distillate oil to be hydrodesulfurized, and contacting the distillate oil to be hydrodesulfurized with the sulfurized hydrofining catalyst under hydrodesulfurization conditions.

D1. A hydrofining catalyst, comprising an inorganic refractory component, a hydrodesulfurization catalytically active component and a carboxylic acid;

in which the inorganic refractory component comprises at least one of silica, magnesia, calcium oxide, zirconia and titanic and a part of the hydrodesulfurization catalytically active component;

the catalyst has pores with pore sizes in the ranges of 2-40 nm and 100-300 nm, respectively, in which the volume of pores having a pore size of 2-40 nm accounts for 60-95% of the total pore volume, and the volume of pores having a pore size of 100-300 nm accounts for 0.5-30% of the total pore volume.

D2. The hydrofining catalyst according to Item D1, in which the hydrodesulphurization catalytically active component is a Group VIII metal element and a Group VIB metal element;

in which in the hydrofining catalyst, the content of the Group VIII metal element is 15-35 wt %, preferably 20-30 wt %; and the content of the Group VIB metal element is 35-75 wt %, preferably 40-65 wt %, based on the weight on a dry basis of the catalyst and calculated as oxides;

the Group VIII metal element is preferably at least one selected from the group consisting of iron, cobalt, nickel, ruthenium, rhodium and palladium, and the Group VIB metal element is preferably at least one selected from the group consisting of chromium, molybdenum and tungsten.

D3. The hydrofining catalyst according to Item D2, in which the part of the hydrodesulfurization catalytically active component is a part of the Group VIII metal element, and the amount of the part of the Group VIII metal element is 60-90% of the total amount of the Group VIII metal element.

D4. The hydrofining catalyst according to Item D1 or D2, in which the volume of pores having a pore size of 2-40 nm accounts for 75-90% of the total pore volume and the volume of pores having a pore size of 100-300 nm accounts for 5-15% of the total pore volume;

preferably, the catalyst is a shaped catalyst, which preferably has a shape of a cylinder, a clover, a four-leaf clover or a honeycomb;

preferably, the hydrofining catalyst has a specific surface area of 70-200 m$^2$/g, a pore volume of 0.15-0.6 mL/g, and an average pore size of 5-25 nm;

preferably, in the hydrofining catalyst, the volume of pores having a pore size in the range of 2-4 nm is no more than 10% of the total pore volume.

D5. The hydrofining catalyst according to any one of Items D1 to D4, in which the inorganic refractory component is present in an amount of 5-40 wt %, preferably 10-30 wt %, based on the weight on a dry basis of the catalyst.

D6. The hydrofining catalyst according to any one of Items D1 to D5, in which the ratio of the amount of the carboxylic acid to the weight on a dry basis of the inorganic refractory component is 0.1-0.8:1, preferably 0.2-0.6:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

D7. The hydrofining catalyst according to Item D1, in which the hydrofining catalyst further comprises phosphorus in an amount of 0.8-10 wt %, preferably 1-8 wt %, based on the weight on a dry basis of the catalyst and calculated as $P_2O_5$.

D8. A method for preparing a hydrofining catalyst, comprising the following steps:

(1) mixing a precursor of at least one of silica, magnesia, calcium oxide, zirconia and titania with a part of a precursor of a hydrodesulfurization catalytically active component and calcining, to obtain an inorganic refractory component;

(2) mixing a carboxylic acid with the remaining part of the precursor of the hydrodesulfurization catalytically active component to obtain an impregnation solution;

(3) mixing the inorganic refractory component with the impregnation solution, and shaping and drying the resulting mixture to obtain the hydrofining catalyst.

D9. The method according to Item D8, in which the precursor of the hydrodesulphurization catalytically active component is a precursor of the Group VIII metal element and a precursor of the Group VIB metal element;

in which the precursor of the Group VIII metal element and the precursor of the Group VIB metal element are used in such amounts that, in the hydrofining catalyst, the content of the Group VIII metal element is 15-35 wt %, preferably 20-30 wt %; the content of the Group VIB metal element is 35-75 wt %, preferably 40-65 wt %, based on the weight on a dry basis of the catalyst and calculated as oxides;

the Group VIII metal element is preferably at least one selected from the group consisting of iron, cobalt, nickel, ruthenium, rhodium and palladium, and the Group VIB metal element is preferably at least one selected from the group consisting of chromium, molybdenum and tungsten.

D10. The method according to Item D9, in which the part of the precursor of the hydrodesulfurization catalytically active component is a part of a precursor of the Group VIII metal element in an amount of 60-90% of the total amount of the precursor of the Group VIII metal element.

D11. The method according to any one of Items D8 to D10, in which the inorganic refractory component is used in such an amount that the inorganic refractory component is present in the hydrofining catalyst in an amount of 5-40 wt %, preferably 10-30 wt %, based on the weight on a dry basis of the hydrofining catalyst.

D12. The method according to any one of Items D8 to D11, in which, in step (2), the ratio of the weight of the carboxylic acid used to the weight on a dry basis of the inorganic refractory component is 0.1-0.8:1, preferably 0.2-0.6:1;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

D13. The method according to Item D8, in which the impregnation solution obtained in step (2) further comprises a phosphorus-containing material in such an amount that the content of phosphorus element is 0.8-10 wt %, preferably 1-8 wt %, based on the weight on a dry basis of the hydrofining catalyst and calculated as $P_2O_5$;

preferably, the phosphorus-containing material is at least one selected from the group consisting of phosphoric acid, hypophosphorous acid, ammonium phosphate, and ammonium dihydrogen phosphate.

D14. The method according to item D8, in which, in step (1), the calcining conditions include: a calcining temperature of 300-900° C., preferably 400-800° C.; a calcining time of 1-15 h, preferably 3-8 h.

D15. The method according to Item D8, in which, in step (3), the drying conditions include: a drying temperature of 50-250° C., preferably 100-200° C.; a drying time of 2-10 h, preferably 3-8 h.

D16. The method according to Item D7, in which the precursor of the silica is at least one of silica sol, silica, and silica; the precursor of the magnesia is at least one of magnesium hydroxide, magnesium nitrate, magnesium carbonate, magnesium acetate and magnesium oxide; the precursor of the calcium oxide is at least one of calcium hydroxide, calcium carbonate, calcium oxalate, calcium nitrate, calcium acetate and calcium oxide; the precursor of the zirconia is at least one of zirconium hydroxide, zirconium carbonate, zirconium nitrate, zirconium acetate and zirconium oxide; the precursor of the titania is at least one of titanium hydroxide, titanium nitrate, titanium acetate and titanium oxide;

preferably, the precursors of the silica, magnesia, calcium oxide, zirconia and titania have an average pore size of no less than 10 nm, in which the volume of pores having a pore size of 2-6 nm accounts for no more than 15% of the total pore volume, and the volume of pores having a pore size of 6-40 nm accounts for no less than 75% of the total pore volume.

D17. A hydrofining catalyst prepared by the method according to any one of Items D8 to D16.

D18. Use of a hydrofining catalyst according to any one of Items D1 to D7 and D17 in the hydrofining of distillate oils.

D19. The use according to Item D18, in which the distillate oil has a sulfur content of 5000-30000 ppm, a nitrogen content of 50-3000 ppm, and an aromatics content of 20-80 wt %.

D20. A process for the hydrofining of distillate oils, comprising the steps of: subjecting the hydrofining catalyst according to any one of Items D1-D7 and D17, introducing a distillate oil to be hydrodesulfurized, and contacting the distillate oil to be hydrodesulfurized with the sulfurized hydrofining catalyst under hydrodesulfurization conditions.

E1. A hydrofining catalyst system, comprising a first catalyst bed and a second catalyst bed;

in which a first catalyst contained in the first catalyst bed comprises a first inorganic refractory component, a first hydrodesulfurization catalytically active component, and a carboxylic acid; in which the first inorganic refractory component comprises at least one of silica, magnesia, calcium oxide, zirconia and titania and a part of the first hydrodesulfurization catalytically active component;

the first catalyst has pores with pore sizes in the ranges of 2-40 nm and 100-300 nm, respectively, in which the volume of pores having a pore size in the range of 2 to 40 nm accounts for 60-95% of the total pore volume, and the volume of pores having a pore size in the range of 100-300 nm accounts for 0.5-30% of the total pore volume;

in which a second catalyst contained in the second catalyst bed comprises a second inorganic refractory component, a second hydrodesulfurization catalytically active component, and a carboxylic acid; in which the second inorganic refractory component is alumina; the pore size of the second catalyst is concentrated in the range of 2 to 100 nm;

in which the volume ratio of the first catalyst to the second catalyst is 1:1-8.

E2. The hydrofining catalyst according to Item E1, in which:

in the first catalyst, the first hydrodesulfurization catalytically active component is a Group VIII metal element and a Group VIB metal element;

in which the content of the Group VIII metal element is 15-35 wt %, preferably 20-30 wt %; and the content of the Group VIB metal element is 35-75 wt %, preferably 40-65 wt %, based on the weight on a dry basis of the catalyst and calculated as oxides; and/or in the second catalyst, the second hydrodesulfurization catalytically active component is a Group VIII metal element and a Group VIB metal element;

in which the content of the Group VIII metal element is 1-8 wt %, preferably 2-6 wt %; and the content of the Group VIB metal element is 10-35 wt %, preferably 15-30 wt %, based on the weight on a dry basis of the second catalyst and calculated as oxides;

preferably, the Group VIII metal element is at least one selected from the group consisting of iron, cobalt, nickel, ruthenium, rhodium and palladium, and the Group VIB metal element is at least one selected from the group consisting of chromium, molybdenum and tungsten.

E3. The hydrofining catalyst according to Item E2, in which, in the first catalyst, the part of the first hydrodesulfurization catalytically active component is a part of the Group VIII metal element, and the amount of the part of the Group VIII metal element is 60-90% of the total amount of the Group VIII metal element.

E4. The hydrofining catalyst according to Item E1 or E2, in which:

in the first catalyst, the volume of pores having a pore size of 2-40 nm accounts for 75-90% of the total pore volume, the volume of pores having a pore size of 100-300 nm accounts for 5-15% of the total pore volume, and the volume of pores having a pore size of 2-4 nm is no more than 10% of the total pore volume;

preferably, the first catalyst has a specific surface area of 70-200 m$^2$/g, a pore volume of 0.15-0.6 mL/g, and an average pore size of 5-25 nm; and/or the second catalyst has a specific surface area of 130-300 m$^2$/g, a pore volume of 0.2-0.7 mL/g, and an average pore size of 6-20 nm;

preferably, the first catalyst and the second catalyst are each a shaped catalyst, and the shape of the first catalyst and the shape of the second catalyst are each independently selected from the group consisting of a cylinder, a clover, a four-leaf clover or a honeycomb.

E5. The hydrofining catalyst according to any one of Items E1 to E4, in which:

the first inorganic refractory component is present in the first catalyst in an amount of 5-40 wt %, preferably 10-30 wt %, based on the weight on a dry basis of the first catalyst; and/or the second inorganic refractory component is present in the second catalyst in an amount of 60-85 wt %, preferably 70-80 wt %, based on the weight on a dry basis of the second catalyst.

E6. The hydrofining catalyst according to any one of Items E1 to E5, in which, in the first catalyst, the ratio of the amount of the carboxylic acid to the weight on a dry basis of the first inorganic refractory component is 0.1-0.8:1, preferably 0.2-0.6:1; and/or in the second catalyst, the molar ratio of the carboxylic acid to the Group VIII element is from 0.5 to 8, preferably from 1 to 5;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

E7. The hydrofining catalyst according to Item E1, in which the first catalyst further comprises phosphorus in an amount of 0.8-10 wt %, preferably 1-8 wt %, based on the weight on a dry basis of the first catalyst and calculated as $P_2O_5$; and/or the second catalyst further comprises phosphorus in an amount of 0.8-10 wt %, preferably 1-8 wt %, based on the weight on a dry basis of the second catalyst and calculated as $P_2O_5$.

E8. A method for preparing a hydrofining catalyst system comprising a first catalyst bed and a second catalyst bed, comprising the following steps:

(1) preparing a first catalyst contained in the first catalyst bed by the steps of:
  (1a) mixing a precursor of at least one of silica, magnesia, calcium oxide, zirconia and titania with a part of a precursor of a first hydrodesulfurization catalytically active component and performing a first calcining to obtain a first inorganic refractory component;
  (1b) mixing a carboxylic acid with the remaining part of the precursor of the first hydrodesulfurization catalytically active component to obtain a first impregnation solution;
  (1c) mixing the first inorganic refractory component with the first impregnation solution, shaping and drying the resulting mixture to obtain the first catalyst;
(2) preparing a second catalyst contained in the second catalyst bed by the steps of:
  (2a) mixing an alumina precursor with an extrusion aid and a peptizing agent, and sequentially shaping, drying and performing a secondary calcining on the resulting mixture to produce an alumina carrier;
  (2b) mixing a carboxylic acid and a precursor of a second hydrodesulfurization catalytically active component to obtain a second impregnation solution;
  (2c) mixing the second impregnation solution with the alumina carrier and then drying to obtain the second catalyst;
(3) loading the first catalyst and the second catalyst into the first catalyst bed and the second catalyst bed, respectively, in a volume ratio of 1:1-8 to obtain the hydrofining catalyst system.

E9. The method according to Item E8, in which:

in the step (1), the precursor of the first hydrodesulfurization catalytically active component is a precursor of a Group VIII metal element and a precursor of a Group VIB metal element;

in which the precursors of the Group VIII metal element and the Group VIB metal element are used in such an amount that, in the first catalyst, the content of the Group VIII metal element is 15-35 wt %, preferably 20-30 wt %; and the content of the Group VIB metal element is 35-75 wt %, preferably 40-65 wt %, based on the weight on a dry basis of the first catalyst and calculated as oxides; and/or in the step (2), the precursor of the second hydrodesulfurization catalytically active component is a precursor of a Group VIII metal element and a precursor of a Group VIB metal element;

in which the precursors of the Group VIII metal element and the Group VIB metal element are used in such an amount that, in the second catalyst, the content of the Group VIII metal element is 1-8 wt %, preferably 2-6 wt %; and the content of the Group VIB metal element is 10-35 wt %, preferably 15-30 wt %, based on the weight on a dry basis of the second catalyst and calculated as oxides;

preferably, the Group VIII metal element is at least one selected from the group consisting of iron, cobalt, nickel, ruthenium, rhodium and palladium, and the Group VIB metal element is at least one selected from the group consisting of chromium, molybdenum and tungsten.

E10. The method according to Item E9, in which, in step (1a) the part of the precursor of the first hydrodesulfurization catalytically active component is a part of the precursor of the Group VIII metal element used in the preparation of the first catalyst, and the amount of the part of the precursor of the Group VIII metal element is 60-90% of the total amount of the precursor of the Group VIII metal element used in the preparation of the first catalyst.

E11. The method according to any one of Items E8 to E10, in which, in step (1), the first inorganic refractory component is used in such an amount that the content of the first inorganic refractory component in the first catalyst is 5-40 wt %, preferably 10-30 wt %, based on the weight on a dry basis of the first catalyst; and/or in step (2), the second inorganic refractory component is used in such an amount that the content of the second inorganic refractory component in the second catalyst is 60-85 wt %, preferably 70-80 wt %, based on the weight on a dry basis of the second catalyst.

E12. The method according to any one of Items E8 to E11, in which, in step (1), the carboxylic acid and the second inorganic refractory component are used in such amounts that the ratio of the amount of the carboxylic acid to the weight on a dry basis of the first inorganic refractory component is 0.1-0.8:1, preferably 0.2-0.6:1; and/or in step (2), the carboxylic acid and the VIII Group element are used in a molar ratio of 0.5-8, preferably 1-5;

preferably, the carboxylic acid is at least one selected from the group consisting of $C_{1-18}$ monobasic saturated carboxylic acid, $C_{7-10}$ phenyl acid, citric acid, adipic acid, malonic acid, succinic acid, maleic acid, tartaric acid, and the like.

E13. The method according to Item E8, in which the first impregnation solution further comprises a phosphorus-containing material in such an amount that the content of phosphorus element is 0.8-10 wt %, preferably 1-8 wt %, based on the weight on a dry basis of the first catalyst and calculated as $P_2O_5$; and/or the second impregnation solution further comprises a phosphorus-containing material in an amount that the content of the phosphorus element is 0.8-10 wt %, preferably 1-8 wt %, based on the weight on a dry basis of the second catalyst and calculated by $P_2O_5$;

preferably, the phosphorus-containing material is at least one selected from the group consisting of phosphoric acid, hypophosphorous acid, ammonium phosphate, and ammonium dihydrogen phosphate.

E14. The method according to Item E8, in which:

conditions of the first calcining include: a calcining temperature of 300-900° C., preferably 400-800° C.; a calcining time of 1-15 h, preferably 3-8 h; and/or conditions of the second calcining include: a calcining temperature of 400-1000° C., and preferably 500-800° C.; a calcining time of 1-15 h, preferably 3-8 h.

E15. The method according to Item E8, in which, in step (1c) and step (2a), the drying conditions each independently includes: a drying temperature of 50-250° C., preferably 100-200° C., a drying time of 2-10 h, preferably 3-8 h.

E16. The method according to Item E8, in which the precursor of the silica is at least one of silica sol, white carbon black and silica; the precursor of the magnesia is at least one of magnesium hydroxide, magnesium nitrate, magnesium carbonate, magnesium acetate and magnesium oxide; the precursor of the calcium oxide is at least one of calcium hydroxide, calcium carbonate, calcium oxalate, calcium nitrate, calcium acetate and calcium oxide; the precursor of the zirconia is at least one of zirconium hydroxide, zirconium carbonate, zirconium nitrate, zirconium acetate and zirconium oxide; the precursor of the titania is at least one of titanium hydroxide, titanium nitrate, titanium acetate and titanium oxide;

preferably, the precursors of the silica, magnesia, calcium oxide, zirconia and titania have an average pore size of no less than 10 nm, in which the volume of pores having a pore size of 2-6 nm accounts for no more than 15% of the total pore volume, and the volume of pores having a pore size of 6-40 nm accounts for no less than 75% of the total pore volume.

E17. The method according to Item E8, in which in step (2a), the alumina carrier is prepared under conditions such that, in the alumina carrier, the volume of pores having a pore size in the range of 2-4 nm accounts for 0-20% of the total pore volume, the volume of pores having a pore size in the range of 4-6 nm accounts for 2-15% of the total pore volume, the volume of pores having a pore size in the range of 6-40 nm accounts for 85-95% of the total pore volume, the remaining pores have a pore size in the range of 40-100 nm, and there are no pores having a pore size of greater than 100 nm.

E18. A hydrofining catalyst system prepared by the method according to any one of Items E8 to E17.

E19. Use of a hydrofining catalyst system according to any one of Items E1 to E7 and E18 in the hydrofining of distillate oils.

E20. Use according to Item E19, in which the distillate oil has a sulfur content of 5000-30000 ppm, a nitrogen content of 50-3000 ppm, and an aromatics content of 20-80 wt %.

E21. A process for the hydrofining of distillate oils, comprising the steps of: subjecting the hydrofining catalyst system according to any one of Items E1-E7 and E19, introducing a distillate oil to be hydrodesulfurized, and contacting the distillate oil to be hydrodesulfurized with the sulfurized hydrofining catalyst under hydrodesulfurization conditions.

EXAMPLES

The present application will be further illustrated with reference to the following examples, which are not intended to limit the scope of the present application.

In the following Examples I-II series and Comparative Examples I-II series, the hydrodesulfurization performance of the catalyst was determined using a 20 mL high pressure hydrodesulfurization reactor, and catalysts in oxidized state were converted to sulfurized catalysts directly by temperature programmed sulfurizing. The sulfurization conditions include: a sulfurization pressure of 6.4 MPa, use of kerosene containing 2 wt % of $CS_2$ as the sulfurized oil, a volume space velocity of 2 $h^{-1}$, and a hydrogen-to-oil ratio of 300 v/v. The temperature was kept at 230° C./h for 6 h, then raised to 360° C. for sulfurization for 8 h, with the temperature raising rate of each stage being 10° C./h. After sulfurization, the oil was switched to the feedstock oil to carry out a test of the hydrodesulfurization activity, in which the feedstock oil was a high-nitrogen high-aromatics distillate oil having a sulfur content of 9100 ppm, a nitrogen content of 532 ppm and an aromatics content of 55 wt %. The test conditions include: a pressure of 6.4 MPa, a volume space velocity of 1.5 $h^{-1}$, a hydrogen-to-oil ratio of 300 v/v, and a reaction temperature of 340° C. After the reaction was stabilized for 7 days, the product was analyzed for sulfur content.

The composition of the catalyst was calculated based on the amounts of the raw materials used in its preparation. The product was analyzed for mass fractions of sulfur and nitrogen using a sulfur-nitrogen analyzer (TN/TS3000, available from Thermo Fisher), and the aromatics content of the product was determined by near-infrared spectroscopy using the Antaris II analyzer manufactured by Thermo Scientific Company. The specific surface area of the catalyst and the distribution, size and volume of pores having a pore size in the range of 2-40 nm in the catalyst were determined by the low-temperature nitrogen adsorption method (according to GB/T5816-1995), and the distribution, size and volume of pores having a pore size in the range of 100-300 nm of the catalyst were determined by the mercury intrusion method (according to GB/T21650.1-2008). The average pore size of the catalyst was calculated using the cylindrical type pore model (i.e. average pore size=total pore volume× 4000/specific surface area).

In the following Examples and Comparative Examples of the present application, XRD patterns of the inorganic refractory component and the catalyst were recorded using the EMPYREAN XRD diffractometer from PANalytical B.V., in which 2θ was 10-70° and the scanning speed was 5°/min.

Unless otherwise stated, in the following Examples I-II series and Comparative Examples I-II series, the amount (including the ratio to other component(s)) and the content of the inorganic refractory component provided refer to the total amount and total content of those constituents, other than the hydrodesulfurization catalytically active component, of the inorganic refractory component, respectively.

Example I-1

This example is provided to illustrate a hydrofining catalyst according to the present application and its preparation.

(1) Commercially available white carbon black (purchased from Sinopharm Chemical Reagent Co., Ltd., specific surface area of 220 $m^2/g$, average pore size of 12.7 nm) and basic cobalt carbonate (purchased from Sinopharm Chemical Reagent Co., Ltd., analytical pure) powder were mixed uniformly, and then calcined at 400° C. for 3 hours to obtain cobalt-containing inorganic refractory powder.

The amount of basic cobalt carbonate used corresponded to a cobalt content (calculated as cobalt oxide) of the catalyst of 22.0 wt %.

(2) Certain amounts of $MoO_3$ (purchased from Sinopharm Chemical Reagent Co., Ltd., analytically pure), basic cobalt carbonate and propanol (purchased from Sinopharm Chemical Reagent Co., Ltd., analytically pure) were added separately into an aqueous solution containing phosphoric acid (purchased from Sinopharm Chemical Reagent Co., Ltd., analytically pure), stirred while heating until completely dissolved, and then a certain amount of citric acid (purchased from Sinopharm Chemical Reagent Co., Ltd., analytically pure) was added and completely dissolved to obtain an impregnation solution containing active metals.

The ratio of the mole amount of the propanol to the mass of the inorganic refractory component was 0.01, and the mass ratio of the citric acid to the inorganic refractory component was 0.02.

(3) The impregnation solution and the inorganic refractory component were uniformly mixed, and then shaped by band extrusion. Then, a catalyst in oxidized state with a grain size of 1.6 mm was obtained by drying at 200° C. for 3 hours.

The impregnation solution and the cobalt-containing inorganic refractory powder were mixed in such a ratio that the resulting catalyst had a molybdenum oxide content of 55.0 wt %, a cobalt oxide content of 30.0 wt %, a $P_2O_5$ content of 5 wt %, and a content of the inorganic refractory component of 10.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 93.0 $m^2/g$, and its pore size was mainly distributed in the ranges of 2-40 nm and 100-300 nm, in which the proportion of the volume of pores having a pore size in the range of 2-40 nm to the total pore volume was 88.5% (the proportion of the volume of pores having a pore size in the range of 2-4 nm to the total pore volume being 8.9%), the proportion of the volume of pores having a pore size in the range of 100-300 nm to the total pore volume was 6.3%, the total pore volume was 0.22 mL/g, and the average pore size was 9.5 nm.

The catalyst was subjected to sulfurization and the reaction test, and the resulting product had a sulfur content of 9.3 ppm, a nitrogen content of 1.8 ppm, and an aromatics content of 36.6 wt %.

Example I-2

This example is provided to illustrate a hydrofining catalyst according to the present application and its preparation.

(1) Commercially available white carbon black (specific surface area of 220 $m^2/g$, average pore size of 12.7 nm) and basic nickel carbonate (purchased from Sinopharm Chemical Reagent Co., Ltd., analytically pure) powder were uniformly mixed, and then calcined at 700° C. for 4 hours, to obtain nickel-containing inorganic refractory powder.

The amount of basic nickel carbonate used corresponded to a nickel content (calculated as nickel oxide) of 15.0 wt % in the catalyst.

(2) Certain amounts of $MoO_3$, basic nickel carbonate and ethylene glycol (purchased from Sinopharm Chemical Reagent Co., Ltd., analytically pure) were added separately into an aqueous solution containing phosphoric acid, stirred while heating until completely dissolved, and then a certain amount of acetic acid (purchased from Sinopharm Chemical Reagent Co., Ltd., analytically pure) was added and completely dissolved to obtain an impregnation solution containing active metals.

The ratio of the mole amount of ethylene glycol to the mass of the inorganic refractory component was 0.015, and the ratio of the mass of acetic acid to the mass of the inorganic refractory component was 0.03.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the resulting catalyst had a molybdenum oxide content of 46.0 wt %, a nickel oxide content of 20.0 wt %, a $P_2O_5$ content of 4 wt %, and a content of the inorganic refractory component of 30.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 145 $m^2/g$, and its pore size was mainly distributed in the ranges of 2-40 nm and 100-300 nm, in which the volume of pores having a pore size in the range of 2-40 nm was 85.5% of the total pore volume (the volume of pores having a pore size in the range of 2-4 nm being 7.6% of the total pore volume), the volume of pores having a pore size in the range of 100-300 nm was 13.2% of the total pore volume, the total pore volume was 0.36 mL/g, and the average pore size was 9.9 nm.

The catalyst was subjected to sulfurization and the reaction test, and the resulting product had a sulfur content of 9.8 ppm, a nitrogen content of 1.9 ppm, and an aromatics content of 34.8 wt %.

Example I-3

This example is provided to illustrate a hydrofining catalyst according to the present application and its preparation.

(1) Commercially available white carbon black (specific surface area of 220 $m^2/g$, average pore size of 12.7 nm) and basic nickel carbonate powder were uniformly mixed and then calcined at 500° C. for 3 hours to obtain a nickel-containing inorganic refractory powder.

The amount of basic nickel carbonate used corresponded to a nickel content (calculated as nickel oxide) of 16.0 wt % in the catalyst.

(2) Certain amounts of $MoO_3$, basic nickel carbonate and butanol (purchased from Sinopharm Chemical Reagent Co., Ltd., analytically pure) were added separately into an aqueous solution containing phosphoric acid, stirred while heating until completely dissolved, and then a certain amount of tartaric acid (purchased from Sinopharm Chemical Reagent Co., Ltd., analytically pure) was added and completely dissolved to obtain an impregnation solution containing active metals.

The ratio of the mole amount of the butanol to the mass of the inorganic refractory component was 0.02, and the ratio of the mass of the tartaric acid to the mass of the inorganic refractory component was 0.05.

(3) The impregnation solution and the inorganic refractory component were uniformly mixed, and then shaped by band extrusion. Then, a catalyst in oxidized state with a grain size of 1.6 mm was obtained by drying at 150° C. for 8 h.

The impregnation solution and the nickel-containing inorganic refractory powder were mixed in such a ratio that the resulting catalyst had a molybdenum oxide content of 47.0 wt %, a nickel oxide content of 25.0 wt %, a $P_2O_5$ content of 8.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 155 $m^2/g$, and its pore size was mainly distributed in the ranges of 2-40 nm and 100-300 nm, in which the proportion of the volume of pores having a pore size in the range of 2-40 nm to the total pore volume was 89.3% (the proportion of the volume of pores having a pore size in the range of 2-4 nm to the total pore volume being 6.7%), the proportion of the volume of pores having a pore size in the range of 100-300 nm to the total pore volume was 7.4%, the total pore volume was 0.31 mL/g, and the average pore size was 8.0 nm.

The catalyst was subjected to sulfurization and the reaction test, and the resulting product had a sulfur content of 6.4 ppm, a nitrogen content of 0.8 ppm, and an aromatics content of 33.5 wt %.

Example I-4

This example is provided to illustrate a hydrofining catalyst according to the present application and its preparation.

(1) Commercially available white carbon black (specific surface area of 220 m$^2$/g, average pore size of 12.7 nm) and basic nickel carbonate powder were uniformly mixed and then calcined at 600° C. for 8 hours to obtain a nickel-containing inorganic refractory powder.

The amount of basic nickel carbonate used corresponded to a nickel content (calculated as nickel oxide) of 20.0 wt % in the catalyst.

(2) Certain amounts of $MoO_3$, ammonium metatungstate (purchased from Sinopharm Chemical Reagent Co., Ltd., analytically pure), basic nickel carbonate and ethylene glycol were added separately into an aqueous solution containing phosphoric acid, stirred while heating until completely dissolved, and then a certain amount of acetic acid was added and completely dissolved to obtain an impregnation solution containing active metals.

The ratio of the molar amount of ethylene glycol to the mass of the inorganic refractory component was 0.012, and the ratio of the mass of acetic acid to the mass of the inorganic refractory component was 0.06.

(3) The impregnation solution and the inorganic refractory component were uniformly mixed, and then shaped by band extrusion. Then, a catalyst in oxidized state with a grain size of 1.6 mm was obtained by drying at 300° C. for 3 hours.

The impregnation solution and the nickel-containing inorganic refractory powder were mixed in such a ratio that the resulting catalyst had a molybdenum oxide content of 22.5 wt %, a tungsten oxide content of 22.5 wt %, a nickel oxide content of 27.0 wt %, a $P_2O_5$ content of 4.0 wt %, and a content of the inorganic refractory component of 15.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 120 m$^2$/g, and its pore size was mainly distributed in the ranges of 2-40 nm and 100-300 nm, in which the volume of pores having a pore size in the range of 2-40 nm was 76.9% of the total pore volume (the volume of pores having a pore size in the range of 2-4 nm being 9.5% of the total pore volume) and the volume of pores having a pore size in the range of 100-300 nm was 20.3% of the total pore volume, the total pore volume was 0.26 mL/g, and the average pore size was 8.7 nm.

The catalyst was subjected to sulfurization and the reaction test, and the resulting product had a sulfur content of 9.1 ppm, a nitrogen content of 1.8 ppm, and an aromatics content of 36.2 wt %.

Example I-5

This example is provided to illustrate a hydrofining catalyst according to the present application and its preparation.

(1) Commercial available zirconium hydroxide powder (purchased from Sinopharm Chemical Reagent Co., Ltd., analytically pure, specific surface area of 180 m$^2$/g, average pore size of 13.3 nm) and basic nickel carbonate powder were mixed uniformly, and then calcined at 400° C. for 3 hours to obtain nickel-containing inorganic refractory powder.

The amount of basic nickel carbonate used corresponded to a nickel content (calculated as nickel oxide) of 28.0 wt % in the catalyst.

(2) Certain amounts of ammonium metatungstate, basic nickel carbonate and glycerol (purchased from Sinopharm Chemical Reagent Co., Ltd., analytically pure) were added separately into an aqueous solution containing phosphoric acid, stirred while heating until completely dissolved, and then a certain amount of caproic acid (purchased from Sinopharm Chemical Reagent Co., Ltd., analytically pure) was added and completely dissolved to obtain an impregnation solution containing active metals.

The ratio of the molar amount of glycerin to the mass of the inorganic refractory component was 0.01, and the ratio of the mass of caproic acid to the mass of the inorganic refractory component was 0.025.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 45.0%, a nickel oxide content of 32.0 wt %, a $P_2O_5$ content of 3.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 109 m$^2$/g, and its pore size was mainly distributed in the ranges of 2-40 nm and 100-300 nm, in which the volume of pores having a pore size in the range of 2-40 nm was 85.6% of the total pore volume (the volume of pores having a pore size in the range of 2-4 nm being 6.8% of the total pore volume) and the volume of pores having a pore size in the range of 100-300 nm was 12.3% of the total pore volume, the total pore volume was 0.29 mL/g, and the average pore size was 10.6 nm.

The catalyst was subjected to sulfurization and the reaction test, and the resulting product had a sulfur content of 7.5 ppm, a nitrogen content of 0.4 ppm, and an aromatics content of 34.8 wt %.

Example I-6

This example is provided to illustrate a hydrofining catalyst according to the present application and its preparation.

(1) Commercially available white carbon black (specific surface area of 220 m$^2$/g, average pore size of 12.7 nm), magnesium nitrate (purchased from Sinopharm Chemical Reagent Co., Ltd., analytically pure) and basic nickel carbonate powder were uniformly mixed, and then calcined at 400° C. for 3 hours to obtain an inorganic refractory powder containing nickel, silica and magnesia.

The amount of basic nickel carbonate used corresponded to a nickel content (calculated as nickel oxide) of 21.0 wt % in the catalyst.

(2) Certain amounts of ammonium metatungstate, nickel nitrate (purchased from Sinopharm Chemical Reagent Co., Ltd., analytically pure) and glycerol were added separately into an aqueous solution, stirred while heating until completely dissolved, and then a certain amount of citric acid was added and completely dissolved to obtain an impregnation solution containing active metals.

The ratio of the mole amount of the glycerol to the mass of the inorganic refractory component was 0.008, and the mass ratio of the citric acid to the inorganic refractory component was 0.08.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 165 $m^2/g$, and its pore size was mainly distributed in the ranges of 2-40 nm and 100-300 nm, in which the proportion of the volume of pores having a pore size in the range of 2-40 nm to the total pore volume was 87.5% (the proportion of the volume of pores having a pore size in the range of 2-4 nm to the total pore volume being 8.7%), the proportion of the volume of pores having a pore size in the range of 100-300 nm to the total pore volume was 7.8%, the total pore volume was 0.32 mL/g, and the average pore size was 7.8 nm.

The catalyst was subjected to sulfurization and the reaction test, and the resulting product had a sulfur content of 9.9 ppm, a nitrogen content of 2.1 ppm, and an aromatics content of 37.2 wt %.

Example I-7

This example is provided to illustrate a hydrofining catalyst according to the present application and its preparation.

The catalyst was prepared substantially as in Examples I-6, except that the Group VIII and Group VIB elements were introduced in step (1) with no change to the total amounts thereof.

(1) Commercially available white carbon black (specific surface area of 220 $m^2/g$, average pore size of 12.7 nm), magnesium nitrate (purchased from Sinopharm Chemical Reagent Co., Ltd., analytically pure), ammonium metatungstate and basic nickel carbonate powder were uniformly mixed, and then calcined at 400° C. for 3 hours to obtain an inorganic refractory powder containing tungsten, nickel, silica and magnesia.

The amount of ammonium metatungstate used corresponded to a tungsten content (calculated as tungsten oxide) of the catalyst of 3.0 wt %, and the amount of basic nickel carbonate used corresponded to a nickel content (calculated as nickel oxide) of the catalyst of 18.0 wt %.

(2) Certain amounts of ammonium metatungstate, nickel nitrate (purchased from Sinopharm Chemical Reagent Co., Ltd., analytically pure) and glycerol were added separately into an aqueous solution, stirred while heating until completely dissolved, and then a certain amount of citric acid was added and completely dissolved to obtain an impregnation solution containing active metals.

The ratio of the mole amount of the glycerol to the mass of the inorganic refractory component was 0.008, and the mass ratio of the citric acid to the inorganic refractory component was 0.08.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the inorganic refractory powder containing tungsten and nickel were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 162 $m^2/g$, and its pore size was mainly distributed in the ranges of 2-40 nm and 100-300 nm, in which the volume of pores having a pore size in the range of 2-40 nm was 85.6% of the total pore volume (the volume of pores having a pore size in the range of 2-4 nm being 8.7% of the total pore volume), the volume of pores having a pore size in the range of 100-300 nm was 8.3% of the total pore volume, the total pore volume was 0.33 mL/g, and the average pore size was 7.9 nm.

The catalyst was subjected to sulfurization and the reaction test, and the resulting product had a sulfur content of 15.3 ppm, a nitrogen content of 5.7 ppm, and an aromatics content of 38.9 wt %.

Example I-8

This example is provided to illustrate a hydrofining catalyst according to the present application and its preparation.

The catalyst was prepared substantially as in Example I-2, except that white carbon black was replaced with pseudo-boehmite powder.

(1) Commercially available pseudo-boehmite powder (purchased from Changling Catalyst Plant of Sinopec, specific surface area of 350 $m^2/g$, average pore size of 12.5 nm) and basic nickel carbonate powder were mixed uniformly, and then calcined at 700° C. for 4 h to obtain a nickel-containing inorganic refractory powder.

The amount of basic nickel carbonate used corresponded to a nickel content (calculated as nickel oxide) of 15.0 wt % in the catalyst.

(2) Certain amounts of $MoO_3$, basic nickel carbonate and ethylene glycol were added separately into an aqueous solution containing phosphoric acid, stirred while heating until completely dissolved, and then a certain amount of acetic acid was added and completely dissolved to obtain an impregnation solution containing active metals.

The ratio of the mole amount of ethylene glycol to the mass of the inorganic refractory component was 0.015, and the ratio of the mass of acetic acid to the mass of the inorganic refractory component was 0.03.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the resulting catalyst had a molybdenum oxide content of 46.0 wt %, a nickel oxide content of 20.0 wt %, a $P_2O_5$ content of 4 wt %, and a content of the inorganic refractory component of 30.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 167 m$^2$/g, and its pore size was mainly distributed in the ranges of 2-40 nm and 100-300 nm, in which the proportion of the volume of pores having a pore size in the range of 2-40 nm to the total pore volume was 89.0% (the proportion of the volume of pores having a pore size in the range of 2-4 nm to the total pore volume being 7.9%), the proportion of the volume of pores having a pore size in the range of 100-300 nm to the total pore volume was 7.3%, the total pore volume was 0.37 mL/g, and the average pore size was 8.9 nm.

The catalyst was subjected to sulfurization and thereaction test, and the resulting product had a sulfur content of 28.5 ppm, a nitrogen content of 7.3 ppm, and an aromatics content of 40.1 wt %.

FIG. 1 shows XRD pattern of the inorganic refractory component and the hydrofining catalyst prepared according to the present Example, in which peaks at 2θ of 37.1°, 43.1° and 62.6° correspond to characteristic peaks of nickel oxide, and peaks at 2θ of 45.5° and 65.8° correspond to characteristic peaks of alumina. As can be seen from the figure, the XRD pattern of the resulting catalyst shows characteristic peaks similar to those of the resulting inorganic refractory component.

Comparative Example I-1

This comparative example is provided to illustrate a non-inventive hydrofining catalyst and its preparation.

Commercially available white carbon black (specific surface area of 220 m$^2$/g, average pore size of 12.7 nm) and basic cobalt carbonate powder were uniformly mixed without a calcining step, to obtain an inorganic refractory powder containing cobalt. The amount of basic cobalt carbonate used corresponded to a cobalt content (calculated as cobalt oxide) of the catalyst of 22.0 wt %. Then, an impregnation solution was prepared in accordance with the step (2) of Example I-1, and a catalyst was prepared in accordance with the step (3) of Example I-1. The contents of the inorganic refractory component and each metal component in the resulting catalyst were the same as those in the catalyst obtained in Example I-1.

After being calcined at 400° C. for 3 hours, the pore size distribution of the catalyst was analyzed using the low-temperature nitrogen adsorption and mercury intrusion methods. The specific surface area of the catalyst was 172 m$^2$/g, and its pore size was mainly distributed in the ranges of 2-40 nm and 100-300 nm, in which the proportion of the volume of pores having a pore size in the range of 2-40 nm to the total pore volume was 90.2% (the proportion of the volume of pores having a pore size in the range of 2-4 nm to the total pore volume being 12.5%), the proportion of the volume of pores having a pore size in the range of 100-300 nm to the total pore volume was 2.5%, the total pore volume was 0.31 mL/g, and the average pore size was 7.2 nm.

The catalyst was subjected to sulfurization and the reaction test, and the resulting product had a sulfur content of 45.6 ppm, a nitrogen content of 8.7 ppm, and an aromatics content of 42.1 wt %.

Comparative Example I-2

This comparative example is provided to illustrate a non-inventive hydrofining catalyst and its preparation.

The same inorganic refractory precursor, active component precursor, organic alcohol and organic carboxylic acid as used in Example I-2 were mixed in the same amounts as in Example I-2, extruded and dried to obtain a catalyst, and the contents of the inorganic refractory component and each metal component in the resulting catalyst were the same as those in Example I-2.

After being calcined at 400° C. for 3 hours, the pore size distribution of the catalyst was analyzed using the low-temperature nitrogen adsorption and mercury intrusion methods. The specific surface area of the catalyst was 122 m$^2$/g, and its pore size was mainly distributed in the ranges of 2-40 nm and 100-300 nm, in which the proportion of the volume of pores having a pore size in the range of 2-40 nm to the total pore volume was 91.5% (the proportion of the volume of pores having a pore size in the range of 2-4 nm to the total pore volume being 10.2%), the proportion of the volume of pores having a pore size in the range of 100-300 nm to the total pore volume was 2.2%, the total pore volume was 0.29 mL/g, and the average pore size was 9.5 nm.

The catalyst was subjected to sulfurization and the reaction test, and the resulting product had a sulfur content of 60.2 ppm, a nitrogen content of 13.5 ppm, and an aromatics content of 43.5 wt %.

Comparative Example I-3

This comparative example is provided to illustrate a non-inventive hydrofining catalyst and its preparation.

A catalyst was prepared substantially as in Example I-6, except that the impregnation solution was prepared without the addition of organic alcohol and organic carboxylic acid.

After being calcined at 400° C. for 3 hours, the pore size distribution of the catalyst was analyzed using the low-temperature nitrogen adsorption and mercury intrusion methods. The specific surface area of the catalyst was 115 m$^2$/g, and its pore size was mainly distributed in the ranges of 2-40 nm and 100-300 nm, in which the volume of pores having a pore size in the range of 2-40 nm was 80.3% of the total pore volume (the volume of pores having a pore size in the range of 2-4 nm being 7.3% of the total pore volume), the volume of pores having a pore size in the range of 100-300 nm was 19.5% of the total pore volume, the total pore volume was 0.38 mL/g, and the average pore size was 13.2 nm.

The catalyst was subjected to sulfurization and the reaction test, and the resulting product had a sulfur content of 32.5 ppm, a nitrogen content of 6.8 ppm, and an aromatics content of 40.3 wt %.

Comparative Example I-4

This comparative example is provided to illustrate a non-inventive hydrofining catalyst and its preparation.

The catalyst was prepared substantially as in Example I-6, except that no Group VIII metal element was introduced in step (1), and the Group VIII metal element was fully introduced in step (2).

(1) Commercially available white carbon black (specific surface area of 220 m$^2$/g, average pore size of 12.7 nm) and magnesium nitrate were uniformly mixed, and then calcined at 400° C. for 3 hours to obtain inorganic refractory powder containing silica and magnesia.

(2) Certain amounts of ammonium metatungstate, nickel nitrate and glycerol were added separately into an aqueous solution, stirred while heating until completely dissolved, and then a certain amount of citric acid was added and completely dissolved to obtain an impregnation solution containing active metals.

The ratio of the mole amount of the glycerol to the mass of the inorganic refractory component was 0.008, and the mass ratio of the citric acid to the inorganic refractory component was 0.08.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the inorganic refractory powder were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 178 m$^2$ g, and its pore size was mainly distributed in the ranges of 2-40 nm and 100-300 nm, in which the proportion of the volume of pores having a pore size in the range of 2-40 nm to the total pore volume was 92.5% (the proportion of the volume of pores having a pore size in the range of 2-4 nm to the total pore volume being 9.8%), the proportion of the volume of pores having a pore size in the range of 100-300 nm to the total pore volume was 4.5%, the total pore volume was 0.30 mL/g, and the average pore size was 6.74 nm.

The catalyst was subjected to sulfurization and the reaction test, and the resulting product had a sulfur content of 37.5 ppm, a nitrogen content of 7.6 ppm, and an aromatics content of 41.8 wt %.

Comparative Example I-5

This comparative example is provided to illustrate a non-inventive hydrofining catalyst and its preparation.

(1) Pseudo-boehmite (purchased from ChangLing Catalyst Plant of Sinopec, specific surface area of 300 m$^2$/g, average pore size of 12 nm, the proportion of the volume of pores having a pore size of 2-6 nm to the total pore volume being 8.9%, and the proportion of the volume of pores having a pore size of 6-40 nm to the total pore volume being 76.5%) was mixed with a proper amount of sesbania powder and nitric acid, and subjected to band extrusion to obtain an alumina carrier precursor with a grain size of 1.6 mm. The precursor was dried at 120° C. for 3 h, and then calcined at 500° C. for 6 h, to produce an alumina carrier as an inorganic refractory component.

(2) Certain amounts of MoO$_3$, basic cobalt carbonate and propanol were added separately into an aqueous solution containing phosphoric acid, stirred while heating until completely dissolved, then a certain amount of citric acid was added and completely dissolved, to obtain an impregnation solution containing active metals.

The molar ratio of the propanol to the cobalt oxide was 1:1, and the mass ratio of the citric acid to the alumina was 0.02.

(3) The carrier was impregnated according to the pore saturation impregnation method and dried at 120° C. for 3 h to produce a catalyst in oxidized state with a grain size of 1.6 mm.

The catalyst had a molybdenum oxide content of 25.5 wt %, a cobalt oxide content of 5.6 wt % and a content of the inorganic refractory component of 68.9 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 158.0 m$^2$/g, its pore size was mainly distributed in 2-40 nm, there were no pores having a pore size of 100-300 nm, the total pore volume was 0.42 mL/g and the average pore size was 10.6 nm.

The catalyst was subjected to sulfurization and the reaction test, and the resulting product had a sulfur content of 48.3 ppm, a nitrogen content of 6.1 ppm, and an aromatics content of 43.8 wt %.

TABLE I

Test results of the Example I series and the Comparative Example I series

| Example No. | Sulfur content (ppm) | Nitrogen content (ppm) | Aromatics content (wt %) |
| --- | --- | --- | --- |
| Example I-1 | 9.3 | 18 | 36.6% |
| Example I-2 | 9.8 | 19 | 34.8% |
| Example I-3 | 6.4 | 0.8 | 33.5% |
| Example I-4 | 9.1 | 1.8 | 36.2% |
| Example I-5 | 7.5 | 0.4 | 34.8% |
| Example I-6 | 9.9 | 2.1 | 37.2% |
| Example I-7 | 15.3 | 5.7 | 38.9% |
| Example I-8 | 28.5 | 7.3 | 40.1% |
| Comparative Example I-1 | 45.6 | 8.7 | 42.1% |
| Comparative Example I-2 | 60.2 | 13.5 | 43.5% |
| Comparative Example I-3 | 32.5 | 6.8 | 40.3% |
| Comparative Example I-4 | 37.5 | 7.6 | 41.8% |
| Comparative Example I-5 | 48.3 | 6.1 | 43.8% |

As can be seen from the comparison of the results of the above Example I series and the Comparative Example I series, the catalyst according to the present application shows good performance, and compared with non-inventive catalysts, the performance is improved, the preparation process is shortened, the production cost is reduced, and thus the catalyst according to the present application has good industrial application prospect.

Example II-1

This example is provided to illustrate a hydrofining catalyst according to the present application and its preparation.

(1) Commercially available white carbon black (specific surface area of 220 m$^2$/g, average pore size of 12.7 nm) and basic cobalt carbonate powder were uniformly mixed, and then calcined at 400° C. for 3 hours to obtain an inorganic refractory powder containing cobalt.

The amount of basic cobalt carbonate used corresponded to a cobalt content (calculated as cobalt oxide) of the catalyst of 22.0 wt %.

(2) Certain amounts of MoO$_3$, basic cobalt carbonate and citric acid were added separately into an aqueous solution containing phosphoric acid, and stirred while heating until completely dissolved to obtain an impregnation solution containing active metals.

The mass ratio of the citric acid to the inorganic refractory component was 0.2.

(3) The impregnation solution and the inorganic refractory component were uniformly mixed, and then shaped by band extrusion. Then, a catalyst in oxidized state with a grain size of 1.6 mm was obtained by drying at 200° C. for 3 hours.

The impregnation solution and the cobalt-containing inorganic refractory powder were mixed in such a ratio that the resulting catalyst had a molybdenum oxide content of 55.0 wt %, a cobalt oxide content of 30.0 wt %, a P$_2$O$_5$ content of 5 wt %, and a content of the inorganic refractory component of 10.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 96.0 m$^2$/g, and its pore size was mainly distributed in the ranges of 2-40 nm and 100-300 nm, in which the proportion of the volume of pores having a pore size in the range of 2-40 nm to the total pore volume was 86.6% (the proportion of the volume of pores having a pore size in the range of 2-4 nm to the total pore volume being 9.5%), the proportion of the volume of pores having a pore size in the range of 100-300 nm to the total pore volume was 7.2%, the total pore volume was 0.26 mL/g, and the average pore size was 10.8 nm.

The catalyst was subjected to sulfurization and the reaction test, and the resulting product had a sulfur content of 6.4 ppm, a nitrogen content of 1.2 ppm, and an aromatics content of 36.1 wt %.

Example II-2

This example is provided to illustrate a hydrofining catalyst according to the present application and its preparation.

(1) Commercially available white carbon black (specific surface area of 220 m$^2$/g, average pore size of 12.7 nm) and basic nickel carbonate powder were uniformly mixed and then calcined at 700° C. for 4 hours to obtain a nickel-containing inorganic refractory powder.

The amount of basic nickel carbonate used corresponded to a nickel content (calculated as nickel oxide) of 15.0 wt % in the catalyst.

(2) Certain amounts of MoO$_3$, basic nickel carbonate and acetic acid were added separately into an aqueous solution containing phosphoric acid, and stirred while heating until completely dissolved to obtain an impregnation solution containing active metals.

The mass ratio of the acetic acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the resulting catalyst had a molybdenum oxide content of 46.0 wt %, a nickel oxide content of 20.0 wt %, a P$_2$O$_5$ content of 4 wt %, and a content of the inorganic refractory component of 30.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 149 m$^2$/g, and its pore size was mainly distributed in the ranges of 2-40 nm and 100-300 nm, in which the volume of pores having a pore size in the range of 2-40 nm was 88.5% of the total pore volume (the volume of pores having a pore size in the range of 2-4 nm being 6.3% of the total pore volume) and the volume of pores having a pore size in the range of 100-300 nm was 10.0% of the total pore volume, the total pore volume was 0.33 mL/g, and the average pore size was 8.9 nm.

The catalyst was subjected to sulfurization and the reaction test, and the resulting product had a sulfur content of 5.4 ppm, a nitrogen content of 0.9 ppm, and an aromatics content of 33.9 wt %.

Example II-3

This example is provided to illustrate a hydrofining catalyst according to the present application and its preparation.

(1) Commercially available white carbon black (specific surface area of 220 m$^2$/g, average pore size of 12.7 nm) and basic nickel carbonate powder were uniformly mixed and then calcined at 500° C. for 3 hours to obtain a nickel-containing inorganic refractory powder.

The amount of basic nickel carbonate used corresponded to a nickel content (calculated as nickel oxide) of 16.0 wt % in the catalyst.

(2) Certain amounts of MoO$_3$, basic nickel carbonate and tartaric acid were added separately into an aqueous solution containing phosphoric acid, and stirred while heating until completely dissolved to obtain an impregnation solution containing active metals.

The mass ratio of the tartaric acid to the inorganic refractory component was 0.5.

(3) The impregnation solution and the inorganic refractory component were uniformly mixed, and then shaped by band extrusion. Then, a catalyst in oxidized state with a grain size of 1.6 mm was obtained by drying at 150° C. for 8 h.

The impregnation solution and the nickel-containing inorganic refractory powder were mixed in such a ratio that the resulting catalyst had a molybdenum oxide content of 47.0 wt %, a nickel oxide content of 25.0 wt %, a P$_2$O$_5$ content of 8.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 151 m$^2$/g, and its pore size was mainly distributed in the ranges of 2-40 nm and 100-300 nm, in which the volume of pores having a pore size in the range of 2-40 nm was 90.0% of the total pore volume (the volume of pores having a pore size in the range of 2-4 nm being 7.6% of the total pore volume), the volume of pores having a pore size in the range of 100-300 nm was 6.1% of the total pore volume, the total pore volume was 0.28 mL/g, and the average pore size was 7.4 nm.

The catalyst was subjected to sulfurization and the reaction test, and the resulting product had a sulfur content of 4.5 ppm, a nitrogen content of 0.6 ppm, and an aromatics content of 32.9 wt %.

Example II-4

This example is provided to illustrate a hydrofining catalyst according to the present application and its preparation.

(1) Commercially available white carbon black (specific surface area of 220 m²/g, average pore size of 12.7 nm) and basic nickel carbonate powder were uniformly mixed and then calcined at 600° C. for 8 hours to obtain a nickel-containing inorganic refractory powder.

The amount of basic nickel carbonate used corresponded to a nickel content (calculated as nickel oxide) of 20.0 wt % in the catalyst.

(2) Certain amounts of MoO₃, ammonium metatungstate, basic nickel carbonate and acetic acid were added separately into an aqueous solution containing phosphoric acid, and stirred while heating until completely dissolved to obtain an impregnation solution containing active metals.

The mass ratio of the acetic acid to the inorganic refractory component was 0.25.

(3) The impregnation solution and the inorganic refractory component were uniformly mixed, and then shaped by band extrusion. Then, a catalyst in oxidized state with a grain size of 1.6 mm was obtained by drying at 300° C. for 3 hours.

The impregnation solution and the nickel-containing inorganic refractory powder were mixed in such a ratio that the resulting catalyst had a molybdenum oxide content of 22.5 wt %, a tungsten oxide content of 22.5 wt %, a nickel oxide content of 27.0 wt %, a $P_2O_5$ content of 4.0 wt %, and a content of the inorganic refractory component of 15.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 132 m²/g, and its pore size was mainly distributed in the ranges of 2-40 nm and 100-300 nm, in which the volume of pores having a pore size in the range of 2-40 nm was 81.1% of the total pore volume (the volume of pores having a pore size in the range of 2-4 nm being 7.9% of the total pore volume), the volume of pores having a pore size in the range of 100-300 nm was 16.5% of the total pore volume, the total pore volume was 0.27 mL/g, and the average pore size was 8.2 nm.

The catalyst was subjected to sulfurization and the reaction test, and the resulting product had a sulfur content of 6.9 ppm, a nitrogen content of 1.2 ppm, and an aromatics content of 36.3 wt %.

Example II-5

This example is provided to illustrate a hydrofining catalyst according to the present application and its preparation.

(1) Commercial available zirconium hydroxide powder (specific surface area of 180 m²/g, average pore size of 13.3 nm) and basic nickel carbonate powder were uniformly mixed and then calcined at 400° C. for 3 h to obtain a nickel-containing inorganic refractory powder.

The amount of basic nickel carbonate used corresponded to a nickel content (calculated as nickel oxide) of 28.0 wt % in the catalyst.

(2) Certain amounts of ammonium metatungstate, basic nickel carbonate and caproic acid were added separately into a water solution containing phosphoric acid, and stirred while heating until completely dissolved to obtain an impregnation solution containing active metals.

The mass ratio of the caproic acid to the inorganic refractory component was 0.6.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 45.0%, a nickel oxide content of 32.0 wt %, a $P_2O_5$ content of 3.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 104 m²/g, and its pore size was mainly distributed in the ranges of 2-40 nm and 100-300 nm, in which the volume of pores having a pore size in the range of 2-40 nm was 82.2% of the total pore volume (the volume of pores having a pore size in the range of 2-4 nm being 6.0% of the total pore volume), the volume of pores having a pore size in the range of 100-300 nm was 14.5% of the total pore volume, the total pore volume was 0.34 mL/g, and the average pore size was 13.1 nm.

The catalyst was subjected to sulfurization and the reaction test, and the resulting product had a sulfur content of 4.2 ppm, a nitrogen content of 0.3 ppm, and an aromatics content of 33.2 wt %.

Example II-6

This example is provided to illustrate a hydrofining catalyst according to the present application and its preparation.

(1) Commercially available white carbon black (specific surface area of 220 m²/g, average pore size of 12.7 nm), magnesium nitrate and basic nickel carbonate powder were uniformly mixed, and then calcined at 400° C. for 3 hours to obtain an inorganic refractory powder containing nickel, silica and magnesia.

The amount of basic nickel carbonate used corresponded to a nickel content (calculated as nickel oxide) of 21.0 wt % in the catalyst.

(2) Certain amounts of ammonium metatungstate, nickel nitrate and citric acid were added separately into an aqueous solution, and stirred while heating until completely dissolved to obtain an impregnation solution containing active metals.

The mass ratio of the citric acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 143 m$^2$/g, and its pore size was mainly distributed in the ranges of 2-40 nm and 100-300 nm, in which the volume of pores having a pore size in the range of 2-40 nm was 85.3% of the total pore volume (the volume of pores having a pore size in the range of 2-4 nm being 7.8% of the total pore volume), the volume of pores having a pore size in the range of 100-300 nm was 9.4% of the total pore volume, the total pore volume was 0.35 mL/g, and the average pore size was 9.8 nm.

The catalyst was subjected to sulfurization and the reaction test, and the resulting product had a sulfur content of 6.7 ppm, a nitrogen content of 1.1 ppm, and an aromatics content of 35.4 wt %.

Example II-7

This example is provided to illustrate a hydrofining catalyst according to the present application and its preparation.

A catalyst was prepared substantially as in Examples II-6, except that the Group VIII and Group VIB elements were introduced in step (1) with no change to the total amounts thereof.

(1) Commercially available white carbon black (specific surface area of 220 m$^2$/g, average pore size of 12.7 nm), magnesium nitrate, ammonium metatungstate and basic nickel carbonate powder were uniformly mixed, and then calcined at 400° C. for 3 hours to obtain an inorganic refractory powder containing tungsten, nickel, silica and magnesia.

The amount of ammonium metatungstate used corresponded to a tungsten content (calculated as tungsten oxide) of the catalyst of 3.0 wt %, and the amount of basic nickel carbonate used corresponded to a nickel content (calculated as nickel oxide) of the catalyst of 18.0 wt %.

(2) Certain amounts of ammonium metatungstate, nickel nitrate and citric acid were added separately into an aqueous solution, and stirred while heating until completely dissolved to obtain an impregnation solution containing active metals.

The mass ratio of the citric acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 152 m$^2$/g, and its pore size was mainly distributed in the ranges of 2-40 nm and 100-300 nm, in which the proportion of the volume of pores having a pore size in the range of 2-40 nm to the total pore volume was 91.2% (the proportion of the volume of pores having a pore size in the range of 2-4 nm to the total pore volume being 8.5%), the proportion of the volume of pores having a pore size in the range of 100-300 nm to the total pore volume was 8.2%, the total pore volume was 0.33 mL/g, and the average pore size was 8.7 nm.

The catalyst was subjected to sulfurization and the reaction test, and the resulting product had a sulfur content of 11.2 ppm, a nitrogen content of 4.6 ppm, and an aromatics content of 38.4 wt %.

Example II-8

This example is provided to illustrate a hydrofining catalyst according to the present application and its preparation.

The catalyst was prepared substantially as in Example II-2, except that white carbon black was replaced with pseudo-boehmite powder.

(1) Commercially available pseudo-boehmite (specific surface area of 350 m$^2$/g, average pore size of 12.5 nm) and basic nickel carbonate powder were uniformly mixed and then calcined at 700° C. for 4 h to obtain a nickel-containing inorganic refractory powder.

The amount of basic nickel carbonate used corresponded to a nickel content (calculated as nickel oxide) of 15.0 wt % in the catalyst.

(2) Certain amounts of MoO$_3$, basic nickel carbonate and acetic acid were added separately into an aqueous solution containing phosphoric acid, and stirred while heating until completely dissolved to obtain an impregnation solution containing active metals.

The mass ratio of the acetic acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the resulting catalyst had a molybdenum oxide content of 46.0 wt %, a nickel oxide content of 20.0 wt %, a P$_2$O$_5$ content of 4 wt %, and a content of the inorganic refractory component of 30.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 154 m$^2$/g, and its pore size was mainly distributed in the ranges of 2-40 nm and 100-300 nm, in which the proportion of the volume of pores having a pore size in the range of 2-40 nm to the total pore volume was 92.1% (the proportion of the volume of pores having a pore size in the range of 2-4 nm to the total pore volume being 8.2%), the proportion of the volume of pores having a pore size in the range of 100-300 nm to the total pore volume was 6.2%, the total pore volume was 0.31 mL/g, and the average pore size was 8.1 nm.

The catalyst was subjected to sulfurization and the reaction test, and the resulting product had a sulfur content of 26.2 ppm, a nitrogen content of 6.0 ppm, and an aromatics content of 39.7 wt %.

Comparative Example II-1

This comparative example is provided to illustrate a non-inventive hydrofining catalyst and its preparation.

Commercially available white carbon black (specific surface area of 220 m$^2$/g, average pore size of 12.7 nm) and basic cobalt carbonate powder were uniformly mixed without a calcining step, to obtain an inorganic refractory powder containing cobalt. The amount of basic cobalt carbonate used corresponded to a cobalt content (calculated as cobalt oxide) of the catalyst of 22.0 wt %. Then, an impregnation solution was prepared in accordance with the step (2) of Example II-1, and a catalyst was prepared in accordance with the step (3) of Example II-1. The contents of the inorganic refractory component and each metal component in the resulting catalyst were the same as those in Example II-1.

After being calcined at 400° C. for 3 hours, the pore size distribution of the catalyst was analyzed using the low-temperature nitrogen adsorption and mercury intrusion methods. The specific surface area of the catalyst was 103 m$^2$/g, and its pore size was mainly distributed in the ranges of 2-40 nm and 100-300 nm, in which the proportion of the volume of pores having a pore size in the range of 2-40 nm to the total pore volume was 89.2% (the proportion of the volume of pores having a pore size in the range of 2-4 nm to the total pore volume being 10.2%), the proportion of the volume of pores having a pore size in the range of 100-300 nm to the total pore volume was 3.5%, the total pore volume was 0.25 mL/g, and the average pore size was 9.7 nm.

The catalyst was subjected to sulfurization and the reaction test, and the resulting product had a sulfur content of 39.5 ppm, a nitrogen content of 7.9 ppm, and an aromatics content of 41.6 wt %.

Comparative Example II-2

This comparative example is provided to illustrate a non-inventive hydrofining catalyst and its preparation.

The same inorganic refractory precursor, active component precursor and organic carboxylic acid as used in Example II-2 were mixed in the same amounts as in Example II-2, extruded and dried to obtain a catalyst, and the contents of the inorganic refractory component and each metal component in the resulting catalyst were the same as those in Example II-2.

After being calcined at 400° C. for 3 hours, the pore size distribution of the catalyst was analyzed using the low-temperature nitrogen adsorption and mercury intrusion methods. The specific surface area of the catalyst was 152 m$^2$/g, and its pore size was mainly distributed in the ranges of 2-40 nm and 100-300 nm, in which the volume of pores having a pore size in the range of 2-40 nm was 92.2% of the total pore volume (the volume of pores having a pore size in the range of 2-4 nm being 8.1% of the total pore volume), the volume of pores having a pore size in the range of 100-300 nm was 2.1% of the total pore volume, the total pore volume was 0.32 mL/g, and the average pore size was 8.4 nm.

The catalyst was subjected to sulfurization and the reaction test, and the resulting product had a sulfur content of 52.7 ppm, a nitrogen content of 10.1 ppm, and an aromatics content of 42.2 wt %.

Comparative Example II-3 (the Same as Comparative Example I-3)

This comparative example is provided to illustrate a non-inventive hydrofining catalyst and its preparation.

A catalyst was prepared substantially as in Example II-6, except that no organic carboxylic acid was added to the impregnation solution.

After being calcined at 400° C. for 3 hours, the pore size distribution of the catalyst was analyzed using the low-temperature nitrogen adsorption and mercury intrusion methods. The specific surface area of the catalyst was 115 m$^2$/g, and its pore size was mainly distributed in the ranges of 2-40 nm and 100-300 nm, in which the volume of pores having a pore size in the range of 2-40 nm was 80.3% of the total pore volume (the volume of pores having a pore size in the range of 2-4 nm being 7.3% of the total pore volume), the volume of pores having a pore size in the range of 100-300 nm was 18.5% of the total pore volume, the total pore volume was 0.38 mL/g, and the average pore size was 13.2 nm.

The catalyst was subjected to sulfurization and the reaction test, and the resulting product had a sulfur content of 32.5 ppm, a nitrogen content of 6.8 ppm, and an aromatics content of 40.3 wt %.

Comparative Example II-4

This comparative example is provided to illustrate a non-inventive hydrofining catalyst and its preparation.

The catalyst was prepared substantially as in Example II-6, except that no Group VIII metal element was introduced in the step (1), and the Group VIII metal element was fully introduced in the step (2).

(1) Commercially available white carbon black (specific surface area of 220 m$^2$/g, average pore size of 12.7 nm) and magnesium nitrate were uniformly mixed, and then calcined at 400° C. for 3 hours to obtain inorganic refractory powder containing silica and magnesia.

(2) Certain amounts of ammonium metatungstate, nickel nitrate and citric acid were added separately into an aqueous solution, and stirred while heating until completely dissolved to obtain an impregnation solution containing active metals.

The mass ratio of the citric acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the resulting catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the catalyst was 148 m²/g, and its pore size was mainly distributed in the ranges of 2-40 nm and 100-300 nm, in which the volume of pores having a pore size in the range of 2-40 nm was 93.0% of the total pore volume (the volume of pores having a pore size in the range of 2-4 nm being 8.2% of the total pore volume), the volume of pores having a pore size in the range of 100-300 nm was 5.2% of the total pore volume, the total pore volume was 0.33 mL/g, and the average pore size was 8.9 nm.

The catalyst was subjected to sulfurization and the reaction test, and the resulting product had a sulfur content of 30.8 ppm, a nitrogen content of 6.3 ppm, and an aromatics content of 40.1 wt %.

TABLE II

Test results of the Example II series and the Comparative Example II series

| Example No. | Sulfur content (ppm) | Nitrogen content (ppm) | Aromatics content (wt %) |
|---|---|---|---|
| Example II-1 | 6.4 | 1.2 | 36.1% |
| Example II-2 | 5.4 | 0.9 | 33.9% |
| Example II-3 | 4.5 | 0.6 | 32.9% |
| Example II-4 | 6.9 | 1.2 | 36.3% |
| Example II-5 | 4.2 | 0.3 | 33.2% |
| Example II-6 | 6.7 | 1.1 | 35.4% |
| Example II-7 | 11.2 | 4.6 | 38.4% |
| Example II-8 | 26.2 | 6.0 | 39.7% |
| Comparative Example II-1 | 39.5 | 7.9 | 41.6% |
| Comparative Example II-2 | 52.7 | 10.1 | 42.2% |
| Comparative Example II-3 | 32.5 | 6.8 | 40.3% |
| Comparative Example II-4 | 30.8 | 6.3 | 40.1% |

As can be seen from the comparison of the results of the above Example II series and the Comparative Example II series, the catalyst according to the present application shows good performance, and compared with non-inventive catalysts, the performance is improved, the preparation process is shortened, the production cost is reduced, and thus the catalyst according to the present application has good industrial application prospect.

In the following Examples III-IV series and Comparative Examples III-IV series, the hydrodesulfurization performance of the catalyst system was determined using a 20 mL high pressure hydrodesulfurization reactor, and catalysts in oxidized state were converted to sulfurized catalysts directly by temperature programmed sulfurizing. The sulfurization conditions include: a sulfurization pressure of 6.4 MPa, use of kerosene containing 2 wt % of $CS_2$ as the sulfurized oil, a volume space velocity of 2 h$^{-1}$, and a hydrogen-to-oil ratio of 300 v/v. The temperature was kept at 230° C./h for 6 h, then raised to 360° C. for sulfurization for 8 h, with the temperature raising rate of each stage being 10° C./h. After sulfurization, the oil was switched to the feedstock oil to carry out a test of the hydrodesulfurization activity, in which the feedstock oil was a high-nitrogen high-aromatics distillate oil having a sulfur content of 9100 ppm, a nitrogen content of 532 ppm and an aromatics content of 55 wt %. The test conditions include: a pressure of 6.4 MPa, a volume space velocity of 2.0 h$^{-1}$, a hydrogen-to-oil ratio of 300 v/v, and a reaction temperature of 340° C. After the reaction was stabilized for 7 days, the product was analyzed for sulfur content.

The composition of the catalyst was calculated based on the amounts of the raw materials used in its preparation. The product was analyzed for mass fractions of sulfur and nitrogen using a sulfur-nitrogen analyzer (TN/TS3000, available from Thermo Fisher), and the aromatics content of the product was determined by near-infrared spectroscopy using the Antaris II analyzer manufactured by Thermo Scientific Company. The specific surface area of the alumina carrier and the catalyst, as well as the distribution, size and volume of pores having a pore size of no more than 100 nm in the alumina carrier and the catalyst, was determined by the low-temperature nitrogen adsorption method (according to GB/T5816-1995), and the distribution, size and volume of pores having a pore size in the range of 100-300 nm of the alumina carrier and the catalyst were determined by the mercury intrusion method (according to GB/T21650.1-2008). The average pore size of the catalyst was calculated using the cylindrical type pore model (i.e. average pore size=total pore volume×4000/specific surface area).

In the following Examples and Comparative Examples of the present application, XRD patterns of the inorganic refractory component and the catalyst were recorded using the EMPYREAN XRD diffractometer from PANalytical B.V., in which 2θ was 10-70° and the scanning speed was 5°/min.

Unless otherwise stated, in the following Examples III-IV series and Comparative Examples III-IV series, the amount (including the ratio to other component(s)) and the content of the inorganic refractory component provided refer to the total amount and total content of those constituents, other than the hydrodesulfurization catalytically active component, of the inorganic refractory component, respectively.

Example III-1

This example is provided to illustrate a hydrofining catalyst system according to the present application and its preparation.

A catalyst (Cat 1A) in a first bed was prepared with reference to Example I-1 as follows:

(1) Commercially available white carbon black (specific surface area of 220 m²/g, average pore size of 12.7 nm) and basic cobalt carbonate powder were uniformly mixed, and then calcined at 400° C. for 3 hours to obtain an inorganic refractory powder containing cobalt.

The amount of basic cobalt carbonate used corresponded to a cobalt content (calculated as cobalt oxide) of the catalyst of 22.0 wt %.

(2) Certain amounts of $MoO_3$, basic cobalt carbonate and propanol were added separately into an aqueous solution containing phosphoric acid, stirred while heating until completely dissolved, then a certain amount of citric acid was added and completely dissolved, to obtain an impregnation solution containing active metals.

The ratio of the mole amount of the propanol to the mass of the inorganic refractory component was 0.01, and the mass ratio of the citric acid to the inorganic refractory component was 0.02.

(3) The impregnation solution and the inorganic refractory component were uniformly mixed, and then shaped by band extrusion. Then, a catalyst in oxidized state with a grain size of 1.6 mm was obtained by drying at 200° C. for 3 hours.

The impregnation solution and the cobalt-containing inorganic refractory powder were mixed in such a ratio that the content of molybdenum oxide, the content of cobalt oxide, the content of $P_2O_5$, and the content of inorganic refractory component in the Cat1A catalyst were 55.0 wt %, 30.0 wt %, 5 wt %, and 10 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat1A catalyst was 93.0 m$^2$/g, and its pore size was mainly distributed in the ranges of 2-40 nm and 100-300 nm, in which the volume of pores having a pore size in the range of 2-40 nm was 88.5% of the total pore volume (the volume of pores having a pore size in the range of 2-4 nm being 8.9% of the total pore volume), the volume of pores having a pore size in the range of 100-300 nm was 6.3% of the total pore volume, the total pore volume was 0.22 mL/g, and the average pore size was 9.5 nm.

A catalyst (Cat 1B) in a second bed was prepared as follows:

(1) pseudo-boehmite (specific surface area of 295 m$^2$/g, total pore volume of 1.05 mL/g, and average pore size of 14.2 nm) was mixed with a proper amount of sesbania powder (purchased from ChangLing Catalyst Plant of Sinopec, industrial pure) and nitric acid (purchased from Sinopharm Chemical Reagent Co., Ltd., analytical pure), and subjected to band extrusion to obtain an alumina carrier precursor with a grain size of 1.6 mm. The precursor was dried at 120° C. for 3 h, and then calcined at 500° C. for 3 h to obtain an alumina carrier as an inorganic refractory component;

(2) Certain amounts of MoO$_3$, basic nickel carbonate and propanol were added separately into an aqueous solution containing phosphoric acid, stirred while heating until completely dissolved to obtain an impregnation solution containing active metals, in which the molar ratio of propanol to nickel atoms was 4:1;

(3) The alumina carrier and the impregnation solution were uniformly mixed, and dried at 200° C. for 3 h to produce a catalyst in oxidized state.

As determined by low-temperature nitrogen adsorption and mercury intrusion methods, in the alumina carrier, the proportion of the volume of pores having a pore size of 2-4 nm to the total pore volume was 1.6%, the proportion of the volume of pores having a pore size of 4-6 nm to the total pore volume was 9.5%, the proportion of the volume of pores having a pore size of 6-40 nm to the total pore volume was 85.0%, the proportion of the volume of pores having a pore size of 40-100 nm to the total pore volume was 3.9%, and there were no pores having a pore size greater than 100 nm.

The Cat1B catalyst contained 30.0 wt % molybdenum, 6.0 wt % nickel, and 5 wt % P$_2$O$_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat1B catalyst had a specific surface area of 205 m$^2$/g, a total pore volume of 0.39 mL/g, and an average pore size of 7.6 nm, in which the volume of pores having a pore size in the range of 2-4 nm was 5.6% of the total pore volume, the volume of pores having a pore size in the range of 4-6 nm was 14.3% of the total pore volume, the volume of pores having a pore size in the range of 6-40 nm was 76.8% of the total pore volume, the volume of pores having a pore size in the range of 40-100 nm was 3.3% of the total pore volume, and there were no pores having a pore size greater than 100 nm.

The Cat1A and Cat1B catalysts were compounded and loaded in a volume ratio of 1:6, the catalyst system was subjected to sulfurization and the reaction test, and the sulfur content, nitrogen content and aromatics content of the resulting product were 9.3 ppm, 1.5 ppm and 33.8 wt %, respectively.

Example III-2

This example is provided to illustrate a hydrofining catalyst system according to the present application and its preparation.

A catalyst (Cat 2A) of a first bed was prepared with reference to Example I-2 as follows:

(1) Commercially available white carbon black (specific surface area of 220 m$^2$/g, average pore size of 12.7 nm) and basic nickel carbonate powder were uniformly mixed and then calcined at 700° C. for 4 hours to obtain a nickel-containing inorganic refractory powder.

The amount of basic nickel carbonate used corresponded to a nickel content (calculated as nickel oxide) of 15.0 wt % in the catalyst.

(2) Certain amounts of MoO$_3$, basic nickel carbonate and ethylene glycol were added separately into an aqueous solution containing phosphoric acid, stirred while heating until completely dissolved, and then a certain amount of acetic acid was added and completely dissolved to obtain an impregnation solution containing active metals.

The ratio of the mole amount of ethylene glycol to the mass of the inorganic refractory component was 0.015, and the mass ratio of the acetic acid to the inorganic refractory component was 0.03.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the content of molybdenum oxide, the content of nickel oxide, the content of P$_2$O$_5$, and the content of inorganic refractory component in the Cat2A catalyst were 46.0 wt %, 20.0 wt %, 4 wt %, and 30.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat2A catalyst was 145 m$^2$/g, and its pore size was mainly distributed in the ranges of 2-40 nm and 100-300 nm, in which the volume of pores having a pore size in the range of 2-40 nm was 85.5% of the total pore volume (the volume of pores having a pore size in the range of 2-4 nm being 7.6% of the total pore volume), the volume of pores having a pore size in the range of 100-300 nm was 13.2% of the total pore volume, the total pore volume was 0.36 mL/g, and the average pore size was 9.9 nm.

A catalyst (Cat 2B) in a second bed was prepared as follows:

(1) pseudo-boehmite (specific surface area of 295 m$^2$/g, total pore volume of 1.05 mL/g, and average pore size of 14.2 nm) was mixed with a proper amount of methylcellulose (purchased from Sinopharm Chemical Reagent Co., Ltd., analytically pure) and citric acid, and subjected to band extrusion to obtain an alumina carrier precursor with a grain size of 1.6 mm. The precursor was dried at 150° C. for 4 h, and then calcined at 600° C. for 4 h to obtain an alumina carrier as an inorganic refractory component;

(2) Certain amounts of $MoO_3$, basic nickel carbonate and ethylene glycol were added separately into an aqueous solution containing phosphoric acid, and stirred while heating until completely dissolved to obtain an impregnation solution containing active metals, in which the molar ratio of ethylene glycol to nickel atoms was 3:1;

(3) The alumina carrier and the impregnation solution were uniformly mixed, and dried at 150° C. for 4 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.4%, the proportion of the volume of pores having a pore size of 4-6 nm to the total pore volume was 5.8%, the proportion of the volume of pores having a pore size of 6-40 nm to the total pore volume was 88.5%, the proportion of the volume of pores having a pore size of 40-100 nm to the total pore volume was 5.3%, and there were no pores having a pore size greater than 100 nm.

The Cat2B catalyst contained 26.0 wt % molybdenum, 4.8 wt % nickel, and 6.5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat2B catalyst had a specific surface area of 196 $m^2/g$, a total pore volume of 0.42 mL/g, and an average pore size of 8.6 nm, in which the proportion of the volume of pores having a pore size of 2-4 nm to the total pore volume was 3.5%, the proportion of the volume of pores having a pore size of 4-6 nm to the total pore volume was 12.3%, the proportion of the volume of pores having a pore size of 6-40 nm to the total pore volume was 79.0%, and the proportion of the volume of pores having a pore size of 40-100 nm to the total pore volume was 5.2%, and there were no pores having a pore size greater than 100 nm.

The Cat2A and Cat2B catalysts were compounded and loaded in a volume ratio of 1:3, the catalyst system was subjected to sulfurization and the reaction test, and the sulfur content, nitrogen content and aromatics content of the resulting product were 6.5 ppm, 0.8 ppm and 34.2 wt %, respectively.

Example III-3

This example is provided to illustrate a hydrofining catalyst system according to the present application and its preparation.

A catalyst (Cat 3A) in a first bed was prepared with reference to Example I-3 as follows:

(1) Commercially available white carbon black (specific surface area of 22.0 $m^2/g$, average pore size of 12.7 nm) and basic nickel carbonate powder were uniformly mixed and then calcined at 500° C. for 3 hours to obtain a nickel-containing inorganic refractory powder.

The amount of basic nickel carbonate used corresponded to a nickel content (calculated as nickel oxide) of 16.0 wt % in the catalyst.

(2) Certain amounts of $MoO_3$, basic nickel carbonate and butanol were added separately into an aqueous solution containing phosphoric acid, stirred while heating until completely dissolved, and then a certain amount of tartaric acid was added and completely dissolved to obtain an impregnation solution containing active metals.

The ratio of the mole amount of the butanol to the mass of the inorganic refractory component was 0.02, and the mass ratio of the tartaric acid to the inorganic refractory component was 0.05.

(3) The impregnation solution and the inorganic refractory component were uniformly mixed, and then shaped by band extrusion. Then, a catalyst in oxidized state with a grain size of 1.6 mm was obtained by drying at 150° C. for 8 h.

The impregnation solution and the nickel-containing inorganic refractory powder were mixed in such a ratio that the content of molybdenum oxide, the content of nickel oxide, the content of $P_2O_5$, and the content of inorganic refractory component in the Cat3A catalyst were 47.0 wt %, 25.0 wt %, 8.0 wt %, and 20.0 wt %, respectively, based on the weight on a dry basis of the catalyst and calculated as oxides, After being calcined at 400° C. for 3 hours, the pore size distribution of the catalyst was analyzed using the low-temperature nitrogen adsorption and mercury intrusion methods. The specific surface area of the Cat3A catalyst was 155 $m^2/g$, and its pore size was mainly distributed in the ranges of 2-40 nm and 100-300 nm, in which the volume of pores having a pore size in the range of 2-40 nm was 89.3% of the total pore volume (the volume of pores having a pore size in the range of 2-4 nm being 6.7% of the total pore volume), the volume of pores having a pore size in the range of 100-300 nm was 7.4% of the total pore volume, the total pore volume was 0.31 mL/g, and the average pore size was 8.0 nm.

A catalyst (Cat 3B) in a second bed was prepared as follows:

(1) pseudo-boehmite (specific surface area of 295 $m^2/g$, total pore volume of 1.05 mL/g, and average pore size of 14.2 nm) was mixed with a proper amount of starch (purchased from Sinopharm Chemical Reagent Co., Ltd., analytically pure) and acetic acid (purchased from Sinopharm Chemical Reagent Co., Ltd., analytically pure) were mixed, and subjected to band extrusion to obtain an alumina carrier precursor with a grain size of 1.6 mm. The precursor was dried at 190° C. for 4 h, and then calcined at 800° C. for 3 h to obtain an alumina carrier as an inorganic refractory component;

(2) Certain amounts of $MoO_3$, basic nickel carbonate and butanol were added separately into an aqueous solution containing phosphoric acid, stirred while heating until completely dissolved to obtain an impregnation solution containing active metals, in which the molar ratio of the butanol to nickel atoms was 2:1;

(3) The alumina carrier and the impregnation solution were uniformly mixed, and dried at 120° C. for 8 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.2%, the proportion of the volume of pores having a pore size of 4-6 nm to the total pore volume was 3.4%, the proportion of the volume of pores having a pore size of 6-40 nm to the total pore volume was 89.8%, the proportion of the volume of pores having a pore size of 40-100 nm to the total pore volume was 6.6%, and there were no pores having a pore size greater than 100 nm.

The Cat3B catalyst contained 30.0 wt % molybdenum, 3.0 wt % nickel, 5.5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat3B catalyst had a specific surface area of 162 $m^2$/g, a total pore volume of 0.46 mL/g, and an average pore size of 11.4 nm, in which the volume of pores having a pore size in the range of 2-4 nm was 1.4% of the total pore volume, the volume of pores having a pore size in the range of 4-6 nm was 9.5% of the total pore volume, the volume of pores having a pore size in the range of 6-40 nm was 83.0% of the total pore volume, the volume of pores having a pore size in the range of 40-100 nm was 6.1% of the total pore volume, and there were no pores having a pore size greater than 100 nm.

The Cat3A and Cat3B catalysts were compounded and loaded in a volume ratio of 1:2, the catalyst system was subjected to sulfurization and the reaction test, and the resulting product had a sulfur content of 4.4 ppm, a nitrogen content of 0.5 ppm, and an aromatics content of 33.1 wt %.

Example III-4

This example is provided to illustrate a hydrofining catalyst system according to the present application and its preparation.

A catalyst (Cat 4A) in a first bed was prepared with reference to Example I-4 as follows:

(1) Commercially available white carbon black (specific surface area of 220 $m^2$/g, average pore size of 12.7 nm) and basic nickel carbonate powder were uniformly mixed and then calcined at 600° C. for 8 hours to obtain a nickel-containing inorganic refractory powder.

The amount of basic nickel carbonate used corresponded to a nickel content (calculated as nickel oxide) of 20.0 wt % in the catalyst.

(2) Certain amounts of $MoO_3$, ammonium metatungstate, basic nickel carbonate and ethylene glycol were added separately into an aqueous solution containing phosphoric acid, stirred while heating until completely dissolved, and then a certain amount of acetic acid was added and completely dissolved to obtain an impregnation solution containing active metals.

The ratio of the molar amount of ethylene glycol to the mass of the inorganic refractory component was 0.012, and the mass ratio of the acetic acid to the inorganic refractory component was 0.06.

(3) The impregnation solution and the inorganic refractory component were uniformly mixed, and then shaped by band extrusion. Then, a catalyst in oxidized state with a grain size of 1.6 mm was obtained by drying at 300° C. for 3 hours.

The impregnation solution and the nickel-containing inorganic refractory powder were mixed in such a ratio that the content of molybdenum oxide, the content of tungsten oxide, the content of nickel oxide, the content of $P_2O_5$ and the content of inorganic refractory component in the Cat4A catalyst were 22.5 wt %, 27.0 wt %, 4.0 wt % and 15.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat4A catalyst was 120 $m^2$/g, and its pore size was mainly distributed in the ranges of 2-40 nm and 100-300 nm, in which the volume of pores having a pore size in the range of 2-40 nm was 76.9% of the total pore volume (the volume of pores having a pore size in the range of 2-4 nm being 9.5% of the total pore volume), the volume of pores having a pore size in the range of 100-300 nm was 20.3% of the total pore volume, the total pore volume was 0.26 mL/g, and the average pore size was 8.7 nm.

A catalyst (Cat 4B) in a second bed was prepared as follows:

(1) pseudo-boehmite (specific surface area of 385 $m^2$/g, total pore volume of 0.85 mL/g, and average pore size of 8.8 nm) was mixed with a proper amount of sesbania powder and nitric acid, and subjected to band extrusion to obtain an alumina carrier precursor with a grain size of 1.6 mm. The precursor was dried at 150° C. for 8 h, and then calcined at 550° C. for 3 h to obtain an alumina carrier as an inorganic refractory component;

(2) Certain amounts of $MoO_3$, basic cobalt carbonate and ethylene glycol were added separately into an aqueous solution containing phosphoric acid, and stirred while heating until completely dissolved to obtain an impregnation solution containing active metals, in which the molar ratio of ethylene glycol to cobalt atoms was 2:1;

(3) The alumina carrier and the impregnation solution were uniformly mixed, and dried at 100° C. for 8 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.4%, the proportion of the volume of pores having a pore size of 4-6 nm to the total pore volume was 10.3%, the proportion of the volume of pores having a pore size of 6-40 nm to the total pore volume was 86.5%, the proportion of the volume of pores having a pore size of 40-100 nm to the total pore volume was 1.8%, and there were no pores having a pore size greater than 100 nm.

The Cat4B catalyst contained 35.0 wt % molybdenum, 2.9 wt % cobalt, 4.5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat4B catalyst had a specific surface area of 220 $m^2$/g, a total pore volume of 0.34 mL/g, and an average pore size of 6.2 nm, in which the volume of pores having a pore size in the range of 2-4 nm was 6.7% of the total pore volume, the volume of pores having a pore size in the range of 4-6 nm was 15.9% of the total pore volume, the volume of pores having a pore size in the range of 6-40 nm was 74.2% of the total pore volume, the volume of pores having a pore size in the range of 40-100 nm was 3.2% of the total pore volume, and there were no pores having a pore size greater than 100 nm.

The Cat4A and Cat4B catalysts were compounded and loaded in a volume ratio of 1:1, the catalyst system was subjected to sulfurization and the reaction test, and the sulfur content, nitrogen content and aromatics content of the resulting product were 9.0 ppm, 1.9 ppm and 36.1 wt %, respectively.

Example III-5

This example is provided to illustrate a hydrofining catalyst system according to the present application and its preparation.

A catalyst (Cat 5A) in a first bed was prepared with reference to Example I-5 as follows:

(1) Commercial available zirconium hydroxide powder (specific surface area of 180 m$^2$/g, average pore size of 13.3 nm) and basic nickel carbonate powder were uniformly mixed and then calcined at 400° C. for 3 h to obtain a nickel-containing inorganic refractory powder.

The amount of basic nickel carbonate used corresponded to a nickel content (calculated as nickel oxide) of 28.0 wt % in the catalyst.

(2) Certain amounts of ammonium metatungstate, basic nickel carbonate and glycerol were added separately into an aqueous solution containing phosphoric acid, stirred while heating until completely dissolved, then a certain amount of caproic acid was added until completely dissolved, to obtain an impregnation solution containing active metals.

The ratio of the molar amount of glycerin to the mass of the inorganic refractory component was 0.01, and the mass ratio of the caproic acid to the inorganic refractory component was 0.025.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the Cat5A catalyst had a tungsten oxide content of 45.0%, a nickel oxide content of 32.0 wt %, a P$_2$O$_5$ content of 3.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat5A catalyst was 109 m$^2$/g, and its pore size was mainly distributed in the ranges of 2-40 nm and 100-300 nm, in which the volume of pores having a pore size in the range of 2-40 nm was 85.6% of the total pore volume (the volume of pores having a pore size in the range of 2-4 nm being 6.8% of the total pore volume), the volume of pores having a pore size in the range of 100-300 nm was 12.3% of the total pore volume, the total pore volume was 0.29 mL/g, and the average pore size was 10.6 nm.

A catalyst (Cat 5B) in a second bed was prepared as follows:

(1) pseudo-boehmite (specific surface area of 275 m$^2$/g, total pore volume of 1.2 mL/g, and average pore size of 17.5 nm) was mixed with a proper amount of sesbania powder and nitric acid, and subjected to band extrusion to obtain an alumina carrier precursor with a grain size of 1.6 mm. The precursor was dried at 200° C. for 2 h, and then calcined at 400° C. for 8 h to obtain an alumina carrier as an inorganic refractory component;

(2) Certain amounts of MoO$_3$, ammonium metatungstate, basic nickel carbonate and ethylene glycol were added separately into an aqueous solution containing phosphoric acid, and stirred while heating until completely dissolved to obtain an impregnation solution containing active metals, in which the molar ratio of glycerol to nickel atoms was 2.5:1;

(3) The alumina carrier and the impregnation solution were uniformly mixed, and dried at 180° C. for 5 hours to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.9%, the proportion of the volume of pores having a pore size of 4-6 nm to the total pore volume was 7.9%, the proportion of the volume of pores having a pore size of 6-40 nm to the total pore volume was 85.3%, the proportion of the volume of pores having a pore size of 40-100 nm to the total pore volume was 5.9%, and there were no pores having a pore size greater than 100 nm.

The Cat5B catalyst contained 30 wt % tungsten, 5.0 wt % molybdenum, 3.5 wt % nickel, and 3.0 wt % P$_2$O$_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat5B catalyst had a specific surface area of 185 m$^2$/g, a total pore volume of 0.47 mL/g, and an average pore size of 10.2 nm, in which the volume of pores having a pore size in the range of 2-4 nm was 1.3% of the total pore volume, the volume of pores having a pore size in the range of 4-6 nm was 8.8% of the total pore volume, the volume of pores having a pore size in the range of 6-40 nm was 85.4% of the total pore volume, the volume of pores having a pore size in the range of 40-100 nm was 4.5% of the total pore volume, and there were no pores having a pore size greater than 100 nm.

The Cat5A and Cat5B catalysts were compounded and loaded in a volume ratio of 1:7, the catalyst system was subjected to sulfurization and the reaction test, and the sulfur content, nitrogen content and aromatics content of the resulting product were 7.0 ppm, 0.2 ppm and 34.1 wt %, respectively.

Example III-6

This example is provided to illustrate a hydrofining catalyst system according to the present application and its preparation.

A catalyst (Cat6A) in a first bed was prepared with reference to Example I-6 as follows:

(1) Commercially available white carbon black (specific surface area of 220 m$^2$/g, average pore size of 12.7 nm), magnesium nitrate and basic nickel carbonate powder were uniformly mixed, and then calcined at 400° C. for 3 hours to obtain an inorganic refractory powder containing nickel, silica and magnesia.

The amount of basic nickel carbonate used corresponded to a nickel content (calculated as nickel oxide) of 21.0 wt % in the catalyst.

(2) Certain amounts of ammonium metatungstate, nickel nitrate and glycerol were added separately into an aqueous solution, stirred while heating until completely dissolved, and then a certain amount of citric acid was added and completely dissolved to obtain an impregnation solution containing active metals.

The ratio of the mole amount of the glycerol to the mass of the inorganic refractory component was 0.008, and the mass ratio of the citric acid to the inorganic refractory component was 0.08.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the Cat6A catalyst has a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat6A catalyst was 165 m²/g, and its pore size was mainly distributed in the ranges of 2-40 nm and 100-300 nm, in which the volume of pores having a pore size in the range of 2-40 nm was 87.5% of the total pore volume (the volume of pores having a pore size in the range of 2-4 nm being 8.7% of the total pore volume), the volume of pores having a pore size in the range of 100-300 nm was 7.8% of the total pore volume, the total pore volume was 0.32 mL/g, and the average pore size was 7.8 nm.

A catalyst (Cat6B) in a second bed was prepared as follows:

(1) pseudo-boehmite (specific surface area of 320 m²/g, total pore volume of 1.0 mL/g, and average pore size of 12.5 nm) was mixed with a proper amount of sesbania powder and nitric acid, and subjected to band extrusion to obtain an alumina carrier precursor with a grain size of 1.6 mm. The precursor was dried at 140° C. for 5 h, and then calcined at 600° C. for 3 h to obtain an alumina carrier as an inorganic refractory component;

(2) Certain amounts of $MoO_3$, basic cobalt carbonate and glycerol were added separately into an aqueous solution containing phosphoric acid, stirred while heating until completely dissolved to obtain an impregnation solution containing active metals, in which the molar ratio of the glycerol to cobalt atoms was 4:1;

(3) The alumina carrier and the impregnation solution were uniformly mixed, and dried at 170° C. for 5 hours to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.3%, the proportion of the volume of pores having a pore size of 4-6 nm to the total pore volume was 10.0%, the proportion of the volume of pores having a pore size of 6-40 nm to the total pore volume was 83.4%, the proportion of the volume of pores having a pore size of 40-100 nm to the total pore volume was 5.3%, and there were no pores having a pore size greater than 100 nm.

The Cat6B catalyst contained 15.0 wt % molybdenum, 5.5 wt % nickel, 6.0 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat6B catalyst had a specific surface area of 235 m²/g, a total pore volume of 0.55 mL/g, and an average pore size of 9.4 nm, the proportion of the volume of pores having a pore size in the range of 2-4 nm to the total pore volume was 2.5%, the proportion of the volume of pores having a pore size in the range of 4-6 nm to the total pore volume was 10.4%, the proportion of the volume of pores having a pore size in the range of 6-40 nm to the total pore volume was 84.5%, the proportion of the volume of pores having a pore size in the range of 40-100 nm to the total pore volume was 2.6%, and there were no pores having a pore size greater than 100 nm.

The Cat6A and Cat6B catalysts were compounded and loaded in a volume ratio of 1:2, the catalyst system was subjected to sulfurization and the reaction test, and the resulting product had a sulfur content of 8.4 ppm, a nitrogen content of 1.1 ppm, and an aromatics content of 35.2 wt %.

Example III-7

This example is provided to illustrate a hydrofining catalyst system according to the present application and its preparation, The catalyst obtained in Example I-7A was used as a catalyst Cat7A in a first bed, while the catalyst Cat6B obtained in Example was used as a catalyst Cat7B in a second bed.

The Cat7A and Cat7B catalysts were compounded and loaded in a volume ratio of 1:2 with reference to example III-6, the catalyst system was subjected to sulfurization and the reaction test, and the sulfur content, nitrogen content, and aromatics content of the resulting product were 13.1 ppm, 4.0 ppm, and 37.2 wt %, respectively.

Example III-8

This example is provided to illustrate a hydrofining catalyst system according to the present application and its preparation.

The catalyst obtained in Example I-8 was used as a catalyst Cat8A in a first bed, and the catalyst Cat2B obtained in Example III-2 was used as a catalyst Cat8B in a second bed.

The Cat8A and Cat8B catalysts were compounded and loaded in a volume ratio of 1:3 with reference to Example III-2, the catalyst system was subjected to sulfurization and the reaction test, and the sulfur content, nitrogen content, and aromatics content of the resulting product were 25.4 ppm, 5.4 ppm, and 39.2 wt %, respectively.

Comparative Example III-1

This comparative example is provided to illustrate the effect of a non-inventive hydrofining catalyst system.

The catalyst obtained in Comparative Example I-1 was used as a catalyst Cat-D1A in a first bed, and the catalyst Cat1B obtained in Example III-1 was used as a catalyst Cat-D1B in a second bed.

The Cat-D1A and Cat-D1B catalysts were compounded and loaded in a volume ratio of 1:6 with reference to Example III-1, the catalyst system was subjected to sulfurization and the reaction test, and the sulfur content, nitrogen content, and aromatics content of the resulting product were 45.2 ppm, 8.3 ppm, and 41.5 wt %, respectively.

Comparative Example III-2

This comparative example is provided to illustrate the effect of a non-inventive hydrofining catalyst system.

The catalyst obtained in Comparative Example I-2 was used as a catalyst Cat-D2A in a first bed, and the catalyst Cat2B obtained in Example III-2 was used as a catalyst Cat-D2B in a second bed.

The Cat-D2A and Cat-D2B catalysts were compounded and loaded in a volume ratio of 1:3 with reference to Example III-2, the catalyst system was subjected to sulfurization and the reaction test, and the sulfur content, nitrogen content, and aromatics content of the resulting product were 59.5 ppm, 12.9 ppm, and 42.7 wt %, respectively.

Comparative Example III-3

This comparative example is provided to illustrate the effect of a non-inventive hydrofining catalyst system.

The catalyst obtained in Comparative Example I-3 was used as a catalyst Cat-D3A in a first bed, and the catalyst Cat6B obtained in Example III-6 was used as a catalyst Cat-D3B in a second bed.

The Cat-D3A and Cat-D3B catalysts were compounded and loaded in a volume ratio of 1:2 with reference to Example III-6, the catalyst system was subjected to sulfurization and the reaction test, and the sulfur content, nitrogen content, and aromatics content of the resulting product were 31.5 ppm, 5.8 ppm, and 39.9 wt %, respectively.

Comparative Example III-4

This comparative example is provided to illustrate the effect of a non-inventive hydrofining catalyst system.

The catalyst obtained in Comparative Example I-4 was used as a catalyst Cat-D4A in a first bed, and the catalyst Cat6B obtained in Example III-6 was used as a catalyst Cat-D4B in a second bed.

The Cat-D4A and Cat-D4B catalysts were compounded and loaded in a volume ratio of 1:2 with reference to Example III-6, the catalyst system was subjected to sulfurization and the reaction test, and the sulfur content, nitrogen content and aromatics content of the resulting product were 35.0 ppm, 6.3 ppm and 40.4 wt %, respectively.

Comparative Example III-5

This comparative example is provided to illustrate the effect of a non-inventive hydrofining catalyst system.

The catalyst obtained in Comparative Example I-1 was used as a catalyst Cat-D5A in a first bed. A catalyst Cat-D5B of a second bed was prepared substantially as described in Example III-1 for catalyst Cat1B, except that no organic alcohol was used in the preparation.

After being calcined at 400° C. for 3 hours, the pore size distribution of the catalyst was analyzed using the low-temperature nitrogen adsorption and mercury intrusion methods. The Cat-D5B catalyst had a specific surface area of 202 $m^2/g$, a total pore volume of 0.38 mL/g, and an average pore size of 7.5 nm, in which the volume of pores having a pore size in the range of 2-4 nm was 6.8% of the total pore volume, the volume of pores having a pore size in the range of 4-6 nm was 14.8% of the total pore volume, the volume of pores having a pore size in the range of 6-40 nm was 75.2% of the total pore volume, the volume of pores having a pore size in the range of 40-100 nm was 3.0% of the total pore volume, and there were no pores having a pore size greater than 100 nm.

The Cat-D5A and Cat-D5B catalysts were compounded and loaded in a volume ratio of 1:6 with reference to Example III-1, the catalyst system was subjected to sulfurization and the reaction test, and the sulfur content, nitrogen content, and aromatics content of the resulting product were 73.5 ppm, 14.8 ppm, and 45.2 wt %, respectively.

As can be seen from the comparison of the results of the above Example III series and the Comparative Example III series, the catalyst system according to the present application shows good performance, and compared with non-inventive catalyst systems, the performance is improved, the preparation process is shortened, the production cost is reduced, and thus the catalyst system according to the present application has good industrial application prospect.

Comparative Example III-6

This comparative example is provided to illustrate the effect of a non-inventive hydrofining catalyst system.

The catalyst obtained in Comparative Example I-5 was used as a catalyst Cat-D6A in a first bed, while the catalyst Cat1B obtained in Example III-1 was used as a catalyst Cat-D6B in a second bed.

The Cat-D6A and Cat-D6B catalysts were compounded and loaded in a volume ratio of 1:6 with reference to Example III-1, the catalyst system was subjected to sulfurization and the reaction test, and the sulfur content, nitrogen content, and aromatics content of the resulting product were 45.7 ppm, 8.3 ppm, and 38.2 wt %, respectively.

Comparative Example III-7

This comparative example is provided to illustrate the effect of a non-inventive hydrofining catalyst system.

The catalyst obtained in Comparative Example I-5 was used as a catalyst Cat-D7A in a first bed, while a catalyst Cat-D7B in a second bed was prepared as follows:

(1) pseudo-boehmite (purchased from ChangLing catalyst plant of Sinopec, specific surface area of 295 $m^2/g$, total pore volume of 1.05 mL/g and average pore size of 14.2 nm) was mixed with a proper amount of sesbania powder and nitric acid, and subjected to band extrusion to obtain an alumina carrier precursor with a grain size of 1.6 mm. The precursor was dried at 120° C. for 3 h, and then calcined at 600° C. for 3 h to obtain an alumina carrier as an inorganic refractory component;

(2) Certain amounts of $MoO_3$ and basic nickel carbonate were added separately into an aqueous solution containing phosphoric acid, stirred while heating until completely dissolved to obtain an impregnation solution containing active metals;

(3) The alumina carrier and the impregnation solution were uniformly mixed, and dried at 120° C. for 3 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.2%, the proportion of the volume of pores having a pore size of 4-6 nm to the total pore volume was 7.8%, the proportion of the volume of pores having a pore size of 6-40 nm to the total pore volume was 86.5%, the proportion of the volume of pores having a pore size of 40-100 nm to the total pore volume was 4.5%, and there were no pores having a pore size greater than 100 nm.

The Cat-D7B catalyst contained 18.0 wt % molybdenum, 3.3 wt % nickel, 3.0 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat-D7B catalyst had a specific surface area of 189 $m^2/g$, a total pore volume of 0.42 mL/g, and an average pore size of 8.8 nm, in which the volume of pores having a pore size in the range of 2-4 nm was 2.6% of the total pore volume, the volume of pores having a pore size in the range of 4-6 nm was 15.5% of the total pore volume, the volume of pores having a pore size in the range of 6-40 nm was 78.9% of the total pore volume, the volume of pores having a pore size in the range of 40-100 nm was 3.0% of the total pore volume, and there were no pores having a pore size greater than 100 nm.

The Cat-D7A and the Cat-D7B catalysts were compounded and loaded in a volume ratio of 1:3, the catalyst system was subjected to sulfurization and the reaction test, and the sulfur content, nitrogen content and aromatics content of the resulting product were 46.5 ppm, 7.6 ppm and 40.2 wt %, respectively.

TABLE III

Test results of the Example III series and the Comparative Example III series

| Example No. | Sulfur content (ppm) | Nitrogen content (ppm) | Aromatics content (wt %) |
|---|---|---|---|
| Example III-1 | 9.3 | 1.5 | 33.8% |
| Example III-2 | 6.5 | 0.8 | 34.2% |
| Example III-3 | 4.4 | 0.5 | 33.1% |
| Example III-4 | 9.0 | 1.9 | 36.1% |
| Example III-5 | 7.0 | 0.2 | 34.1% |
| Example III-6 | 8.4 | 1.1 | 35.2% |
| Example III-7 | 13.1 | 4.0 | 37.2% |
| Example III-8 | 25.4 | 5.4 | 39.2% |
| Comparative Example III-1 | 45.2 | 8.3 | 41.5% |
| Comparative Example III-2 | 59.5 | 12.9 | 42.7% |
| Comparative Example III-3 | 31.5 | 5.8 | 39.9% |
| Comparative Example III-4 | 35.0 | 6.3 | 40.4% |
| Comparative Example III-5 | 73.5 | 14.8 | 45.2% |
| Comparative Example III-6 | 45.7 | 8.3 | 38.2% |
| Comparative Example III-7 | 46.5 | 7.6 | 40.2% |

As can be seen from the above comparison of the results of the Example III series and the Comparative Example III series, the catalyst system according to the present application shows good performance, and compared with non-inventive catalyst systems, the performance is improved, the preparation process is shortened, the production cost is reduced, and thus the catalyst system according to the present application has good industrial application prospect.

Example IV-1

This example is provided to illustrate a hydrofining catalyst system according to the present application and its preparation.

A catalyst (Cat 1A') in a first bed was prepared with reference to Example II-1 as follows:

(1) Commercially available white carbon black (specific surface area of 220 m²/g, average pore size of 12.7 nm) and basic cobalt carbonate powder were uniformly mixed, and then calcined at 400° C. for 3 hours to obtain an inorganic refractory powder containing cobalt.

The amount of basic cobalt carbonate used corresponded to a cobalt content (calculated as cobalt oxide) of the catalyst of 22.0 wt %.

(2) Certain amounts of $MoO_3$, basic cobalt carbonate and citric acid were added separately into an aqueous solution containing phosphoric acid, and stirred while heating until completely dissolved to obtain an impregnation solution containing active metals.

The mass ratio of the citric acid to the inorganic refractory component was 0.2.

(3) The impregnation solution and the inorganic refractory component were uniformly mixed, and then shaped by band extrusion. Then, a catalyst in oxidized state with a grain size of 1.6 mm was obtained by drying at 200° C. for 3 hours.

The impregnation solution and the cobalt-containing inorganic refractory powder were mixed in such a ratio that the content of molybdenum oxide, the content of cobalt oxide, the content of $P_2O_5$, and the content of inorganic refractory component in the Cat1A' catalyst were 55.0 wt %, 30.0 wt %, 5 wt % and 10.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat1A' catalyst was 96.0 m²/g, and its pore size was mainly distributed in the ranges of 2-40 nm and 100-300 nm, in which the proportion of the volume of pores having a pore size in the range of 2-40 nm to the total pore volume was 86.6% (the proportion of the volume of pores having a pore size in the range of 2-4 nm to the total pore volume being 9.5%), the proportion of the volume of pores having a pore size in the range of 100-300 nm to the total pore volume was 7.2%, the total pore volume was 0.26 mL/g, and the average pore size was 10.8 nm.

A catalyst (Cat 1B') in a second bed was prepared as follows:

(1) pseudo-boehmite (specific surface area of 295 m²/g, total pore volume of 1.05 mL/g, and average pore size of 14.2 nm) was mixed with a proper amount of sesbania powder and nitric acid, and subjected to band extrusion to obtain an alumina carrier precursor with a grain size of 1.6 mm. The precursor was dried at 120° C. for 3 h, and then calcined at 500° C. for 3 h to obtain an alumina carrier as an inorganic refractory component;

(2) Certain amounts of $MoO_3$, basic nickel carbonate and citric acid were added separately into an aqueous solution containing phosphoric acid, stirred while heating until completely dissolved to obtain an impregnation solution containing active metals, in which the molar ratio of the citric acid to nickel atoms was 4:1;

(3) The alumina carrier and the impregnation solution were uniformly mixed, and dried at 200° C. for 3 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.6%, the proportion of the volume of pores having a pore size of 4-6 nm to the total pore volume was 9.5%, the proportion of the volume of pores having a pore size of 6-40 nm to the total pore volume was 85.0%, the proportion of the volume of pores having a pore size of 40-100 nm to the total pore volume was 3.9%, and there were no pores having a pore size greater than 100 nm.

The Cat1B' catalyst contained 30.0 wt % molybdenum, 6.0 wt % nickel, and 5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat1B' catalyst had a specific surface area of 210 m²/g, a total pore volume of 0.39 mL/g, and an average pore size of 7.4 nm, in which the proportion of the volume of pores having a pore size in the range of 2-4 nm to the total pore volume was 5.8%, the proportion of the volume of pores having a pore size in the range of 4-6 nm to the total pore volume was 14.6%, the proportion of the volume of pores having a pore size in the range of 6-40 nm to the total pore volume was 77.8%, and the proportion of the volume of pores having a pore size in the range of 40-100 nm to the total pore volume was 1.8%, and there were no pores having a pore size greater than 100 nm.

The Cat1A' and Cat1B' catalysts were compounded and loaded in a volume ratio of 1:6, the catalyst system was subjected to sulfurization and the reaction test, and the sulfur content, nitrogen content and aromatics content of the resulting product were 5.5 ppm, 1.1 ppm and 33.0 wt %, respectively.

Example IV-2

This example is provided to illustrate a hydrofining catalyst system according to the present application and its preparation.

A catalyst (Cat 2A') in a first bed was prepared with reference to Example II-2 as follows:

(1) Commercially available white carbon black (specific surface area of 220 $m^2$/g, average pore size of 12.7 nm) and basic nickel carbonate powder were uniformly mixed and then calcined at 700° C. for 4 hours to obtain a nickel-containing inorganic refractory powder.

The amount of basic nickel carbonate used corresponded to a nickel content (calculated as nickel oxide) of 15.0 wt % in the catalyst.

(2) Certain amounts of $MoO_3$, basic nickel carbonate and acetic acid were added separately into an aqueous solution containing phosphoric acid, and stirred while heating until completely dissolved to obtain an impregnation solution containing active metals.

The mass ratio of the acetic acid to the inorganic refractory component was 0.3.

(3) The impregnation solution and the inorganic refractory component were uniformly mixed, and then shaped by band extrusion. Then, a catalyst in oxidized state with a grain size of 1.6 mm was obtained by drying at 200° C. for 5 hours.

The impregnation solution and the nickel-containing inorganic refractory powder were mixed in such a ratio that the content of molybdenum oxide, the content of nickel oxide, the content of $P_2O_5$, and the content of inorganic refractory component in the Cat2A' catalyst were 46.0 wt %, 20.0 wt %, 4 wt % and 30.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat2A' catalyst was 149 $m^2$/g, and its pore size was mainly distributed in the ranges of 2-40 nm and 100-300 nm, in which the volume of pores having a pore size in the range of 2-40 nm was 88.5% of the total pore volume (the volume of pores having a pore size in the range of 2-4 nm being 6.3% of the total pore volume), the volume of pores having a pore size in the range of 100-300 nm was 10.0% of the total pore volume, the total pore volume was 0.33 mL/g, and the average pore size was 8.9 nm.

A catalyst (Cat 2B') in a second bed was prepared as follows:

(1) pseudo-boehmite (specific surface area of 295 $m^2$/g, total pore volume of 1.05 mL/g, and average pore size of 14.2 nm) was mixed with a proper amount of methylcellulose and citric acid, and subjected to band extrusion to obtain an alumina carrier precursor with a grain size of 1.6 mm. The precursor was dried at 150° C. for 4 h, and then calcined at 600° C. for 4 h to obtain an alumina carrier as an inorganic refractory component;

(2) Certain amounts of $MoO_3$, basic nickel carbonate and acetic acid were added separately into an aqueous solution containing phosphoric acid, and stirred while heating until completely dissolved to obtain an impregnation solution containing active metals, in which the molar ratio of acetic acid to nickel atoms was 3:1;

(3) The alumina carrier and the impregnation solution were uniformly mixed, and dried at 150° C. for 4 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.4%, the proportion of the volume of pores having a pore size of 4-6 nm to the total pore volume was 5.8%, the proportion of the volume of pores having a pore size of 6-40 nm to the total pore volume was 88.5%, the proportion of the volume of pores having a pore size of 40-100 nm to the total pore volume was 5.3%, and there were no pores having a pore size greater than 100 nm.

The Cat2B' catalyst contained 26.0 wt % molybdenum, 4.8 wt % nickel, 6.5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat2B' catalyst had a specific surface area of 201 $m^2$/g, a total pore volume of 0.42 mL/g, and an average pore size of 8.4 nm, in which the proportion of the volume of pores having a pore size in the range of 2-4 nm to the total pore volume was 3.9%, the proportion of the volume of pores having a pore size in the range of 4-6 nm to the total pore volume was 12.9%, the proportion of the volume of pores having a pore size in the range of 6-40 nm to the total pore volume was 80.5%, the proportion of the volume of pores having a pore size in the range of 40-100 nm to the total pore volume was 2.7%, and there were no pores having a pore size greater than 100 nm.

The Cat2A' and Cat2B' catalysts were compounded and loaded in a volume ratio of 1:3, the catalyst system was subjected to sulfurization and the reaction test, and the sulfur content, nitrogen content and aromatics content of the resulting product were 4.9 ppm, 0.5 ppm and 33.0 wt %, respectively.

Example IV-3

This example is provided to illustrate a hydrofining catalyst system according to the present application and its preparation.

A catalyst (Cat 3A') in a first bed was prepared with reference to Example II-3 as follows:

(1) Commercially available white carbon black (specific surface area of 22.0 $m^2$/g, average pore size of 12.7 nm) and basic nickel carbonate powder were uniformly mixed and then calcined at 500° C. for 3 hours to obtain a nickel-containing inorganic refractory powder.

The amount of basic nickel carbonate used corresponded to a nickel content (calculated as nickel oxide) of 16.0 wt % in the catalyst.

(2) Certain amounts of $MoO_3$, basic nickel carbonate and tartaric acid were added separately into an aqueous solution containing phosphoric acid, and stirred while heating until completely dissolved to obtain an impregnation solution containing active metals.

The mass ratio of the tartaric acid to the inorganic refractory component was 0.5.

(3) The impregnation solution and the inorganic refractory component were uniformly mixed, and then shaped by band extrusion. Then, a catalyst in oxidized state with a grain size of 1.6 mm was obtained by drying at 150° C. for 8 h.

The impregnation solution and the nickel-containing inorganic refractory powder were mixed in such a ratio that the content of molybdenum oxide, the content of nickel oxide, the content of $P_2O_5$, and the content of inorganic refractory component in the Cat3A' catalyst were 47.0 wt %, 25.0 wt %, 8.0 wt %, and 20.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat3A' catalyst was 151 $m^2/g$, and its pore size was mainly distributed in the ranges of 2-40 nm and 100-300 nm, in which the volume of pores having a pore size in the range of 2-40 nm was 90.0% of the total pore volume (the volume of pores having a pore size in the range of 2-4 nm being 7.6% of the total pore volume), the volume of pores having a pore size in the range of 100-300 nm was 6.1% of the total pore volume, the total pore volume was 0.28 mL/g, and the average pore size was 7.4 nm.

A catalyst (Cat 3B') in a second bed was prepared as follows:

(1) pseudo-boehmite (specific surface area of 295 $m^2/g$, total pore volume of 1.05 mL/g, and average pore size of 14.2 nm) was mixed with a proper amount of starch and acetic acid, and subjected to band extrusion to obtain an alumina carrier precursor with a grain size of 1.6 mm. The precursor was dried at 190° C. for 4 h, and then calcined at 800° C. for 3 h to obtain an alumina carrier as an inorganic refractory component;

(2) Certain amounts of $MoO_3$, basic nickel carbonate and tartaric acid were added separately into an aqueous solution containing phosphoric acid, stirred while heating until completely dissolved to obtain an impregnation solution containing active metals, in which the molar ratio of tartaric acid to nickel atoms was 2:1;

(3) The alumina carrier and the impregnation solution were uniformly mixed, and dried at 120° C. for 8 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.2%, the proportion of the volume of pores having a pore size of 4-6 nm to the total pore volume was 3.4%, the proportion of the volume of pores having a pore size of 6-40 nm to the total pore volume was 89.8%, the proportion of the volume of pores having a pore size of 40-100 nm to the total pore volume was 6.6%, and there were no pores having a pore size greater than 100 nm.

The Cat3B' catalyst contained 30.0 wt % molybdenum, 3.0 wt % nickel, and 5.5 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat3B' catalyst had a specific surface area of 169 $m^2/g$, a total pore volume of 0.46 mL/g, and an average pore size of 10.9 nm, in which the proportion of the volume of pores having a pore size of 2-4 nm to the total pore volume was 1.7%, the proportion of the volume of pores having a pore size in the range of 4-6 nm to the total pore volume was 9.9%, the proportion of the volume of pores having a pore size of 6-40 nm to the total pore volume was 85.2%, and the proportion of the volume of pores having a pore size of 40-100 nm to the total pore volume was 3.2%, and there were no pores having a pore size greater than 100 nm.

The Cat3A' and Cat3B' catalysts were compounded and loaded in a volume ratio of 1:2, the catalyst system was subjected to sulfurization and the reaction test, and the sulfur content, nitrogen content and aromatics content of the resulting product were 3.2 ppm, 0.3 ppm and 32.4 wt %, respectively.

Example IV-4

This example is provided to illustrate a hydrofining catalyst system according to the present application and its preparation.

A catalyst (Cat 4A') in a first bed was prepared with reference to Example II-4 as follows:

(1) Commercially available white carbon black (specific surface area of 220 $m^2/g$, average pore size of 12.7 nm) and basic nickel carbonate powder were uniformly mixed and then calcined at 600° C. for 8 hours to obtain a nickel-containing inorganic refractory powder.

The amount of basic nickel carbonate used corresponded to a nickel content (calculated as nickel oxide) of 20.0 wt % in the catalyst.

(2) Certain amounts of $MoO_3$, ammonium metatungstate, basic nickel carbonate and acetic acid were added separately into an aqueous solution containing phosphoric acid, and stirred while heating until completely dissolved to obtain an impregnation solution containing active metals.

The mass ratio of the acetic acid to the inorganic refractory component was 0.25.

(3) The impregnation solution and the inorganic refractory component were uniformly mixed, and then shaped by band extrusion. Then, a catalyst in oxidized state with a grain size of 1.6 mm was obtained by drying at 300° C. for 3 hours.

The impregnation solution and the nickel-containing inorganic refractory powder were mixed in such a ratio that the content of molybdenum oxide, the content of tungsten oxide, the content of nickel oxide, the content of $P_2O_5$ and the content of inorganic refractory component in the Cat4A' catalyst were 22.5 wt %, 27.0 wt %, 4.0 wt % and 15.0 wt %, respectively, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat4A' catalyst was 132 $m^2/g$, and its pore size was mainly distributed in the ranges of 2-40 nm and 100-300 nm, in which the volume of pores having a pore size in the range of 2-40 nm was 81.1% of the total pore volume (the volume of pores having a pore size in the range of 2-4 nm being 7.9% of the total pore volume), the volume of pores having a pore size in the range of 100-300 nm was 16.5% of the total pore volume, the total pore volume was 0.27 mL/g, and the average pore size was 8.2 nm.

A catalyst (Cat 4B') in a second bed was prepared as follows:

(1) pseudo-boehmite (specific surface area of 385 m$^2$/g, total pore volume of 0.85 mL/g, and average pore size of 8.8 nm) was mixed with a proper amount of sesbania powder and nitric acid, and subjected to band extrusion to obtain an alumina carrier precursor with a grain size of 1.6 mm. The precursor was dried at 150° C. for 8 h, and then calcined at 550° C. for 3 h to obtain an alumina carrier as an inorganic refractory component;

(2) Certain amounts of MoO$_3$, basic cobalt carbonate and acetic acid were added separately into an aqueous solution containing phosphoric acid, and stirred while heating until completely dissolved to obtain an impregnation solution containing active metals, in which the molar ratio of acetic acid to cobalt atoms was 2:1;

(3) The alumina carrier and the impregnation solution were uniformly mixed, and dried at 100° C. for 8 h to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.4%, the proportion of the volume of pores having a pore size of 4-6 nm to the total pore volume was 10.3%, the proportion of the volume of pores having a pore size of 6-40 nm to the total pore volume was 86.5%, the proportion of the volume of pores having a pore size of 40-100 nm to the total pore volume was 1.8%, and there were no pores having a pore size greater than 100 nm.

The Cat4B' catalyst contained 35.0 wt % molybdenum, 2.9 wt % cobalt, 4.5 wt % P$_2$O$_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat4B' catalyst had a specific surface area of 224 m$^2$/g, a total pore volume of 0.34 mL/g, and an average pore size of 6.1 nm, in which the proportion of the volume of pores having a pore size of 2-4 nm to the total pore volume was 7.4%, the proportion of the volume of pores having a pore size in the range of 4-6 nm to the total pore volume was 16.2%, the proportion of the volume of pores having a pore size of 6-40 nm to the total pore volume was 75.9%, and the proportion of the volume of pores having a pore size of 40-100 nm to the total pore volume was 0.5%, and there were no pores having a pore size greater than 100 nm.

The Cat4A' and Cat4B' catalysts were compounded and loaded in a volume ratio of 1:1, the catalyst system was subjected to sulfurization and the reaction test, and the sulfur content, nitrogen content and aromatics content of the resulting product were 6.3 ppm, 1.0 ppm and 35.9 wt %, respectively.

Example IV-5

This example is provided to illustrate a hydrofining catalyst system according to the present application and its preparation.

A catalyst (Cat5A') in a first bed was prepared with reference to Example II-5 as follows:

(1) Commercial available zirconium hydroxide powder (specific surface area of 180 m$^2$/g, average pore size of 13.3 nm) and basic nickel carbonate powder were uniformly mixed and then calcined at 400° C. for 3 h to obtain a nickel-containing inorganic refractory powder.

The amount of basic nickel carbonate used corresponded to a nickel content (calculated as nickel oxide) of 28.0 wt % in the catalyst.

(2) Certain amounts of ammonium metatungstate, basic nickel carbonate and caproic acid were added separately into an aqueous solution containing phosphoric acid, and stirred while heating until completely dissolved to obtain an impregnation solution containing active metals.

The mass ratio of the caproic acid to the inorganic refractory component was 0.6.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the Cat5A' catalyst had a tungsten oxide content of 45.0%, a nickel oxide content of 32.0 wt %, a P$_2$O$_5$ content of 3.0 wt %, and a content of the inorganic refractory component of 20.0 wt %, based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat5A' catalyst was 104 m$^2$/g, and its pore size was mainly distributed in the ranges of 2-40 nm and 100-300 nm, in which the volume of pores having a pore size in the range of 2-40 nm was 82.2% of the total pore volume (the volume of pores having a pore size in the range of 2-4 nm being 6.0% of the total pore volume), the volume of pores having a pore size in the range of 100-300 nm was 14.5% of the total pore volume, the total pore volume was 0.34 mL/g, and the average pore size was 13.1 nm.

A catalyst (Cat5B') in a second bed was prepared as follows:

(1) pseudo-boehmite (specific surface area of 275 m$^2$/g, total pore volume of 1.2 mL/g, and average pore size of 17.5 nm) was mixed with a proper amount of sesbania powder and nitric acid, and subjected to band extrusion to obtain an alumina carrier precursor with a grain size of 1.6 mm. The precursor was dried at 200° C. for 2 h, and then calcined at 400° C. for 8 h to obtain an alumina carrier as an inorganic refractory component;

(2) Certain amounts of MoO$_3$, ammonium metatungstate, basic nickel carbonate and hexanoic acid were added separately into an aqueous solution containing phosphoric acid, and stirred while heating until completely dissolved to obtain an impregnation solution containing active metals, in which the molar ratio of the hexanoic acid to nickel atoms was 2.5:1;

(3) The alumina carrier and the impregnation solution were uniformly mixed, and dried at 180° C. for 5 hours to produce a catalyst in oxidized state.

As determined by the low-temperature nitrogen adsorption and mercury intrusion methods, in the alumina carrier, the proportion of the volume of pores having a pore size of 2-4 nm to the total pore volume was 0.9%, the proportion of the volume of pores having a pore size of 4-6 nm to the total pore volume was 7.9%, the proportion of the volume of pores having a pore size of 6-40 nm to the total pore volume was 85.3%, the proportion of the volume of pores having a pore size of 40-100 nm to the total pore volume was 5.9%, and there were no pores having a pore size greater than 100 nm.

The Cat5B' catalyst contained 30 wt % tungsten, 5.0 wt % molybdenum, 3.5 wt % nickel, 3.0 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat5B' catalyst had a specific surface area of 189 $m^2/g$, a total pore volume of 0.47 mL/g, and an average pore size of 9.9 nm, in which the volume of pores having a pore size in the range of 2-4 nm was 1.9% of the total pore volume, the volume of pores having a pore size in the range of 4-6 nm was 9.5% of the total pore volume, the volume of pores having a pore size in the range of 6-40 nm was 86.5% of the total pore volume, the volume of pores having a pore size in the range of 40-100 nm was 2.1% of the total pore volume, and there were no pores having a pore size greater than 100 nm.

The Cat5A' and Cat5B' catalysts were compounded and loaded in a volume ratio of 1:7, the catalyst system was subjected to sulfurization and the reaction test, and the sulfur content, nitrogen content and aromatics content of the resulting product were 3.2 ppm, 0.2 ppm and 32.7 wt %, respectively.

Example IV-6

This example is provided to illustrate a hydrofining catalyst according to the present application and its preparation.

A catalyst (Cat6A') in a first bed was prepared with reference to Example II-6 as follows:

(1) Commercially available white carbon black (specific surface area of 220 $m^2/g$, average pore size of 12.7 nm), magnesium nitrate and basic nickel carbonate powder were uniformly mixed, and then calcined at 400° C. for 3 hours to obtain an inorganic refractory powder containing nickel, silica and magnesia.

The amount of basic nickel carbonate used corresponded to a nickel content (calculated as nickel oxide) of 21.0 wt % in the catalyst.

(2) Certain amounts of ammonium metatungstate, nickel nitrate and citric acid were added separately into an aqueous solution, and stirred while heating until completely dissolved to obtain an impregnation solution containing active metals.

The mass ratio of the citric acid to the inorganic refractory component was 0.8.

(3) The impregnation solution and the inorganic refractory component were uniformly mixed, and then shaped by band extrusion. Then, a catalyst in oxidized state with a grain size of 1.6 mm was obtained by drying at 180° C. for 5 hours.

The impregnation solution and the nickel-containing inorganic refractory powder were mixed in such a ratio that the Cat6A' catalyst had a tungsten oxide content of 53.0 wt %, a nickel oxide content of 25.0 wt %, and a content of the inorganic refractory component of 22.0 wt % (the silica content being 15 wt %, and the magnesia content being 7.0 wt %), based on the weight on a dry basis of the catalyst and calculated as oxides.

After being calcined at 400° C. for 3 hours, the pore size distribution of the catalyst was analyzed using the low-temperature nitrogen adsorption and mercury intrusion methods. The specific surface area of the Cat6A' catalyst was 143 $m^2/g$, its pore size was mainly distributed in the ranges of 2-40 nm and 100-300 nm, in which the volume of pores having a pore size in the range of 2-40 nm was 85.3% of the total pore volume, the volume of pores having a pore size in the range of 100-300 nm was 9.4% of the total pore volume, the total pore volume was 0.35 mL/g, and the average pore size was 9.8 nm.

A catalyst (Cat6B') in a second bed was prepared as follows:

(1) pseudo-boehmite (specific surface area of 320 $m^2/g$, total pore volume of 1.0 mL/g, and average pore size of 12.5 nm) was mixed with a proper amount of sesbania powder and nitric acid, and subjected to band extrusion to obtain an alumina carrier precursor with a grain size of 1.6 mm. The precursor was dried at 140° C. for 5 h, and then calcined at 600° C. for 3 h to obtain an alumina carrier as an inorganic refractory component;

(2) Certain amounts of $MoO_3$, basic cobalt carbonate and citric acid were added separately into an aqueous solution containing phosphoric acid, stirred while heating until completely dissolved to obtain an impregnation solution containing active metals, in which the molar ratio of the citric acid to cobalt atoms was 4:1;

(3) The alumina carrier and the impregnation solution were uniformly mixed, and dried at 170° C. for 5 hours to produce a catalyst in oxidized state.

As determined by the low-temperature nitrogen adsorption and mercury intrusion methods, in the alumina carrier, the proportion of the volume of pores having a pore size of 2-4 nm to the total pore volume was 1.3%, the proportion of the volume of pores having a pore size of 4-6 nm to the total pore volume was 10.0%, the proportion of the volume of pores having a pore size of 6-40 nm to the total pore volume was 83.4%, the proportion of the volume of pores having a pore size of 40-100 nm to the total pore volume was 5.3%, and there were no pores having a pore size greater than 100 nm.

The Cat6B' catalyst contained 15.0 wt % molybdenum, 5.5 wt % nickel, and 6.0 wt % $P_2O_5$, based on the weight on a dry basis of the catalyst and calculated as oxides, with the balance being alumina.

After being calcined at 400° C. for 3 hours, the pore size distribution of the catalyst was analyzed using the low-temperature nitrogen adsorption and mercury intrusion methods. The Cat6B' catalyst had a specific surface area of 240 $m^2/g$, a total pore volume of 0.55 mL/g, an average pore size of 9.2 nm, in which the proportion of the volume of pores having a pore size of 2-4 nm to the total pore volume was 3.1%, the proportion of the volume of pores having a pore size in the range of 4-6 nm to the total pore volume was 11.3%, the proportion of the volume of pores having a pore size of 6-40 nm to the total pore volume was 84.0%, and the proportion of the volume of pores having a pore size of 40-100 nm to the total pore volume was 1.6%, and there were no pores having a pore size greater than 100 nm.

The Cat6A' and Cat6B' catalysts were compounded and loaded in a volume ratio of 1:2, the catalyst system was subjected to sulfurization and the reaction test, and the sulfur content, nitrogen content and aromatics content of the resulting product were 5.6 ppm, 0.6 ppm and 34.8 wt %, respectively.

Example IV-7

This example is provided to illustrate a hydrofining catalyst system according to the present application and its preparation.

The catalyst obtained in Examples II-7 was used as a catalyst Cat7A' in a first bed, while the catalyst Cat6B' obtained in Example IV-6 was used as a catalyst Cat7B' in a second bed.

The Cat7A' and Cat7B' catalysts were compounded and loaded in a volume ratio of 1:2 with reference to Example IV-6, the catalyst system was subjected to sulfurization and the reaction test, and the sulfur content, nitrogen content, and aromatics content of the resulting product were 10.5 ppm, 3.8 ppm, and 36.8 wt %, respectively.

Example IV-8

This example is provided to illustrate a hydrofining catalyst system according to the present application and its preparation.

The catalyst obtained in Example II-8 was as a catalyst Cat8A' in a first bed, while the catalyst Cat2B' obtained in Example IV-2 was used as a catalyst Cat8B' in a second bed.

The Cat8A' and Cat8B' were compounded and loaded in a volume ratio of 1:3 with reference to Example IV-2, the catalyst system was subjected to sulfurization and the reaction test, and the sulfur content, nitrogen content, and aromatics content of the resulting product were 20.5 ppm, 4.6 ppm, and 39.0 wt %, respectively.

Comparative Example IV-1

This comparative example is provided to illustrate the effect of a non-inventive hydrofining catalyst system.

The catalyst obtained in Comparative Example II-1 was used as a catalyst Cat-D1A' in a first bed, while the catalyst Cat1B' obtained in Example IV-1 was used as a catalyst Cat-D1B in a second bed.

The Cat-D1A' and Cat-D1B' catalysts were compounded and loaded in a volume ratio of 1:6 with reference to Example IV-1, the catalyst system was subjected to sulfurization and the reaction test, and the sulfur content, nitrogen content, and aromatics content of the resulting product were 38.6 ppm, 7.2 ppm, and 40.5 wt %, respectively.

Comparative Example IV-2

This comparative example is provided to illustrate the effect of a non-inventive hydrofining catalyst system.

The catalyst obtained in Comparative Example II-2 was used as a catalyst Cat-D2A' in a first bed, and the catalyst Cat2B' obtained in Example IV-2 was used as a catalyst Cat-D2B' in a second bed.

The Cat-D2A' and Cat-D2B' catalysts were compounded and loaded in a volume ratio of 1:3 with reference to Example IV-2, the catalyst system was subjected to sulfurization and the reaction test, and the sulfur content, nitrogen content, and aromatics content of the resulting product were 51.2 ppm, 9.5 ppm, and 41.2 wt %, respectively.

Comparative Example IV-3

This comparative example is provided to illustrate the effect of a non-inventive hydrofining catalyst system.

The catalyst obtained in Comparative Example II-3 was used as a catalyst Cat-D3A' in a first bed, while the catalyst Cat6B' obtained in Example IV-6 was used as a catalyst Cat-D3B' in a second bed.

The catalyst Cat-D3A' and Cat-D3B' catalysts were compounded and loaded in a volume ratio of 1:3 with reference to Example IV-2, the catalyst system was subjected to sulfurization and the reaction test, and the sulfur content, nitrogen content, and aromatics content of the resulting product were 28.9 ppm, 5.2 ppm, and 39.2 wt %, respectively.

Comparative Example IV-4

This comparative example is provided to illustrate the effect of a non-inventive hydrofining catalyst system.

The catalyst obtained in Comparative Example II-4 was used as a catalyst Cat-D4A' in a first bed, and the catalyst Cat6B' obtained in Example IV-6 was used as a catalyst Cat-D4B' in a second bed.

The Cat-D4A' and Cat-D4B' catalysts were compounded and loaded in a volume ratio of 1:2 with reference to Example IV-6, the catalyst system was subjected to sulfurization and the reaction test, and the sulfur content, nitrogen content, and aromatics content of the resulting product were 29.7 ppm, 5.2 ppm, and 39.9 wt %, respectively.

Comparative Example IV-5

This comparative example is provided to illustrate the effect of a non-inventive hydrofining catalyst system.

The catalyst obtained in Comparative Example II-1 was used as a catalyst Cat-D5A' in a first bed. A catalyst Cat-D5B' in a second bed was prepared substantially as described in Example IV-1 for catalyst Cat1B', except that no organic carboxylic acid was used in the preparation.

After being calcined at 400° C. for 3 hours, the pore size distribution of the catalyst was analyzed using the low-temperature nitrogen adsorption and mercury intrusion methods. The Cat-D5B' catalyst had a specific surface area of 214 $m^2/g$, a total pore volume of 0.38 mL/g, and an average pore size of 7.1 nm, in which the proportion of the volume of pores having a pore size of 2-4 nm to the total pore volume was 6.9%, the proportion of the volume of pores having a pore size in the range of 4-6 nm to the total pore volume was 15.4%, the proportion of the volume of pores having a pore size of 6-40 nm to the total pore volume was 75.8%, and the proportion of the volume of pores having a pore size of 40-100 nm to the total pore volume was 2.0%, and there were no pores having a pore size greater than 100 nm.

The Cat-D5A' and Cat-D5B' catalysts were compounded and loaded in a volume ratio of 1:6 with reference to Example IV-1, the catalyst system was subjected to sulfurization and the reaction test, and the resulting product had a sulfur content of 65.6 ppm, a nitrogen content of 12.3 ppm, and an aromatics content of 44.3 wt %.

TABLE IV

Test results of the Example IV series and the Comparative Example IV series

| Example No. | Sulfur content (ppm) | Nitrogen content (ppm) | Aromatics content (wt %) |
|---|---|---|---|
| Example IV-1 | 5.5 | 1.1 | 33.0% |
| Example IV-2 | 4.9 | 0.5 | 33.0% |

TABLE IV-continued

Test results of the Example IV series
and the Comparative Example IV series

| Example No. | Sulfur content (ppm) | Nitrogen content (ppm) | Aromatics content (wt %) |
|---|---|---|---|
| Example IV-3 | 3.2 | 0.3 | 32.4% |
| Example IV-4 | 6.3 | 1.0 | 35.9% |
| Example IV-5 | 3.2 | 0.2 | 32.7% |
| Example IV-6 | 5.6 | 0.6 | 34.8% |
| Example IV-7 | 10.5 | 3.8 | 36.8% |
| Example IV-8 | 20.5 | 4.6 | 39.0% |
| Comparative Example IV-1 | 38.6 | 7.2 | 40.5% |
| Comparative Example IV-2 | 51.2 | 9.5 | 41.2% |
| Comparative Example IV-3 | 28.9 | 5.2 | 39.2% |
| Comparative Example IV-4 | 29.7 | 5.2 | 39.9% |
| Comparative Example IV-5 | 65.6 | 12.3 | 44.3% |

As can be seen from the above comparison of the results of the Example IV series and the Comparative Example IV series, the catalyst system according to the present application shows good performance, and compared with non-inventive catalyst systems, the performance is improved, the preparation process is shortened, the production cost is reduced, and thus the catalyst system according to the present application has good industrial application prospect.

Preferred embodiments of the present application have been described in detail hereinabove, but the present application is not limited to the details of those embodiments. Various modifications may be made without departing from the spirit of the present application, and these modifications fall within the scope of the present application.

It should be noted that the various technical features described in the above embodiments can be combined in any suitable manner without contradiction. For brevity, various possible combinations are not described separately in the present application, but such combinations fall within the scope of the present application.

In addition, various embodiments of the present application can be combined in any manner as long as it does not depart from the spirit of the present application, and such combinations should be considered as a part of the disclosure of the present application.

The invention claimed is:

1. A hydrofining catalyst comprising:
   an inorganic refractory component comprising a first hydrodesulfurization catalytically active component comprising a first metal element in a mixture with at least one oxide selected from the group consisting of alumina, silica, magnesia, calcium oxide, zirconia, and titania;
   a second hydrodesulfurization catalytically active component comprising a second metal element and is supported on the inorganic refractory component; and
   an organic component supported on the inorganic refractory component and comprising a carboxylic acid and optionally an alcohol,
   wherein the first metal element is selected from the group consisting of Group VIII metal elements and Group VIB metal elements, and the second metal element is a combination of at least a Group VIII metal element and at least a Group VIB metal element; and
   wherein the Group VIII metal element is selected from the group consisting of iron, cobalt, and nickel, and the Group VIB metal element is selected from the group consisting of chromium, molybdenum, and tungsten.

2. The hydrofining catalyst according to claim 1, wherein the Group VIII metal element present in the first hydrodesulfurization catalytically active component accounts for about 60-90% of a total amount of the Group VIII metal element present in the hydrofining catalyst.

3. The hydrofining catalyst according to claim 2, wherein in the hydrofining catalyst, a total content of the Group VIII metal element is 15-35 wt %, and a total content of the Group VIB metal element is 35-75 wt %, based on the dry weight of the catalyst and calculated as oxides, and
   a percentage of the inorganic refractory component minus the first hydrodesulfurization catalytically active component is 5-40 wt %, based on the weight on a dry basis of the catalyst.

4. The hydrofining catalyst according to claim 1, wherein the hydrofining catalyst has a specific surface area of 70-200 m$^2$/g, a total pore volume of 0.15-0.6 mL/g, and an average pore size of 5-25 nm.

5. The hydrofining catalyst according to claim 1, wherein:
   when the organic component comprises the carboxylic acid without the alcohol, a ratio of the an amount by weight of the carboxylic acid to a weight on a dry basis of the inorganic refractory component minus the first hydrodesulfurization catalytically active component is 0.1-0.8:1; or
   when the organic component comprises both the carboxylic acid and the alcohol, the ratio of the amount by weight of the carboxylic acid to the weight on a dry basis of the inorganic refractory component minus the first hydrodesulfurization catalytically active component is 0.002-0.1:1; and a ratio of a molar amount of the alcohol to the weight on a dry basis of the inorganic refractory component minus the first hydrodesulfurization catalytically active component is 0.005-0.03:1.

6. The hydrofining catalyst according to claim 5, wherein the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof;
   and the alcohol is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

7. The hydrofining catalyst according to claim 6, wherein the hydrofining catalyst further comprises phosphorus in an amount of 0.8-10 wt %, based on the dry weight of the catalyst and calculated as $P_2O_5$.

8. A method for preparing a hydrofining catalyst according to claim 1, comprising the steps of:
   (1) mixing a precursor of a first hydrodesulfurization catalytically active component with a precursor of at least one oxide selected from the group consisting of alumina, silica, magnesia, calcium oxide, zirconia and titania, and calcining to obtain an inorganic refractory component;
   (2) mixing a precursor of a second hydrodesulfurization catalytically active component with an organic component and optionally a phosphorus-containing compound to obtain an impregnation solution, wherein the organic component comprises a carboxylic acid and optionally an alcohol; and (3) mixing the inorganic refractory component with the impregnation solution, and shaping and drying the resulting mixture to obtain the hydrofining catalyst, wherein the precursor of the first hydrodesulfurization catalytically active component comprises a precursor of a metal element selected from the group consisting of Group VIII metal elements and Group VIB metal elements, and the precursor of the second hydrodesulfurization catalytically active component comprises a precursor of a Group VIII metal element and a precursor of a Group VIB metal element, and wherein the Group VIII metal element is selected from the group consisting of iron, cobalt, and nickel, and the Group VIB metal element is selected from the group consisting of chromium, molybdenum, and tungsten.

9. The method according to claim 8, wherein the precursor of the Group VIII metal element present in the precursor of the first hydrodesulfurization catalytically active component accounts for 60-90% of the total amount of the precursor of the Group VIII metal element;

the precursors of the first and second hydrodesulfurization catalytically active components are in such amounts that, in the hydrofining catalyst, the total content of the Group VIII metal element is about 15-35 wt %, and the total content of the Group VIB metal element is about 35-75 wt %, based on the dry weight of the catalyst and calculated as oxides;

and the inorganic refractory component is in such an amount that the inorganic refractory component minus the first hydrodesulfurization catalytically active component is about 5-40 wt %, based on the dry weight of the hydrofining catalyst.

10. The method according to claim 8, wherein:

when the organic component comprises the carboxylic acid and without the alcohol, the ratio of the weight of the carboxylic acid used in step (2) to the weight on a dry basis of the inorganic refractory component minus the first hydrodesulfurization catalytically active component is 0.1-0.8:1; or when the organic component comprises both the carboxylic acid and the alcohol, the ratio of the weight of the carboxylic acid used in step (2) to the weight on a dry basis of the inorganic refractory component minus the first hydrodesulfurization catalytically active component is 0.002-0.1:1, and the ratio of the molar amount of the alcohol to the weight on a dry basis of the inorganic refractory component minus the first hydrodesulfurization catalytically active component is 0.005-0.03:1;

and wherein the carboxylic acid is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof;

and the alcohol is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

11. The method according to claim 10, wherein, in step (2), the phosphorus-containing compound is in such an amount that the phosphorus element is present in an amount of 0.8-10 wt %, based on the dry weight of the hydrofining catalyst and calculated as $P_2O_5$;

wherein the phosphorus-containing compound is selected from the group consisting of phosphoric acid, hypophosphorous acid, ammonium phosphate, ammonium dihydrogen phosphate, and combinations thereof.

12. The method according to claim 8, wherein:

in step (1), the calcining conditions include: a calcining temperature of 300-900° C.; and a calcining time of 1-15 hours; and in step (3), the drying conditions include: a drying temperature of 50-250° C.; a drying time of 2-10 h.

13. The method according to claim 8, wherein the precursor of the alumina is selected from the group consisting of pseudo-boehmite, aluminum hydroxide powder, aluminum nitrate, aluminum carbonate, aluminum citrate, and combinations thereof; the precursor of the silica is selected from the group consisting of silica sol, white carbon black, silica and combinations thereof; the precursor of the magnesia is selected from the group consisting of magnesium hydroxide, magnesium nitrate, magnesium carbonate, magnesium acetate, magnesium oxide and combinations thereof; the precursor of the calcium oxide is selected from calcium hydroxide, calcium carbonate, calcium oxalate, calcium nitrate, calcium acetate, calcium oxide and combinations thereof; the precursor of the zirconia is selected from the group consisting of zirconium hydroxide, zirconium carbonate, zirconium nitrate, zirconium acetate, zirconium oxide and combinations thereof; the precursor of the titania is selected from the group consisting of titanium hydroxide, titanium nitrate, titanium acetate, titanium oxide and combinations thereof.

14. A hydrofining catalyst system comprising a first catalyst and a second catalyst, wherein:

the first catalyst is a hydrofining catalyst according to claim 1;

the second catalyst comprises a second inorganic refractory component comprising alumina, a third hydrodesulfurization catalytically active component supported on the second inorganic refractory component, and an organic component supported on the second inorganic refractory component, wherein the organic component is selected from the group consisting of carboxylic acids and alcohols, and a pore size of the second catalyst is in the range of 2-100 nm;

wherein a volume ratio of the first catalyst to the second catalyst is from 1:1 to 1:8.

15. The hydrofining catalyst system according to claim 14, wherein:

in the second catalyst, the third hydrodesulfurization catalytically active component comprises at least one Group VIII metal element and at least one Group VIB metal element;

and, in the second catalyst, a total content of the Group VIII metal element is 1-8 wt %, and a total content of the Group VIB metal element is 10-35 wt %, based on the dry weight of the second catalyst and calculated as oxides;

wherein, the Group VIII metal element is at least one selected from the group consisting of iron, cobalt, nickel, ruthenium, rhodium, and palladium, and the Group VIB metal element is at least one selected from the group consisting of chromium, molybdenum, and tungsten;

and the second inorganic refractory component is present in the second catalyst in an amount of 60-85 wt %, based on the dry weight of the second catalyst.

16. The hydrofining catalyst system of claim 14, wherein:

the second catalyst has a specific surface area of 130-300 $m^2/g$, a total pore volume of 0.2-0.7 mL/g, and an average pore size of 6-20 nm;

and, in the second catalyst, a molar ratio of the organic component to the Group VIII metal element contained in the second catalyst is 0.5-8;

the carboxylic acid in the second catalyst is selected from the group consisting of $C_{1-18}$ monobasic saturated carboxylic acids, $C_{7-10}$ phenyl acids, citric acid, adipic acid, malonic acid, succinic acid, maleic acid, tartaric acid, and combinations thereof;

and the alcohol in the second catalyst is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane, and combinations thereof.

17. A method for preparing a hydrofining catalyst system comprising a first catalyst and a second catalyst, said method comprising:
    (1) providing a hydrofining catalyst according to claim 1 as the first catalyst;
    (2) preparing the second catalyst by the steps of:
    (2a) mixing an alumina precursor with an extrusion aid and a peptizing agent, and subjecting the resulting mixture to shaping, drying and calcining sequentially to obtain a second inorganic refractory component;
    (2b) mixing a precursor of a third hydrodesulfurization catalytically active component with an organic component selected from the group consisting of carboxylic acids and alcohols and optionally a phosphorus-containing compound to obtain a second impregnation solution;
    (2c) mixing the second impregnation solution with the second inorganic refractory component and then drying to obtain the second catalyst; and
    (3) loading the first catalyst and the second catalyst into a first catalyst bed and a second catalyst bed, respectively, in a volume ratio of 1:1 to 1:8, to obtain the hydrofining catalyst system;
    wherein, in step (2), the precursor of the third hydrodesulfurization catalytically active component comprises a precursor of at least one Group VIII metal element and a precursor of at least one Group VIB metal element;
    the precursor of the third hydrodesulfurization catalytically active component is in such an amount that, in the second catalyst, the total content of the Group VIII metal element is 1-8 wt %; the content of the Group VIB metal element is 10-35 wt %, based on the dry weight of the second catalyst and calculated as oxides;
    in step (2), the second inorganic refractory component is in such an amount that the second inorganic refractory component is present in the second catalyst in an amount of 60-85 wt %, based on the dry weight of the second catalyst;
    the Group VIII metal element is at least one selected from the group consisting of iron, cobalt, and nickel, and the Group VIB metal element is at least one selected from the group consisting of chromium, molybdenum, and tungsten.

18. The method according to claim 17, wherein:
    in step (2b), the molar ratio of the organic component to the Group VIII metal element used in the preparation of the second catalyst is 0.5-8;
    the carboxylic acid used in step (2b) is selected from the group consisting of $C_{1-18}$ monohydric saturated carboxylic acids, $C_{7-10}$ phenyl acids, citric acid, adipic acid, malonic acid, succinic acid, maleic acid, tartaric acid, and combinations thereof;
    the alcohol in step (2b) is selected from the group consisting of $C_{1-18}$ monohydric saturated alcohols, ethylene glycol, polyethylene glycol, glycerol, polyglycerol, erythritol, pentaerythritol, xylitol, sorbitol, trimethylolethane and combinations thereof;
    in step (2b), the phosphorus-containing compound is in such an amount that the phosphorus element is present in an amount of 0.8-10 wt %, based on the dry weight of the second catalyst and calculated as $P_2O_5$;
    and the phosphorus-containing compound in step (2b) is selected from the group consisting of phosphoric acid, hypophosphorous acid, ammonium phosphate, ammonium dihydrogen phosphate, and combinations thereof.

19. The method according to claim 17, wherein:
    in step (2a), the calcining conditions include: a calcining temperature of 400-1000° C.; and a calcining time of 1-15 hours; and
    in step (2c), the drying conditions include: a drying temperature of 50-250° C.; a drying time of 2-10 h;
    step (2a) is performed under such conditions that, in the resulting second inorganic refractory component, a volume of pores having a pore size in the range of 2-4 nm is 0-2% of the total pore volume, a volume of pores having a pore size in the range of 4-6 nm is 2-15% of the total pore volume, a volume of pores having a pore size in the range of 6-40 nm is 85-95% of the total pore volume.

20. A process for the hydrofining of distillate oils, comprises the following steps:
    subjecting a hydrofining catalyst according to claim 1 to sulfurization; and
    contacting a distillate oil to be hydrodesulfurized with the sulfurized hydrofining catalyst under hydrodesulfurization conditions.

21. The hydrofining catalyst according to claim 1, wherein the hydrofining catalyst has pores with pore sizes in the ranges of 2-40 nm and 100-300 nm, respectively, wherein a volume of pores having a pore size in the range of 2-40 nm is 60-95% of a total pore volume, and a volume of pores having a pore size in the range of 100-300 nm is 0.5-30% of the total pore volume, as determined after being calcined at 400° C. for 3 h,
    and wherein in the hydrofining catalyst, a volume of pores having a pore size in the range of 2-4 nm is no more than 10% of the total pore volume.

* * * * *